US011854406B2

(12) United States Patent
Tazume et al.

(10) Patent No.: US 11,854,406 B2
(45) Date of Patent: Dec. 26, 2023

(54) CONTROL DEVICE, ALERT SYSTEM, AND METHOD

(71) Applicant: Rakuten Group, Inc., Tokyo (JP)

(72) Inventors: Toshiaki Tazume, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 260 days.

(21) Appl. No.: 17/413,326

(22) PCT Filed: Jun. 29, 2020

(86) PCT No.: PCT/JP2020/025568
§ 371 (c)(1),
(2) Date: Jun. 11, 2021

(87) PCT Pub. No.: WO2022/003792
PCT Pub. Date: Jan. 6, 2022

(65) Prior Publication Data
US 2022/0319338 A1    Oct. 6, 2022

(51) Int. Cl.
*G08G 5/00* (2006.01)

(52) U.S. Cl.
CPC ......... *G08G 5/0013* (2013.01); *G08G 5/0026* (2013.01); *G08G 5/0091* (2013.01)

(58) Field of Classification Search
CPC .. G08G 5/0013; G08G 5/0026; G08G 5/0091; G08G 5/025; Y02A 90/10; G01S 17/95; G05D 1/101
USPC ........................................................ 340/947
See application file for complete search history.

(56) References Cited

U.S. PATENT DOCUMENTS

| 7,129,857 B1* | 10/2006 | Spirkovska | G01W 1/00 |
| | | | 701/14 |
| 2009/0093953 A1* | 4/2009 | Wiesemann | G08G 5/025 |
| | | | 701/532 |
| 2011/0202208 A1* | 8/2011 | Karnik | G07C 5/0816 |
| | | | 701/4 |
| 2020/0239138 A1 | 7/2020 | Raptopoulos et al. | |
| 2020/0380804 A1* | 12/2020 | Nakhjavani | G07C 5/006 |
| 2021/0107643 A1 | 4/2021 | Nagai et al. | |

FOREIGN PATENT DOCUMENTS

| JP | 6-179398 A | 6/1994 |
| JP | 11-66480 A | 3/1999 |
| JP | 2003-85681 A | 3/2003 |
| JP | 2003-288700 A | 10/2003 |
| JP | 2018-45643 A | 3/2018 |
| JP | 2018-184151 A | 11/2018 |

(Continued)

OTHER PUBLICATIONS

Written opinion for PCT/JP2020/025568 dated Sep. 24, 2020.
International search report for PCT/JP2020/025568 dated Sep. 24, 2020.

*Primary Examiner* — Eric Blount
(74) *Attorney, Agent, or Firm* — Sughrue Mion, PLLC

(57) ABSTRACT

A control device (900) includes an acquirer (910) that acquires information expressing weather related to a port that is a location at which a landing of an aircraft is scheduled, and a controller (930) that causes an alerter to perform a behavior corresponding to the weather expressed in the acquired information. The alerter performs an alert related to the landing of the aircraft.

20 Claims, 33 Drawing Sheets

(56) References Cited

FOREIGN PATENT DOCUMENTS

| | | |
|---|---|---|
| JP | 2019-31164 A | 2/2019 |
| JP | 2019-503295 A | 2/2019 |
| JP | 2019-89461 A | 6/2019 |
| WO | 2019/058685 A1 | 3/2019 |
| WO | 2019/181894 A1 | 9/2019 |

* cited by examiner

FIG. 28

VOLUME TABLE

| WEATHER NAME | AMOUNT OF CORRECTION |
|---|---|
| RAIN | ... |
| SNOW | ... |
| ... | ... |
| RAIN WITH THUNDER | ... |
| ... | ... |
| CLEAR WITH STRONG WIND | ... |
| ... | ... |

FIG. 30

LUMINOUS INTENSITY TABLE

| WEATHER NAME | AMOUNT OF CORRECTION |
|---|---|
| RAIN | ... |
| SNOW | ... |
| ... | ... |
| RAIN WITH THUNDER | ... |
| ... | ... |

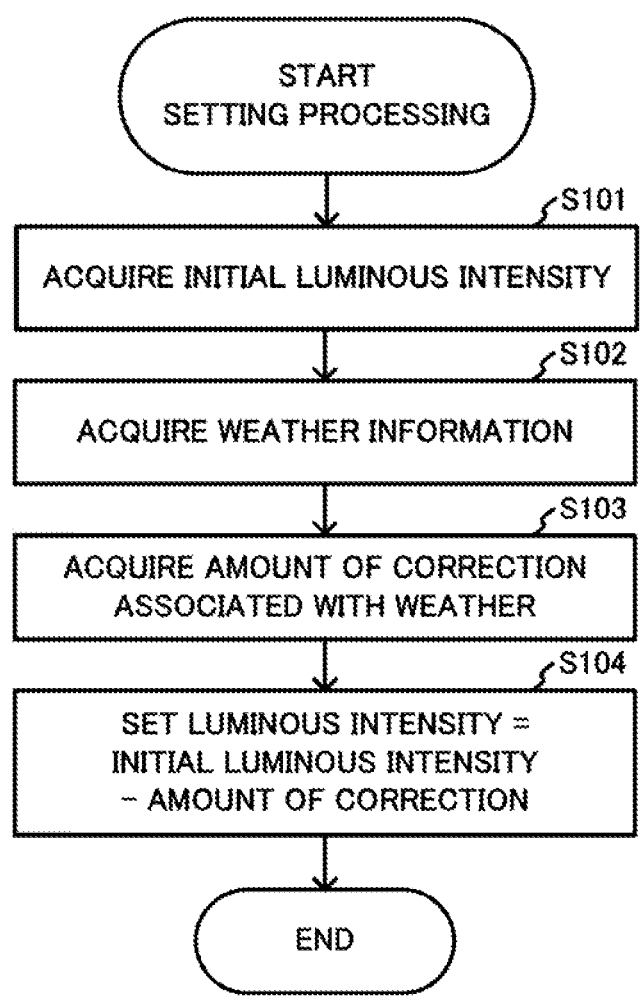

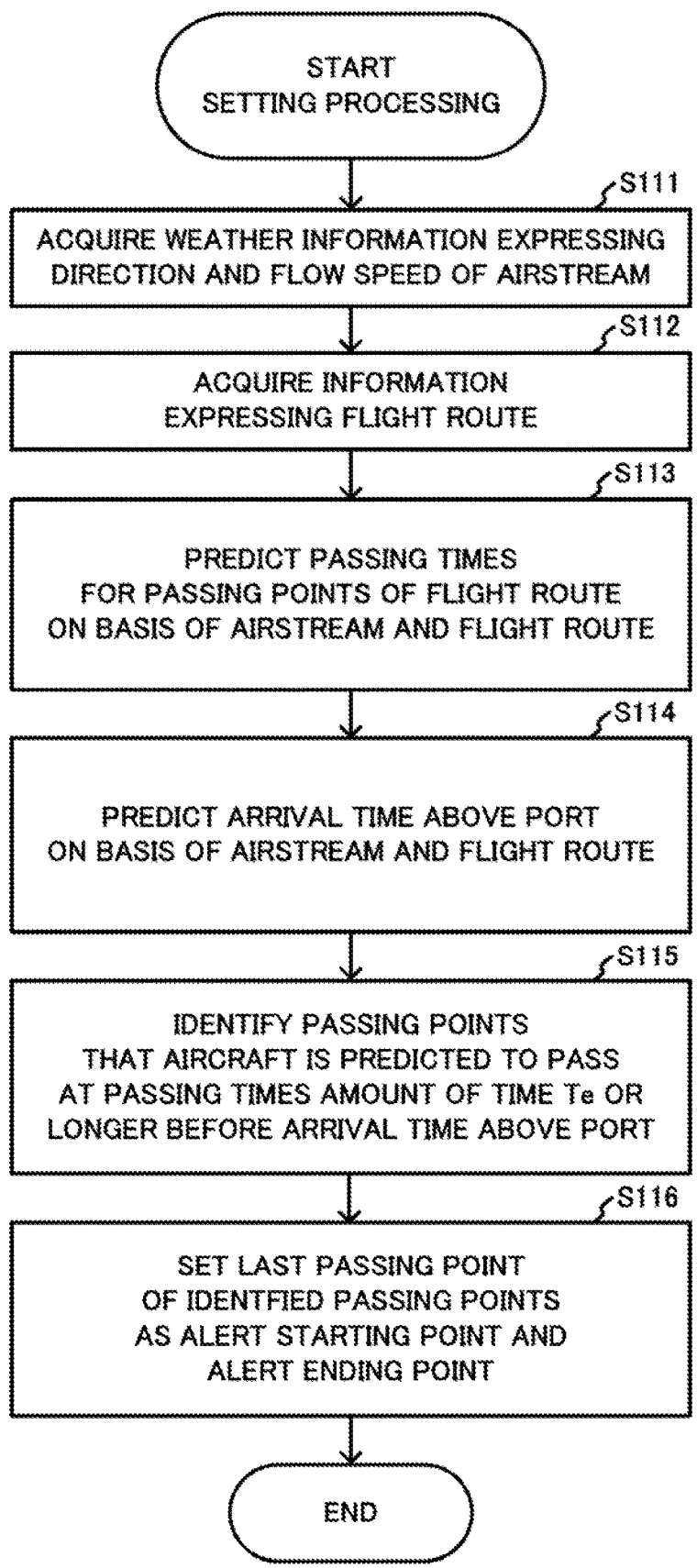

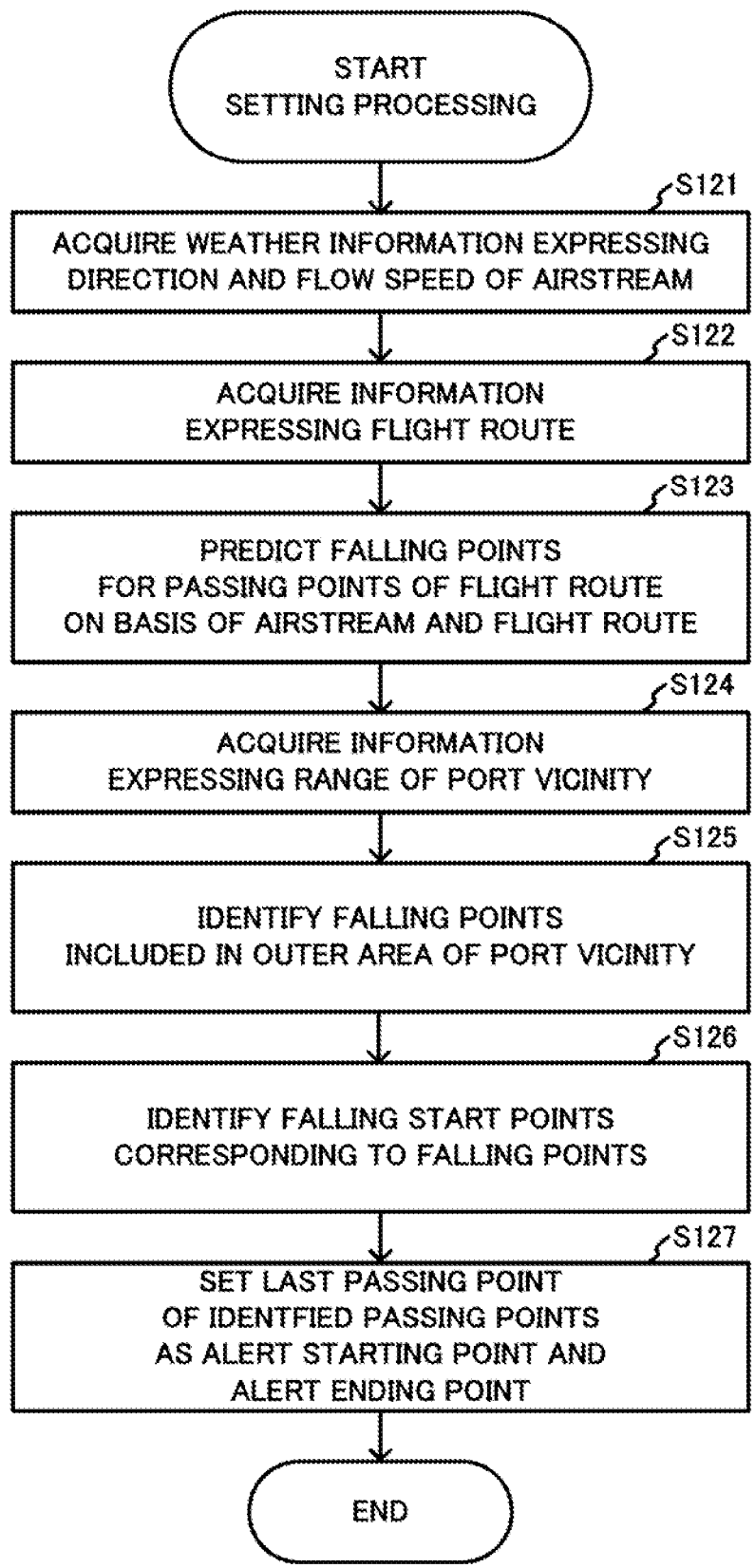

CONTROL DEVICE, ALERT SYSTEM, AND METHOD

CROSS-REFERENCE TO RELATED APPLICATIONS

This application is a National Stage of International Application No. PCT/JP2020/025568 filed Jun. 29, 2020.

TECHNICAL FIELD

The present disclosure relates to a control device, an alert system, and a method.

BACKGROUND ART

In the related art, a device is known that includes an alerter that performs, using audio or a warning lamp, for example, an alert related to the landing of an aircraft (for example, see Patent Literature 1 to 4).

CITATION LIST

Patent Literature

Patent Literature 1: Unexamined Japanese Patent Application Publication No. 2019-089461
Patent Literature 2: Unexamined Japanese Patent Application Publication No. H06-179398
Patent Literature 3: Unexamined Japanese Patent Application Publication No. 2018-184151
Patent Literature 4: Unexamined Japanese Patent Application Publication No. 2018-045643

SUMMARY OF INVENTION

Technical Problem

However, with the devices of Patent Literature 1 to 4, it is not possible to control the behavior of the alerter in accordance with the weather at the location where the aircraft is scheduled to land. Consequently, depending on the weather, it may not be possible to cause the alerter to perform a sufficient alert, which is a problem.

The present disclosure is made with the view of the above situation, and an objective of the present disclosure is to provide a control device, an alert system, and a method whereby an alerter that performs an alert related to the landing of an aircraft can be caused to perform a sufficient alert corresponding to the weather.

Solution to Problem

A control device according to a first aspect of the present disclosure that achieves the objective described above includes:
an acquirer that acquires information expressing weather related to a scheduled landing location at which a landing of an aircraft is scheduled; and
a controller that causes an alerter to perform a behavior corresponding to the weather expressed in the acquired information, the alerter performing an alert related to the landing of the aircraft.

Advantageous Effects of Invention

According to the control device, the alert system, and the method according to the present disclosure, the alerter that performs the alert related to the landing of the aircraft can be caused to perform a sufficient alert that corresponds to the weather.

BRIEF DESCRIPTION OF DRAWINGS

FIG. 28 is a drawing illustrating an example of a volume table that the control device stores;

FIG. 30 is a drawing illustrating an example of a luminous intensity table that the control device stores;

FIG. 31 is a flowchart illustrating an example of setting processing executed by a control device according to Modified Example 2 of Embodiment 3;

FIG. 32 is a flowchart illustrating an example of setting processing executed by a control device according to Embodiment 4; and FIG. 33 is a flowchart illustrating an example of setting processing executed by a control device according to a modified example of Embodiment 4.

DESCRIPTION OF EMBODIMENTS

Embodiment 1

Hereinafter, embodiments of the present disclosure are described while referencing the attached drawings.

Figure 1:
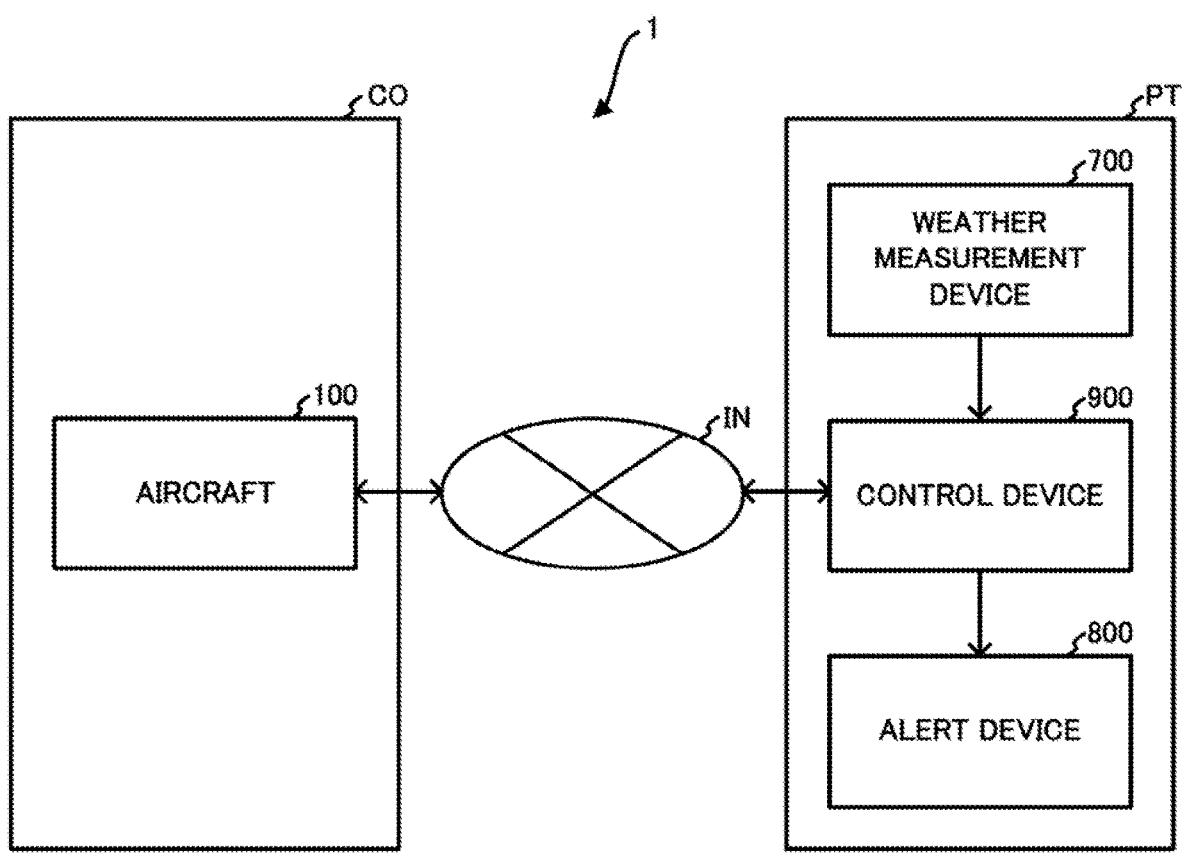
FIG. 1 is a system configuration drawing illustrating a configuration example of an alert system according to Embodiment 1 of the present disclosure.

An alert system 1 according to an embodiment of the present disclosure includes an aircraft 100 such as illustrated in FIG. 1 that flies while storing an article, and a weather measurement device 700 that measures weather related to a location (hereinafter referred to as "port") PT that is a delivery destination of the article and is where the aircraft 100 is scheduled to takeoff and land. Additionally, the alert system 1 includes an alert device 800 that performs an alert related to the landing and an alert related to the takeoff of the aircraft 100, and a control device 900 that causes the alert device 800 to perform a behavior corresponding to the weather measured by the weather measurement device 700.

In the present embodiment, a description is given in which the port PT is provided near the entrance of an apartment complex where an addressee of the article resides. However, the present embodiment is not limited thereto.

Figure 2:
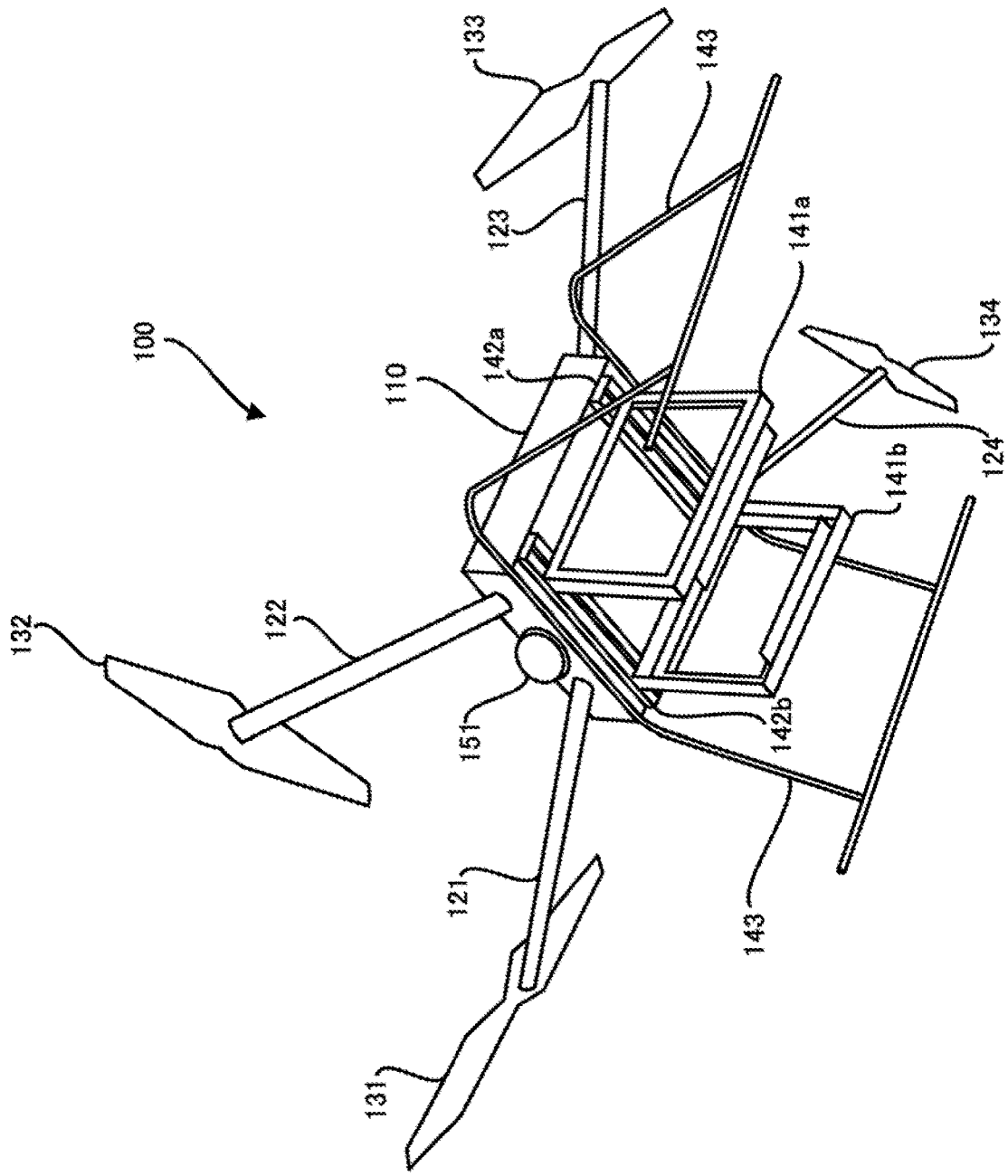
FIG. 2 is an appearance configuration drawing illustrating an example of the appearance of an aircraft.

The aircraft 100 is an unmanned aircraft such as a drone or the like, and is landed at an office CO of a delivery company. The aircraft 100 includes a control device 110 that has a rectangular parallelepiped shape such as illustrated in FIG. 2. The control device 110 controls the attitude and the flight of the aircraft 100.

In the present embodiment, a surface, of the plurality of faces of the control device 110, serving as the reference is called the "front face", and a direction that is parallel to the normal direction of the front face and that is directed outward from the control device 110 is called the "forward direction" of the aircraft 100. Moreover, one face, of the plurality of faces of the control device 110, perpendicular to the front face is called the "top face", and a direction that is parallel to the normal direction of the top face and that is directed outward from the control device 110 is called the "upward direction" of the aircraft 100.

The aircraft 100 includes propeller arms 121, 122 and 123, 124 that respectively protrude forward to the right and forward to the left from the front face of the control device 110, and backward to the left and backward to the right from the back face of the control device 110. Furthermore, the aircraft 100 includes propellers 131 to 134 that are installed on respective tips of the propeller arms 121 to 124, and non-illustrated motors that rotate the propellers 131 to 134 in accordance with control by the control device 110.

The aircraft 100 includes, beneath the control device 110, a first holding frame 141a that surrounds and holds four sides of one side face (hereinafter referred to as "first surrounded face") of the parallelepiped shaped cardboard in which the article is packaged, and a second holding frame 141b that surrounds and holds four sides of a side face (hereinafter referred to as "second surrounded face") opposite the first surrounded face surrounded and held by the first holding frame 141a. Furthermore, the aircraft 100 includes, on a bottom face of the control device 110, guide rails 142a and 142b that extend in a normal direction of the first surrounded face and the second surrounded face of the article, suspend the first holding frame 141a and the second holding frame 141b, and have the movement direction of the first holding frame 141a and the second holding frame 141b as the extending direction.

Furthermore, the aircraft 100 includes a non-illustrated motor that causes the first holding frame 141a and the second holding frame 141b to surround and hold the article by moving, in accordance with the control of the control device 110, the first holding frame 141a and the second holding frame 141b in directions so as to approach each other. Furthermore, the non-illustrated motor causes the first holding frame 141a and the second holding frame 141b to release the surrounded and held article by moving, in accordance with the control of the control device 110, the first holding frame 141a and the second holding frame 141b in directions so as to separate from each other.

Furthermore, the aircraft 100 includes a support leg 143 that protrudes downward from the bottom face of the control device 110 and that supports the control device 110. The length in the vertical direction of the support leg 143 is designed to be longer, by a predetermined length, than the lengths in the vertical direction of the first holding frame 141a and the second holding frame 141b. The support leg 143 is designed in this manner to prevent the first holding frame 141a and the second holding frame 141b, and the article surrounded and held by the first holding frame 141a and the second holding frame 141b from colliding with the ground or the floor of the landing point when the aircraft 100 lands.

Moreover, the aircraft 100 includes a LiDAR (light detection and ranging) sensor 151 provided on the front face of the control device 110, and a non-illustrated LiDAR sensor provided on the back face of the control device 110.

The LiDAR sensor 151 on the front face emits laser light in a plurality of directions such that, when the forward direction of the aircraft 100 is a reference direction, an azimuth formed with that reference direction is in a range of −90 degrees to +90 degrees and an elevation angle formed with the forward direction of the aircraft 100 is in a range of −90 degrees to +90 degrees. The LiDAR sensor 151 on the front face receives the reflected light of the emitted laser light, and measures the distance from the LiDAR sensor 151 to a plurality of reflection points at which the laser light reflects. The distance is measured on the basis of an amount of time from the emission of the laser light to the receiving of the reflected light. Next, for the plurality of reflection points, the LiDAR sensor 151 on the front face calculates, with the center point of the aircraft 100 as the origin point, coordinate values in a coordinate system of the aircraft 100 on the basis of the emission direction of the laser light and the measured distance. In the coordinate system, the forward direction is an Xd axis direction, the right direction is a Yd axis direction, and the downward direction is a Zd axis direction. Thereafter, the LiDAR sensor 151 on the front face outputs the calculated coordinate values of the plurality of reflection points to the control device 110.

The LiDAR sensor on the back face emits laser light in a plurality of directions such that, when the backward direction of the aircraft 100 is a reference direction, an azimuth formed with that reference direction is in a range of −90 degrees to +90 degrees and an elevation angle formed with the backward direction of the aircraft 100 is in a range of −90 degrees to +90 degrees. Additionally, the LiDAR sensor on the back face calculates the coordinate values in the coordinate system of the aircraft 100 for the plurality of reflection points of the emitted laser light, and outputs the calculated coordinate values of the plurality of reflection points to the control device 110.

The reason that the LiDAR sensor 151 on the front face and the LiDAR sensor on the back face output the coordinate values of the plurality of reflection points to the control device 110 is because the control device 110 uses the coordinate values to measure distances from the aircraft 100 to objects including obstacles and sizes of these objects, measures the altitude of the aircraft 100 with the ground surface as the reference surface, and the like.

Figure 3:
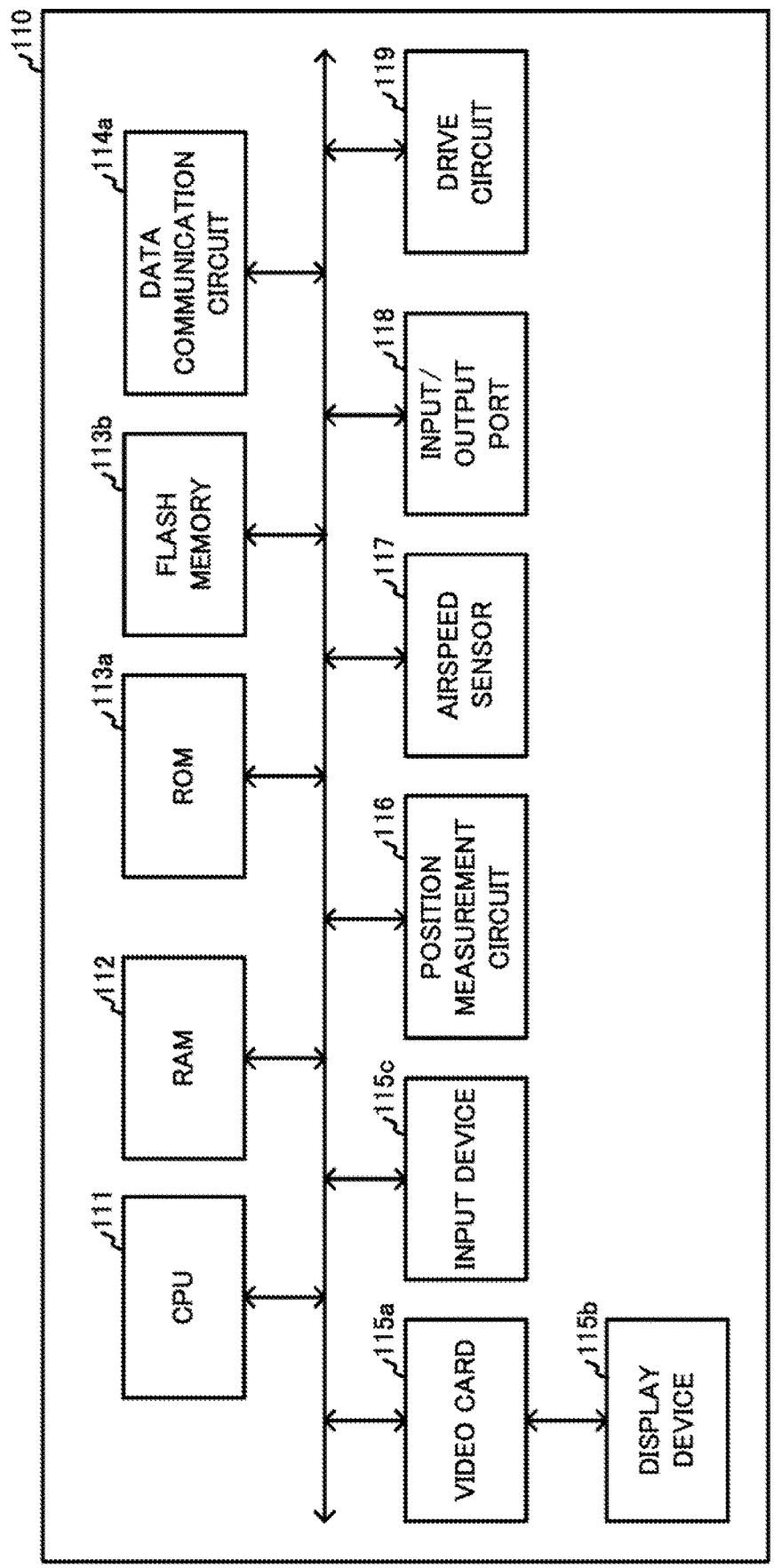
FIG. 3 is a hardware configuration drawing illustrating a configuration example of a control device of the aircraft.

As illustrated in FIG. 3, the control device 110 includes a central processing unit (CPU) 111, a random access memory (RAM) 112, a read only memory (ROM) 113a, a flash memory 113b, a data communication circuit 114a, a video card 115a, a display device 115b, an input device 115c, a position measurement circuit 116, an airspeed sensor 117, an input/output port 118, and a drive circuit 119. In the present embodiment, it is described that the control device 110 includes one CPU 111, but the present embodiment is not limited thereto and the control device 110 may include a plurality of CPUs.

The CPU 111 of the control device 110 of the aircraft 100 carries out total control of the aircraft 100 by executing programs stored in the ROM 113a or the flash memory 113b. The RAM 112 temporarily stores data to be processed at the times of execution of the programs by the CPU 111.

Various types of programs are stored in the ROM 113a and the flash memory 113b of the aircraft 100. The flash memory 113b also stores various types of data and tables in which data is stored that are used in the execution of the programs. The control device 110 may include a hard disk instead of the flash memory 113b.

The data communication circuit 114a of the aircraft 100 is implemented as a network interface card (NIC) and, in one example, in accordance with a communication standard such as long term evolution (LTE) or 5th Generation (5G), carries out data communication using radio waves with a non-illustrated base station that is connected to the internet IN. Thus, the data communication circuit 114a of the aircraft 100 carries out data communication with a control device 900 that is connected to the internet IN.

The video card 115a of the aircraft 100 renders images on the basis of digital signals output from the CPU 111, and outputs image signals that represent the rendered images. The display device 115b is implemented as an electroluminescence (EL) display, and displays images in accordance with the image signals output from the video card 115a. The control device 110 of the aircraft 100 may include a plasma display panel (PDP) or a liquid crystal display (LCD) instead of the EL display. The input device 115c is implemented as at least one of a button or a touch panel, and inputs signals corresponding to operations of a worker at the office.

The position measurement circuit 116 of the aircraft 100 is implemented as a quasi-zenith satellite system (QZSS) circuit. The position measurement circuit 116 receives a signal emitted from a quasi-zenith satellite, measures the latitude, longitude, and altitude expressing the position of the aircraft 100 on the basis of the received signal, and outputs a signal expressing the measured latitude, longitude, and altitude. A configuration is possible in which, instead of a QZSS circuit, the position measurement circuit 116 is implemented as a non-illustrated global positioning system (GPS) circuit that receives a GPS signal emitted from a GPS satellite, and measures the latitude, longitude, and altitude expressing the position of the aircraft 100 on the basis of the received GPS signal.

The airspeed sensor 117 of the aircraft 100 is implemented as a pitot tube or ultrasonic airspeed sensor. The airspeed sensor 117 measures the airspeed of the aircraft 100 and outputs a signal expressing the measured airspeed.

The input/output port 118 of the aircraft 100 is connected to non-illustrated cables connected to each of the LiDAR sensor 151 on the front face illustrated in FIG. 2, and the LiDAR sensor on the back face. The input/output port 118 inputs, to the CPU 111, the signals expressing the coordinate values outputted by each of the LiDAR sensor 151 on the front face and the LiDAR sensor on the back face.

The drive circuit 119 of the aircraft 100 is connected to non-illustrated cables that are connected to each of the non-illustrated motors that rotate the propellers 131 to 134 illustrated in FIG. 2, and a cable that is connected to the non-illustrated motor that moves the first holding frame 141a and the second holding frame 141b. The drive circuit 119 drives, in accordance with the signals output by the CPU 111, the non-illustrated motors that rotate the propellers 131 to 134 or the non-illustrated motor that moves the first holding frame 141a and the second holding frame 141b.

When an article is brought into the office at which the aircraft 100 is landed, the worker of that office reads a slip affixed to cardboard in which the article is packaged, and confirms the address of the port PT specified as the delivery destination of the article. Then, the worker arranges the article between the first holding frame 141a and the second holding frame 141b of the aircraft 100 and, then, performs, on the input device 115c of the control device 110 of the aircraft 100, an operation for causing the first holding frame 141a and the second holding frame 141b to surround and hold the article.

When the input device 115c of the aircraft 100 inputs a signal corresponding to the operation, the CPU 111 of the aircraft 100 outputs, to the drive circuit, a control signal for causing the first holding frame 141a and the second holding frame 141b to move in directions so as to approach each other, thereby causing the article to be stored in the aircraft 100.

The worker that confirms that the article is stored by the aircraft 100 performs, on the input device 115c of the aircraft 100, an operation for inputting the address of the port PT specified as the delivery destination.

Figure 4:
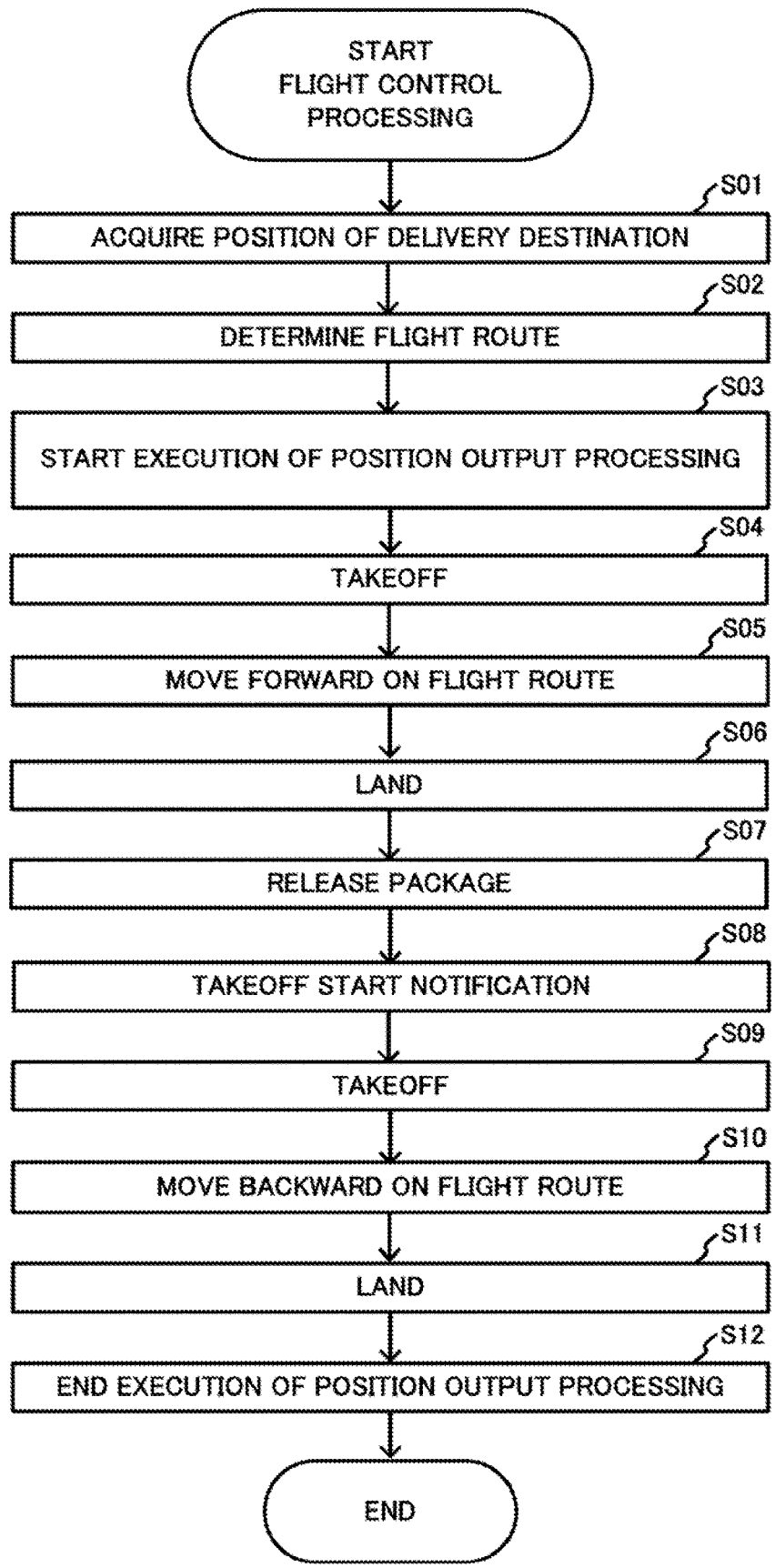
FIG. 4 is a flowchart illustrating an example of flight control processing executed by the aircraft.

When the input device 115c of the aircraft 100 inputs a signal corresponding to the operation of the worker, the CPU 111 of the aircraft 100 executes flight control processing such as illustrated in FIG. 4 for controlling the rotation of the propellers 131 to 134 to fly to the delivery destination.

When the execution of the flight control processing starts, the CPU 111 of the aircraft 100 acquires, on the basis of the signal input by the input device 115c, the information expressing the address of the port PT specified as the delivery destination. Next, the CPU 111 acquires, from the flash memory 113b, information that is stored in advance in association with the acquired information expressing the address, and that expresses the position of the port PT by latitude, longitude, and altitude (step S01).

Next, the CPU 111 of the aircraft 100 acquires, on the basis of the signal output from the position measurement circuit 116, information expressing the position of the aircraft 100 by latitude, longitude, and altitude. Then, the CPU 111 reads a plurality of records from a non-illustrated partial route table in which information related to partial routes on which the aircraft 100 can move, such as roads and rivers, for example, is stored in advance. The partial route table is stored in advance in the flash memory 113b. Information expressing the latitude, longitude, and altitude of a start node of a partial route, information expressing the latitude, longitude, and altitude of an end node of the partial route, and information expressing a length of an edge that is the partial route are associated and stored in advance in each record of the partial route table.

The CPU 111 of the aircraft 100 executes a route search algorithm such as, for example, Dijkstra's algorithm using the latitude, the longitude, and the altitude of the aircraft 100, the length of the edge that is the partial route, the latitude, the longitude, and the altitude of the node, and the latitude, the longitude, and the altitude of the port PT specified as the delivery destination. Thus, the CPU 111 calculates the shortest total route from the office where the aircraft 100 is landed to above the port PT specified as the delivery destination, and determines the calculated total route as a flight route (step S02). Then, the CPU 111 stores information expressing the flight route in the flash memory 113b.

Next, the CPU 111 of the aircraft 100 acquires, from the flash memory 113b, information expressing a communication address that is stored in advance in association with the information expressing the position of the port PT specified as the delivery destination. This communication address is an address that the control device 900, which causes the alert device 800 to perform an alert related to takeoff or landing at the port PT, uses to carry out data communication with the aircraft 100.

Thereafter, the CPU 111 of the aircraft 100 generates a thread that differs from the thread that executes the flight control processing and, in the generated thread, starts the execution of non-illustrated position output processing for outputting information expressing the flight position of the aircraft 100 (step S03).

When the execution of the position output processing starts, the CPU 111 of the aircraft 100 executes processing for generating, on the basis of the signal output from the position measurement circuit 116, information expressing the flight position of the aircraft 100 by latitude, longitude, and altitude. Next, the CPU 111 executes processing for outputting, to the data communication circuit 114a with the communication address of the control device 900 as the destination, the generated information expressing the flight position. Then, until the execution of the position output processing ends in step S12 described below, the CPU 111 repeats the processing described above from the processing for generating the information expressing the flight position.

After step S03 is executed, the CPU 111 of the aircraft 100 generates a control signal for causing the propellers 131 to 134 to rotate to takeoff from the office, and outputs the control signal to the drive circuit (step S04).

Next, the CPU 111 of the aircraft 100 reads, from the flash memory 113b, information expressing an airspeed Va that is a predetermined scalar quantity. Next, the CPU 111 outputs, to the drive circuit and on the basis of a signal output from the airspeed sensor 117, a control signal for moving forward on the flight path at the airspeed Va (step S05).

To accomplish this, the CPU 111 executes processing for acquiring a signal from the position measurement circuit 116. Next, the CPU 111 executes processing for generating a control signal for reducing the difference between the latitude, longitude, and altitude of the aircraft 100 expressed in the acquired signal and the latitude, longitude, and altitude of the closest node of the one or plurality of nodes not yet arrived at included in the flight route. Then, the CPU 111 executes processing for outputting the generated control signal to the drive circuit 119 that drives the non-illustrated motors that rotate the propellers 131 to 134. Next, as long as there is a node not yet arrived at, the CPU 111 of the aircraft 100 repeats the processing described above from the processing for acquiring the signal from the position measurement circuit 116.

After executing step S05, when there are no nodes left that have not been arrived at, the CPU 111 of the aircraft 100 determines that the aircraft 100 has arrived above the port PT specified as the delivery destination. Then, the CPU 111 generates a control signal for landing at the port PT, and outputs the generated control signal to the drive circuit 119 (step S06).

Thereafter, the CPU 111 of the aircraft 100 outputs, to the drive circuit 119, a control signal for causing the first holding frame 141a and the second holding frame 114b to move apart from each other. As a result, the CPU 111 causes the first holding frame 141a and the second holding frame 141b to release the article (step S07).

Next, the CPU 111 of the aircraft 100 outputs, to the data communication circuit 114a with the communication address of the control device 900 installed near the port PT as the destination, a takeoff start notification informing that the aircraft 100 will start taking off from the port PT (step S08). Then, the CPU 111 of the aircraft 100 executes the same processing as step S04. As a result, the aircraft 100 takes off from the port PT (step S09).

Next, the CPU 111 of the aircraft 100 outputs, to the drive circuit 119, a control signal for returning to the office by flying back on the flight route (step S10).

When the aircraft 100 arrives above the office, the CPU 111 of the aircraft 100 executes the same processing as step S06. As a result, the aircraft 100 lands at the office (step S11). Then, the CPU 111 of the aircraft 100 ends the execution of the position output processing started in step S03 (step S12), and ends the execution of the flight control processing.

The weather measurement device 700 is connected to the control device 900, measures the weather related to the port PT at which the aircraft 100 is scheduled to land and takeoff, and outputs a signal expressing the measured weather to the control device 900.

In the present embodiment, a description is given in which "the weather related to the port PT" includes the wind speed Vw above the port PT or above the port PT vicinity. The wind speed Vw is a scalar quantity.

As such, the weather measurement device 700 is implemented as an ultrasonic three-dimensional anemometer and, for example, is installed on a support pillar provided at the port PT or the port PT vicinity, and measures the wind speed Vw at an altitude h above the port PT or the port PT vicinity. The weather measurement device 700 is installed at such a position because, in the present embodiment, the altitude h has the surface of the port PT or the surface of the port PT vicinity as a reference surface, and the aircraft 100 flies at an altitude in a predetermined range that includes the altitude h.

The phrase "port PT vicinity" refers to a region on the floor of the entrance where the port PT is installed. This region is more to the port PT side than a boundary line B that is separated a predetermined distance D from an outer periphery of the port PT, and is outward from the outer periphery of the port PT. In the present embodiment, a description is given in which the predetermined distance D is 30 meters, but the present disclosure is not limited thereto.

Figure 5:
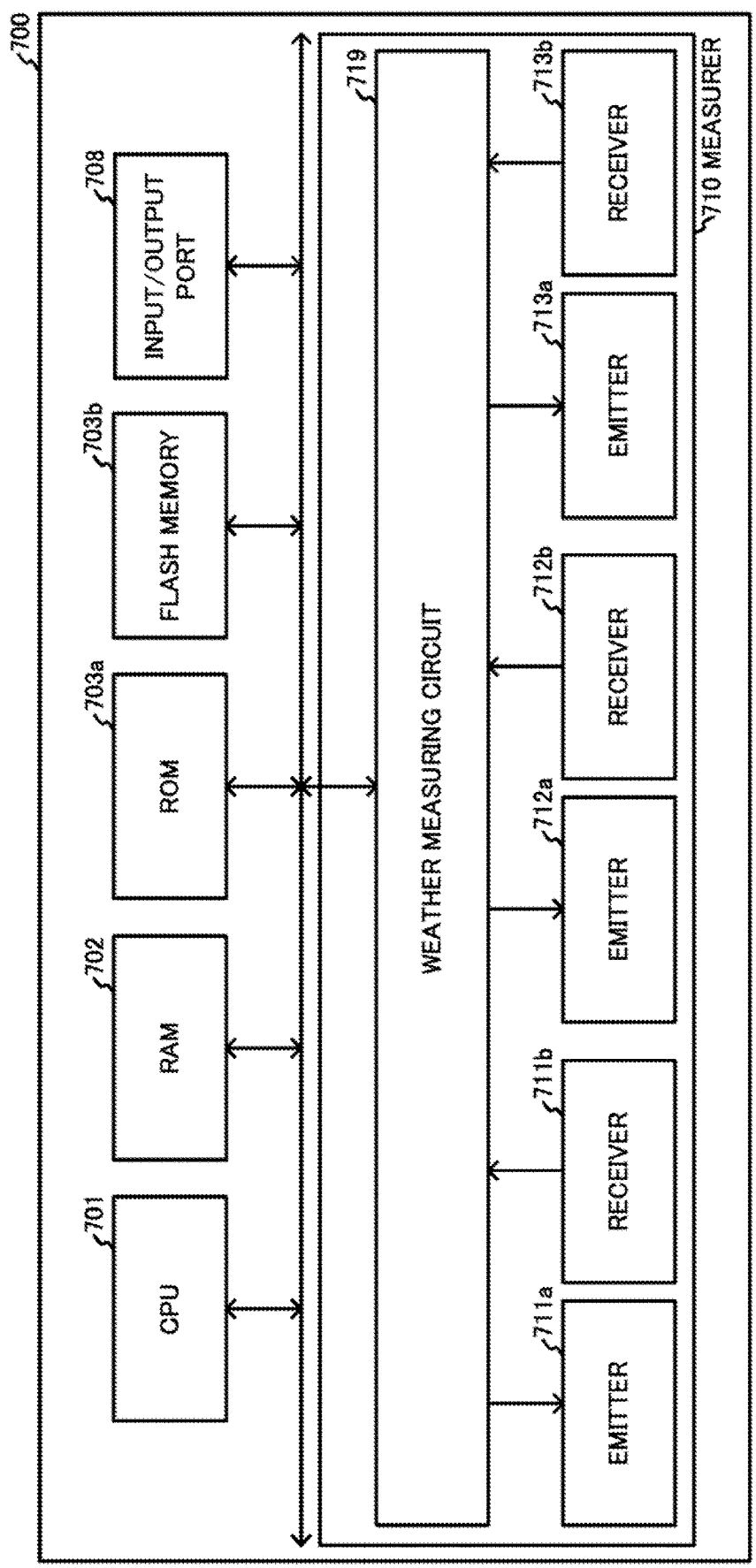
FIG. 5 is a hardware configuration diagram illustrating a configuration example of a weather measurement device.

As illustrated in FIG. 5, the weather measurement device 700 includes a CPU 701, a RAM 702, a ROM 703a, a flash memory 703b, an input/output port 708, and a measurer 710. In the present embodiment, a description is given in which the weather measurement device 700 includes one CPU 701, but the present embodiment is not limited thereto and the weather measurement device 700 may include a plurality of CPUs.

The configurations and functions of the CPU 701, the RAM 702, the ROM 703a, and the flash memory 703b of the weather measurement device 700 are the same as the configurations and the functions of the CPU 111, the RAM 112, the ROM 113a, and the flash memory 113b of the control device 110 of the aircraft 100 illustrated in FIG. 3.

The input/output port 708 of the weather measurement device 700 is connected to a non-illustrated cable, and inputs signals output from the CPU 701 into the control device 900 that is connected to that cable.

The measurer 710 of the weather measurement device 700 includes emitters 711a to 713a, receivers 711b to 713b, and a weather measuring circuit 719. The emitters 711a to 713a and the receivers 711b to 713b are implemented as piezo-electric ceramics. The emitters 711a to 713a emit ultrasonic waves into space on the basis of signals output from the weather measuring circuit 719. The receivers 711b to 713b receive the ultrasonic waves that propagate in space, and output, to the weather measuring circuit 719, electronic signals corresponding to the received ultrasonic waves.

The receiver 711b of the weather measurement device 700 is capable of receiving the ultrasonic wave emitted from the emitter 711a, is separated a distance L from the emitter 711a and, also, is installed at a position where a direction from the emitter 711a toward the receiver 711b is the positive direction of the Xm axis of a coordinate system of the weather measurement device 700. In the present embodiment, a description is given in which the coordinate system of the weather measurement device 700 has the east direction as the positive direction of the Xm axis, the north direction as the positive direction of the Ym axis, and the vertical upward direction as the positive direction of the Zm axis. However, the present disclosure is not limited thereto.

The weather measuring circuit 719 includes a timekeeping circuit, which measures an amount of time Tx from a time at which a signal causing an ultrasonic wave to be emitted is output to the emitter 711a to a time at which the receiver 711b that receives the ultrasonic wave outputs a signal. Next, the weather measuring circuit 719 divides the distance L from the emitter 711a to the receiver 711b by the amount of time Tx to calculate a measurement speed Vx of the ultrasonic wave. Then, the weather measuring circuit 719 subtracts the speed of sound Vs from the measurement speed Vx to calculate the wind speed in the Xm axis direction of wind blowing above the port PT or above the port PT vicinity.

The receiver 712b of the weather measurement device 700 is capable of receiving the ultrasonic wave emitted from the emitter 712a, is separated the distance L from the emitter 712a and, also, is installed at a position where a direction from the emitter 712a toward the receiver 712b is the positive direction of the Ym axis of the coordinate system of the weather measurement device 700. The weather measuring circuit 719 calculates, on the basis of an amount of time Ty from a time at which the emitter 712a outputs a signal to a time at which the receiver 712b receives the signal, the distance L between the emitter 712a and the receiver 712b, and the speed of sound Vs, the wind speed in the Ym axis direction of wind blowing above.

The receiver 713b of the weather measurement device 700 is capable of receiving the ultrasonic wave emitted from the emitter 713a, is separated the distance L from the emitter 713a, and is installed at a position where a direction from the emitter 713a toward the receiver 713b is the positive direction of the Zm axis. The weather measuring circuit 719 calculates wind speed in the Zm axis direction of wind blowing above.

The weather measuring circuit 719 of the weather measurement device 700 measures the wind speed Vw above the port PT or above the port PT vicinity on the basis of the calculated wind speed in the Xm axis direction, the wind speed in the Ym axis direction, and the wind speed in the Zm axis direction. Next, the weather measuring circuit 719 outputs, to the CPU 701, a signal expressing the measured wind speed Vw, and the CPU 701 inputs that signal into the control device 900 via the input/output port 708.

The alert device 800 is installed at the port PT or the port PT vicinity, and is connected to the control device 900. The alert device 800 is controlled by the control device 900, and performs an alert related to landing of the aircraft 100 at the port PT and an alert related to takeoff of the aircraft 100 from the port PT.

In the present embodiment, the "alert related to landing of the aircraft 100 at the port PT" includes an alert informing of a command to depart from the port PT that is the location at which the aircraft 100 is scheduled to land or is the location at which the aircraft 100 is landed (hereinafter referred to as "departure command alert related to landing"). Likewise, the "alert related to takeoff of the aircraft 100 from the port PT" includes an alert informing of a command to depart from the port PT that is the location from which the aircraft 100 is scheduled to takeoff or is the location from which the aircraft 100 has taken off (hereinafter referred to as "departure command alert related to takeoff").

Figure 6:
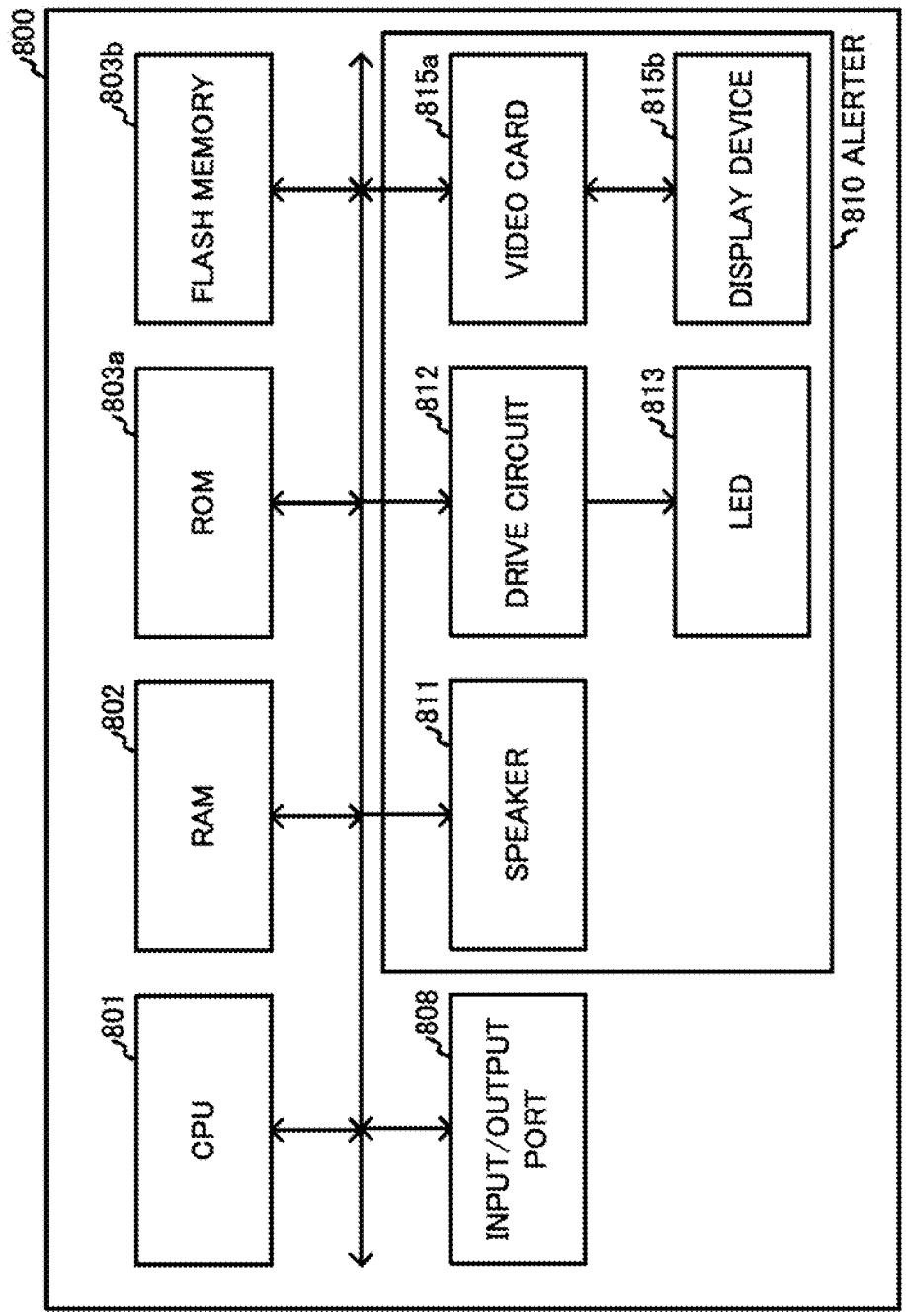
FIG. 6 is a hardware configuration diagram illustrating a configuration example of an alert device.

As illustrated in FIG. 6, the alert device 800 includes a CPU 801, a RAM 802, a ROM 803a, a flash memory 803b, an input/output port 808, and an alerter 810. In the present embodiment, a description is given in which the alert device 800 includes one CPU 801, but the present embodiment is not limited thereto and the alert device 800 may include a plurality of CPUs.

The configurations and functions of the CPU 801, the RAM 802, the ROM 803a, and the flash memory 803b of the alert device 800 are the same as the configurations and the functions of the CPU 111, the RAM 112, the ROM 113a, and the flash memory 113b of the control device 110 of the aircraft 100 illustrated in FIG. 3.

The input/output port 808 of the alert device 800 is connected to a non-illustrated cable, and inputs, into the CPU 801 of the alert device 800, control signals output from the control device 900 that is connected to that cable.

The alerter 810 includes a speaker 811, a drive circuit 812, a light emitting diode (LED) 813, a video card 815a, and a display device 815b.

The speaker 811 outputs, in accordance with the signal output by the CPU 801, audio used in the departure command alert related to landing or audio used in the departure command alert related to takeoff. In accordance with the signal output by the CPU 801, the drive circuit 812 causes the LED 813 to flash or light in a mode used in the departure command alert related to landing or takeoff.

The configurations and functions of the video card 815a and the display device 815b of the alerter 810 of the alert device 800 are the same as the configurations and functions of the video card 115a and the display device 115b of the control device 110 of the aircraft 100 illustrated in FIG. 3. The video card 815a outputs an image signal in accordance with the signal output by the CPU 801. The display device 815b outputs, in accordance with the image signal output by the video card 815a, an image used in the departure command alert related to landing or an image used in the departure command alert related to takeoff. The image used in the departure command alert related to landing may include a character string used in the departure command alert related to landing. Additionally, the image used in the departure command alert related to takeoff may include a character string used in the departure command alert related to takeoff.

Figure 7:
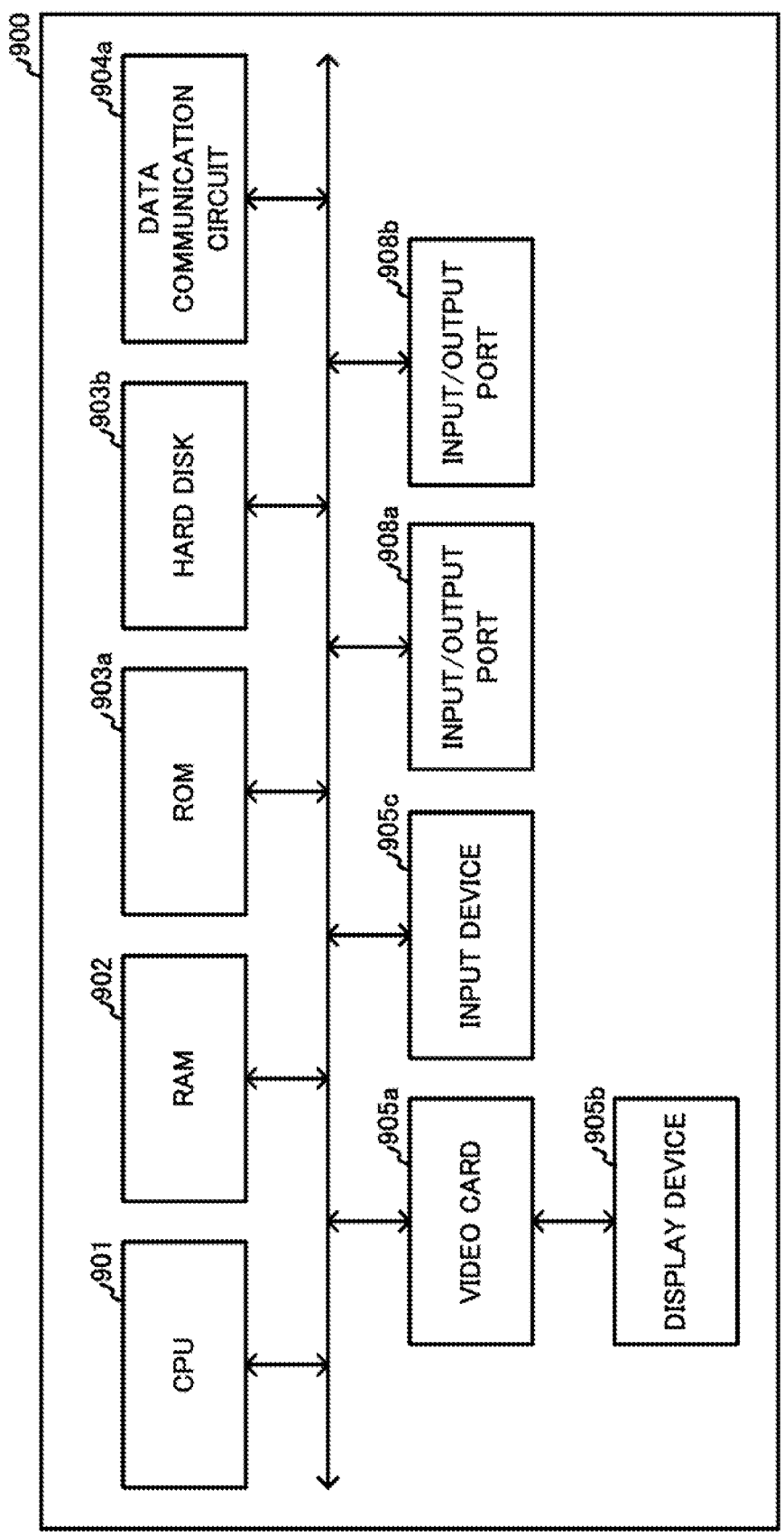
FIG. 7 is a hardware configuration diagram illustrating a configuration example of a control device.

The control device 900 is implemented as a server device and is installed at the port PT or the port PT vicinity. As illustrated in FIG. 7, the control device 900 includes a CPU 901, a RAM 902, a ROM 903a, a hard disk 903b, a data communication circuit 904a, a video card 905a, a display device 905b, an input device 905c, and input/output ports 908a and 908b. In the present embodiment, a description is given in which the control device 900 includes one CPU 901, but the present embodiment is not limited thereto and the control device 900 may include a plurality of CPUs.

The configurations and functions of the CPU 901, the RAM 902, the ROM 903a, the data communication circuit 904a, the video card 905a, the display device 905b, and the input device 905c of the control device 900 are the same as the configurations and functions of the CPU 111, the RAM 112, the ROM 113a, the data communication circuit 114a, the video card 115a, the display device 115b, and the input device 115c of the control device 110 of the aircraft 100 illustrated in FIG. 3.

The hard disk 903b of the control device 900 stores various types of data and tables in which data is stored that are used in the execution of the programs. The control device 900 may include flash memory instead of the hard disk 903b.

The data communication circuit 904a of the control device 900 carries out data communication with the aircraft 100 that is connected to the internet IN.

The input/output port 908a of the control device 900 is connected to a non-illustrated cable, and inputs, into the CPU 901 of the control device 900, the signal output from the weather measurement device 700 that is connected to that cable.

The input/output port 908b of the control device 900 is connected to a non-illustrated cable, and inputs the control signal output from the CPU 901 of the control device 900 into the alert device 800 that is connected to that cable.

Figure 8:
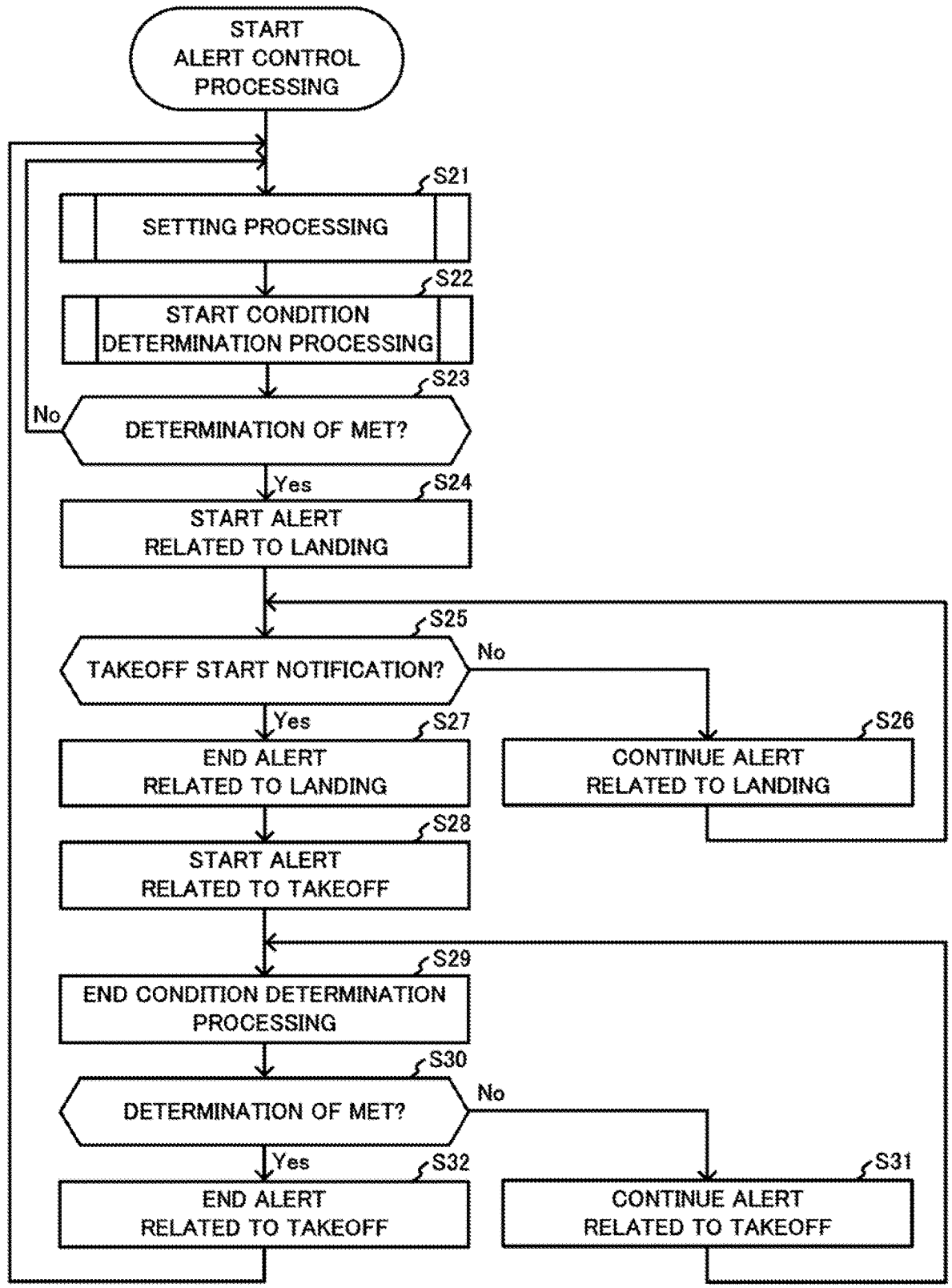
FIG. 8 is a flowchart illustrating an example of alert control processing executed by the control device.

When the control device 900 is started up, the CPU 901 of the control device 900 executes alert control processing such as illustrated in FIG. 8 for causing the alert device 800 to perform an alert related to landing or an alert related to takeoff of the aircraft 100, by a behavior corresponding to the weather measured by the weather measurement device 700.

In the present embodiment, "perform an alert by a behavior corresponding to the weather" includes starting an alert at a timing at which an alert start condition corresponding to the weather is met, and ending the alert at a timing at which an alert end condition corresponding to the weather is met.

The alert start condition corresponding to the weather is a condition that a positional relationship between the aircraft 100 and the port PT at which landing of the aircraft 100 is scheduled is a positional relationship corresponding to the weather. In the present embodiment, the "positional relationship between the aircraft 100 and the port PT" includes the distance between the port PT and the aircraft 100 and, also, the "positional relationship corresponding to the weather" includes a threshold CT set in accordance with the weather. As such, in the present embodiment, the alert start condition corresponding to the weather is a condition that the distance between the port PT and the aircraft 100 becomes less than or equal to the threshold CT set in accordance with the weather. Likewise, in the present embodiment, the alert end condition corresponding to the weather is a condition that the distance between the port PT and the aircraft 100 becomes greater than the threshold CT. Note that the distance between the port PT and the aircraft 100 is the distance between the aircraft 100 and a point closest to the aircraft 100 of a plurality of points included in the port PT.

Figure 9:
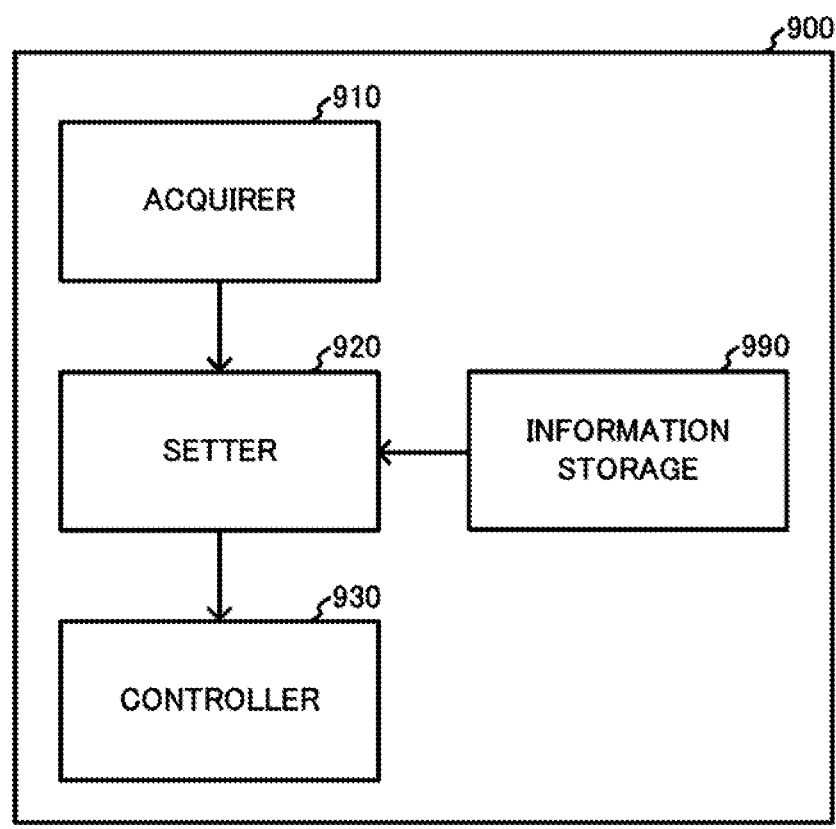
FIG. 9 is a functional block diagram illustrating an example of the functions of the control device.

As such, by executing the alert control processing, the CPU 901 of the control device 900 functions as an acquirer 910 such as illustrated in FIG. 9 that acquires weather information expressing the weather measured by the weather measurement device 700. Additionally, by changing the initial behavior of the alerter 810 in accordance with the weather, the CPU 901 functions as a setter 920 that sets the behavior of the alerter 810 corresponding to the weather. In one example, the "initial behavior" is a behavior that is predetermined, by a worker of the delivery company or a manager of the port PT, prior to the execution of the alert control processing. The CPU 901 further functions as a controller 930 that causes the alerter 810 of the alert device 800 to perform the behavior set by the setter 920.

In the present embodiment, the "behavior of the alerter 810 corresponding to the weather" includes the alerter 810 starting an alert at a timing at which the alert start condition corresponding to the weather is met, and the alerter 810 ending the alert at a timing at which the alert end condition corresponding to the weather is met. As such, the setter 920 changes, in accordance with the weather, the initial alert start condition predetermined prior to the execution of the alert control processing to set the alert start condition corresponding to the weather. Likewise, the setter 920 changes the initial alert end condition in accordance with the weather to set the alert end condition corresponding to the weather. Additionally, the controller 930 causes the alerter 810 to start the alert at the timing at which the alert start condition set by the setter 920 is met, and causes the alerter 810 to end the alert at the timing at which the alert end condition set by the setter 920 is met.

Figure 11:
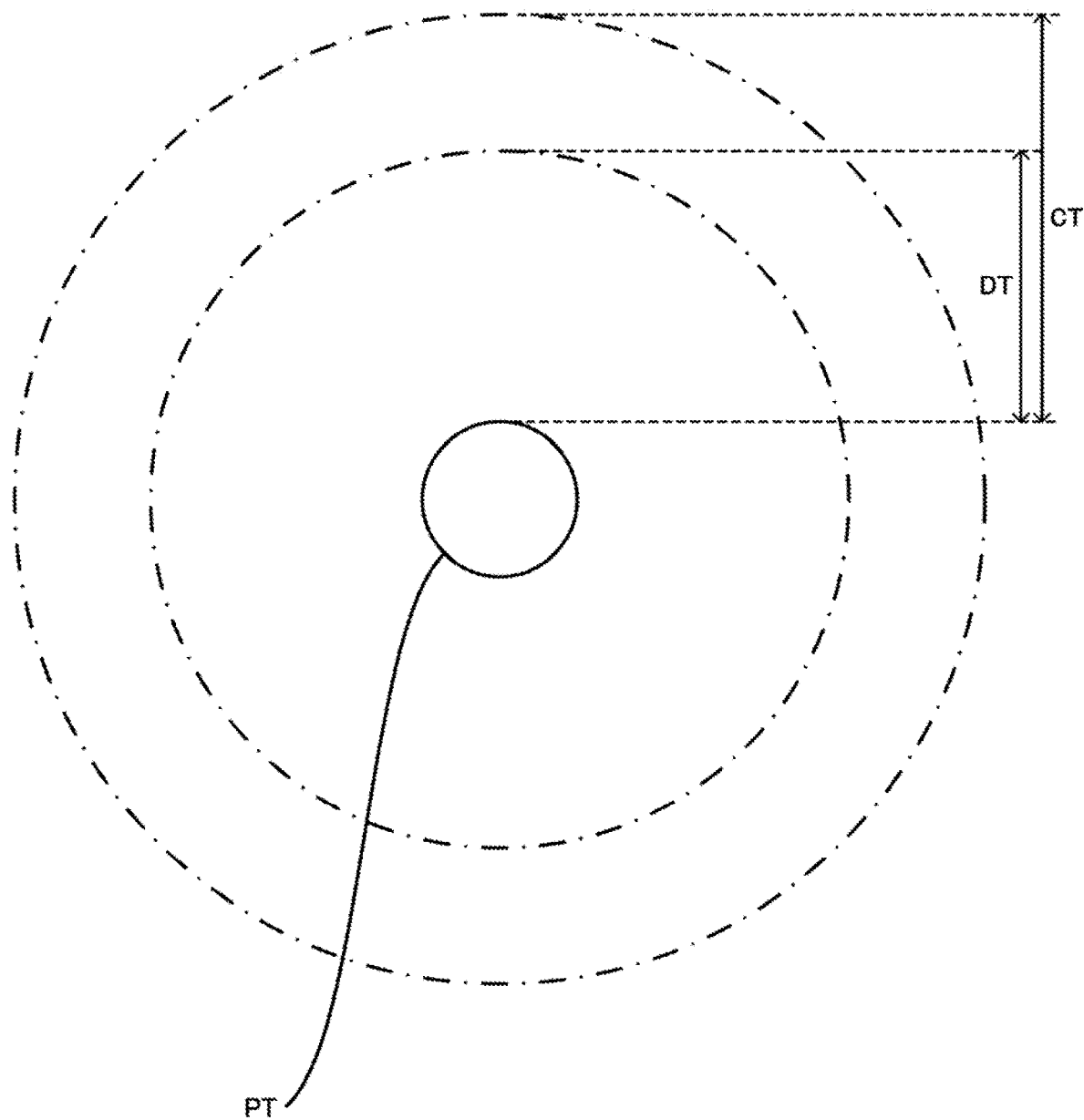
FIG. 11 is a drawing illustrating an example of an initial threshold and a threshold to be set.

The initial alert start condition is a condition that the distance between the port PT and the aircraft 100 becomes less than or equal to an initial threshold DT such as illustrated in FIG. 11, and the initial alert end condition is a condition that the distance between the port PT and the aircraft 100 becomes greater than the initial threshold DT.

The initial threshold DT may be any value provided that it is a predetermined positive number. In the present embodiment, the initial threshold DT is preset to a distance such as expressed by Equation (1) below.

$$DT = Va \times Te \quad (1)$$

Here, DT is the initial threshold, Va is the airspeed of the aircraft 100, and Te is a predetermined amount of time.

The initial threshold DT is set to such a distance because, if the flight route is in a windless state, the ground speed and the airspeed Va will be equivalent, and the aircraft 100 will require the amount of time Te to fly the distance of the threshold DT. Te may be any amount of time provided that is a predetermined amount of time. In the present embodiment, Te is an amount of time predetermined as the amount of time required to depart from the port PT. A person skilled in the art can determine, by experiment, the optimal value for the amount of time Te.

As such, when the alert is started at a timing at which the distance between the port PT and the aircraft 100 becomes less than or equal to the threshold DT, the alert is started, by the amount of time Te required to depart from the port PT, earlier than the timing at which the aircraft 100 is expected to arrive above the port PT. Additionally, when the alert is ended at the timing at which the distance between the port PT and the aircraft 100 becomes greater than the threshold DT, even in a case in which, for example, a person has entered the port PT after the alert has ended and the aircraft 100 returns to the port PT due to a breakdown, the alert can be restarted sufficiently early at the timing at which the distance between the port PT and the aircraft 100 becomes less than or equal to the threshold DT.

The hard disk 903b of the control device 900 functions as an information storage 990 in which information expressing the initial threshold DT is stored in advance.

Figure 10:
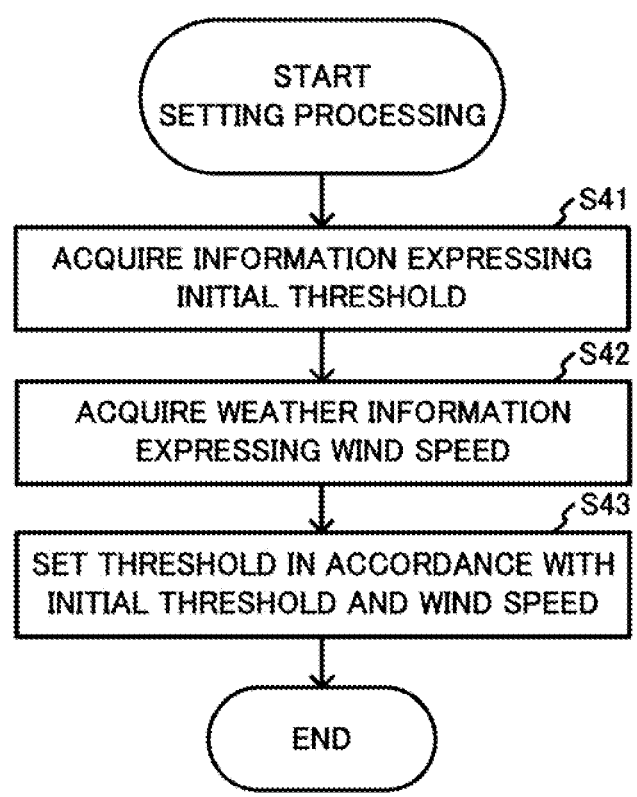
FIG. 10 is a flowchart illustrating an example of setting processing executed by the control device according to Embodiment 1.

When the execution of the alert control processing of FIG. 8 starts, the CPU 901 of the control device 900 executes setting processing such as illustrated in FIG. 10 for setting the alert start condition and the alert end condition of the alert device 800 (step S21).

When the execution of the setting processing starts, the acquirer 910 of the control device 900 acquires the information expressing the initial threshold DT from the information storage 990 (step S41). Next, the acquirer 910 acquires, on the basis of a signal input from the input/output port 908a, the weather information expressing the wind speed Vw measured by the weather measurement device 700 (step S42).

Thereafter, the setter 920 of the control device 900 sets, in accordance with the initial threshold DT and the wind speed Vw expressed in the weather information, a threshold CT for determining the alert start condition and the alert end condition to be set in the alert device 800 (step S43) and, then, ends the execution of the setting processing.

In step S43, the value to which the setter 920 of the control device 900 sets the threshold CT increases as the wind speed Vw increases. In the present embodiment, the setter 920 uses equation (2) below to multiply the initial threshold DT by a coefficient "1+Vw/Va" to calculate a value obtained by changing the initial threshold DT, and sets the calculated value as the threshold CT.

$$CT = (1 + Vw/Va) \times DT = (Va + Vw) \times Te \quad (2)$$

Here, CT is the threshold to be set, Vw is the measured wind speed, Va is the airspeed of the aircraft 100, DT is the initial threshold, and Te is the amount of time required to depart from the port PT.

In the present embodiment, the initial threshold DT is a value that is obtained by multiplying the airspeed Va of the aircraft 100 by the amount of time Te required to depart from the port PT. As such, the threshold CT that is obtained by multiplying the initial threshold DT by the coefficient "1+Vw/Va" is, as illustrated above in equation (2), equivalent to a value obtained by multiplying a maximum value "Va+Vw" of the ground speed achieved when the aircraft 100 has a tailwind by the amount of time Te required to depart. As such, the timing at which the alert start condition determined by the threshold CT is met is a timing that is the amount of time Te required to depart from the port PT or longer before the timing at which the aircraft 100 is expected to arrive above the port PT in a case in which the aircraft 100 flies continuously at the fastest ground speed possible.

Figure 12:
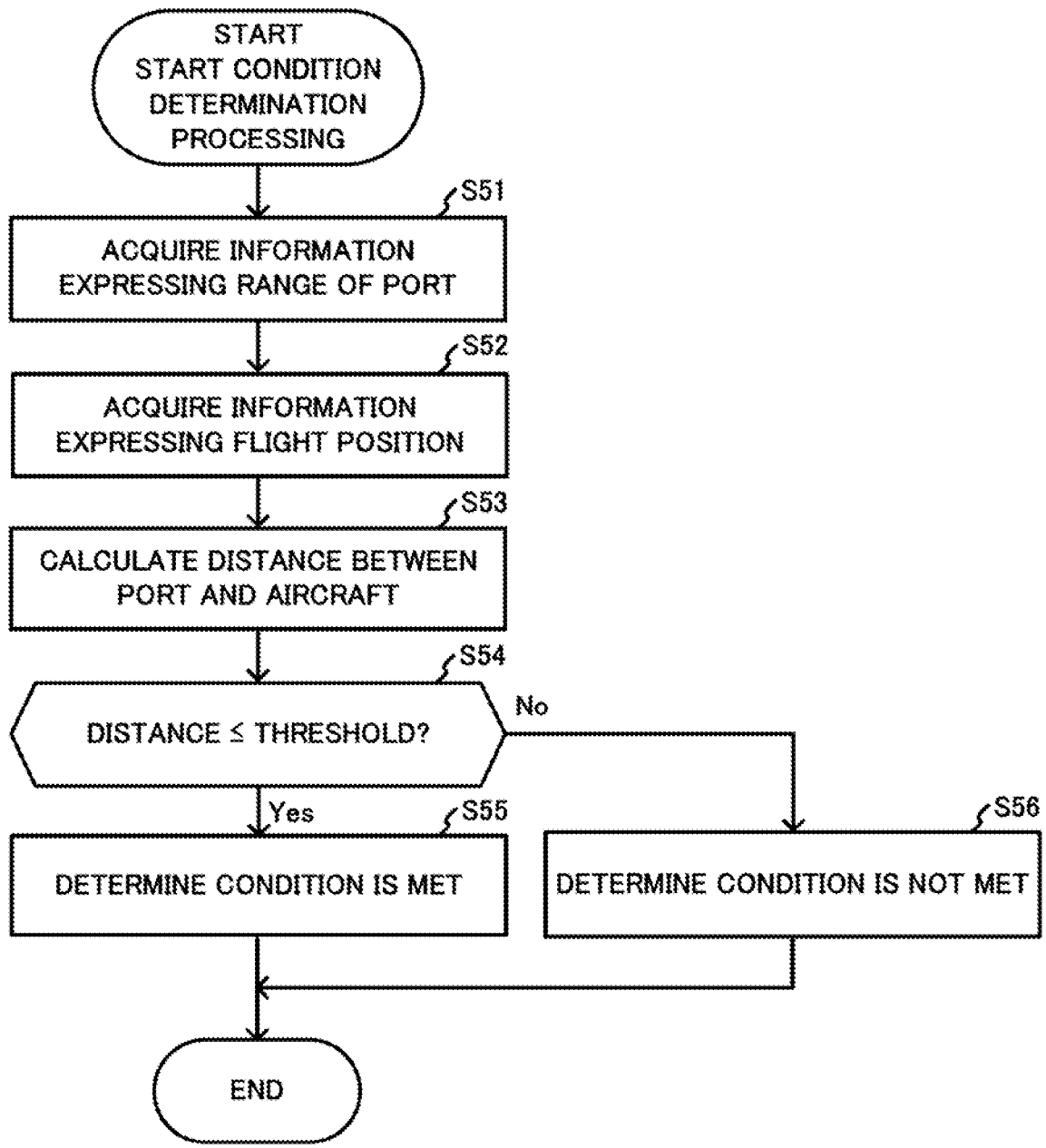
FIG. 12 is a flowchart illustrating an example of start condition determination processing executed by the control device according to Embodiment 1.

The setter 920 of the control device 900 sets the threshold CT in step S21 of FIG. 8 and, then, sets the alert start condition to the condition that the distance between the port PT and the aircraft 100 becomes less than or equal to the threshold CT. Additionally, the setter 920 sets the alert end condition to the condition that the distance between the port PT and the aircraft 100 becomes greater than the threshold CT. Then, start condition determination processing such as illustrated in FIG. 12 for determining whether or not the set alert start condition is met is executed (step S22).

When the execution of the start condition determination starts, the acquirer 910 of the control device 900 acquires the information expressing the range of the port PT stored in advance in the information storage 990 (step S51).

In the present embodiment, a description is given in which the shape of the port PT is circular. As such, the information expressing the range of the port PT includes information expressing the latitude, longitude, and altitude of a center point of the port PT, and information expressing a radius DP.

Next, when the data communication circuit 904a receives the information expressing the flight position of the aircraft 100 by latitude, longitude, and altitude, the acquirer 910 of the control device 900 acquires that information from the data communication circuit 904a (step S52).

Thereafter, the controller 930 of the control device 900 calculates the distance between the port PT and the aircraft 100 on the basis of the information expressing the range of the port PT and the latitude, longitude, and altitude of the flight position (step S53).

Next, the controller 930 of the control device 900 determines whether or not the distance between the port PT and the aircraft 100 calculated in step S53 is less than or equal to the threshold CT set in step S43 of FIG. 10 (step S54).

At this time, when the controller 930 determines that the calculated distance is less than or equal to the threshold CT (step S54; Yes), the controller 930 determines that the alert start condition is met (step S55) and, then, ends the execution of the start condition determination processing.

In contrast, when the controller 930 of the control device 900 determines that the distance between the port PT and the aircraft 100 is greater than the threshold CT (step S54; No), the controller 930 determines that the alert start condition is not met (step S56) and, then, ends the execution of the start condition determination processing.

In the start condition determination processing executed in the step S22 of FIG. 8, when a determination is made that the alert start condition is not met (step S23; No), the processing is repeated from step S21. In contrast, when a determination is made that the alert start condition is met (step S23; Yes), the controller 930 of the control device 900 outputs, to the alert device 800 via the input/output port 908b, a control signal for starting the departure command alert related to landing. As a result, the controller 930 causes the alert device 800 to start an alert related to landing (step S24).

When the input/output port 808 of the alert device 800 inputs the control signal, the CPU 801 of the alert device 800 causes the alerter 810 to start the departure command alert related to landing. In accordance with a signal output by the CPU 801, the speaker 811 of the alerter 810 starts outputting the audio used in the departure command alert related to landing. Additionally, in accordance with a signal output by the CPU 801, the drive circuit 812 of the alerter 810 causes the LED 813 to start flashing or lighting in a mode used in the departure command alert related to landing. Furthermore, the display device 815b of the alerter 810 starts to display the image used in the departure command alert related to landing.

Next, the controller 930 of the control device 900 determines whether or not a takeoff start notification is received by the data communication circuit 904a (step S25). At this time, when the controller 930 determines that a takeoff start notification is not received (step S25; No), the controller 930 causes the alert device 800 to continue the alert related to landing (step S26). The alerter 810 of the alert device 800 continues the departure command alert related to landing in accordance with the control of the control device 900. Then, the controller 930 repeats the processing from step S25.

In step S25, when the controller 930 of the control device 900 determines that a takeoff start notification is received (step S25; Yes), the controller 930 causes the alert device 800 to end the alert related to landing (step S27). The alerter 810 of the alert device 800 ends the departure command alert related to landing in accordance with the control of the control device 900.

Next, the controller 930 of the control device 900 causes the alert device 800 to start the departure command alert related to takeoff (step S28). The alerter 810 of the alert device 800 starts the departure command alert related to takeoff in accordance with the control of the control device 900.

Thereafter, non-illustrated end condition determination processing for determining whether or not the alert end condition set in step S21 is met is executed (step S29). When the end condition determination processing starts, the acquirer 910 of the control device 900 acquires information expressing a new flight position from the data communication circuit 904a. Then, the controller 930 calculates the distance between the port PT and the aircraft 100 on the basis of the acquired information expressing the new flight position and the information expressing the range of the port PT, and determines whether or not the calculated distance is greater than the threshold CT.

At this time, when the controller 930 of the control device 900 determines that the calculated distance is less than or equal to the threshold CT, the controller 930 determines that the alert end condition is not met and, then, ends the execution of the end condition determination processing. In contrast, when the controller 930 determines that the calculated distance is greater than the threshold CT, the controller 930 determines that the alert end condition is met and, then, ends the execution of the end condition determination processing.

In the end condition determination processing executed in step S29, when a determination is made that the alert end condition is not met (step S30; No), the controller 930 of the control device 900 causes the alert device 800 to continue the departure command alert related to takeoff (step S31). The alerter 810 of the alert device 800 continues the departure command alert related to takeoff in accordance with the control of the control device 900. Then, the controller 930 repeats the processing from step S29.

In contrast, when a determination is made that the alert end condition is met (step S30; Yes), the controller 930 of the control device 900 causes the alert device 800 to end the departure command alert related to takeoff (step S32). The alerter 810 of the alert device 800 ends the departure command alert related to takeoff in accordance with the control of the control device 900.

Thereafter, the processing is repeated from step S21. Thus, for example, when the aircraft 100 approaches the port PT to deliver a new article to the port PT or to return and land at the port PT due to a breakdown, for example, and the alert start condition corresponding to the weather is met again, the control device 900 causes the alert device 800 to restart the departure command alert related to landing.

According to these configurations, the alert system 1 includes the weather measurement device 700, the alert device 800, and the control device 900. The weather measurement device 700 measures the weather related to the port PT that is the scheduled landing location at which landing of the aircraft 100 is scheduled. Additionally, the control device 900 includes the acquirer 910 that acquires the weather information expressing the measured weather. Furthermore, the control device 900 includes a controller 930 that causes the alerter 810 of the alert device 800, which performs the alert related to the landing of the aircraft 100 at the port PT, to perform a behavior corresponding to the weather expressed in the acquired weather information. As such, the control device 900 can cause the alerter 810 to perform a sufficient alert that corresponds to the weather. Additionally, since the alert device 800 is installed at the port PT or the port PT vicinity, it is possible to sufficiently perform, to a person at the port PT or the port PT vicinity and in accordance with the weather, an alert related to the landing of the aircraft 100 at the port PT. Therefore, the alert system 1 can sufficiently prevent, in accordance with the weather, physical contact between the aircraft 100 and a person at the port PT or the port PT vicinity.

According to these configurations, the behavior corresponding to the weather includes starting an alert at the timing at which the alert start condition corresponding to the weather is met, the alert start condition is a condition related to the positional relationship between the port PT and the aircraft 100, and the weather includes the wind speed related to the port PT. Additionally, the control device 900 includes the setter 920 that sets the alert start condition in accordance with the wind speed Vw expressed in the weather information, and the controller 930 causes the alerter 810 of the alert device 800 to start the alert at the timing at which the set alert start condition is met. As such, the control device 900 can cause an alert related to landing of the aircraft 100 at the port PT to be started at an appropriate timing corresponding to the measured wind speed Vw, even if the aircraft 100 is affected by the wind and the ground speed of the aircraft 100 changes.

According to these configurations, the setter 920 of the control device 900 sets, as the threshold CT, a value obtained by multiplying the amount of time Te, which is predetermined as the amount of time required to depart from the port PT, by the sum "Vw+Va" of the wind speed Vw expressed in the weather information and the predetermined airspeed Va of the aircraft 100. Additionally, the controller 930 of the control device 900 causes the alert device 800 to start the departure command alert related to landing when the alert start condition that the distance between the port PT and the aircraft 100 becomes less than or equal to the threshold CT is met. As such, even in a case in which the aircraft 100 has a tailwind and, thus, flies continuously at the fastest ground speed possible (Vw+Va), the control device 900 can cause the departure command alert related to landing to be started at a timing that is the amount of time Te required to depart from the port PT or longer earlier than the timing at which the aircraft 100 is scheduled to arrive above the port PT. Therefore, the control device 900 can inform a person at the port PT at a sufficiently early timing that departure from the port PT is commanded and, as such, can sufficiently prevent physical contact between the person at the port PT and the aircraft 100.

According to these configurations, the weather measurement device 700 measures the weather related to the port PT that is the scheduled takeoff location from which takeoff of the aircraft 100 is scheduled. Additionally, the acquirer 910 of the control device 900 acquires the weather information expressing the measured weather, and the controller 930 causes the alerter 810 of the alert device 800 to perform an alert related to the takeoff of the aircraft 100 from the port PT, by a behavior that corresponds to the weather expressed in the acquired weather information. As such, the control device 900 can cause the alerter 810 to sufficiently perform, in accordance with the weather, an alert related to the takeoff of the aircraft 100.

According to these configurations, the setter 920 of the control device 900 changes the predetermined behavior of the alerter 810 in accordance with the weather expressed in the acquired weather information, and the controller 930 causes the alerter 810 to perform the changed behavior. As such, the control device 900 can cause the alerter 810 to perform a more sufficient alert compared to a case in which the alerter 810 is caused to perform the predetermined alert regardless of the weather.

Modified Example 1 of Embodiment 1

Figure 13:
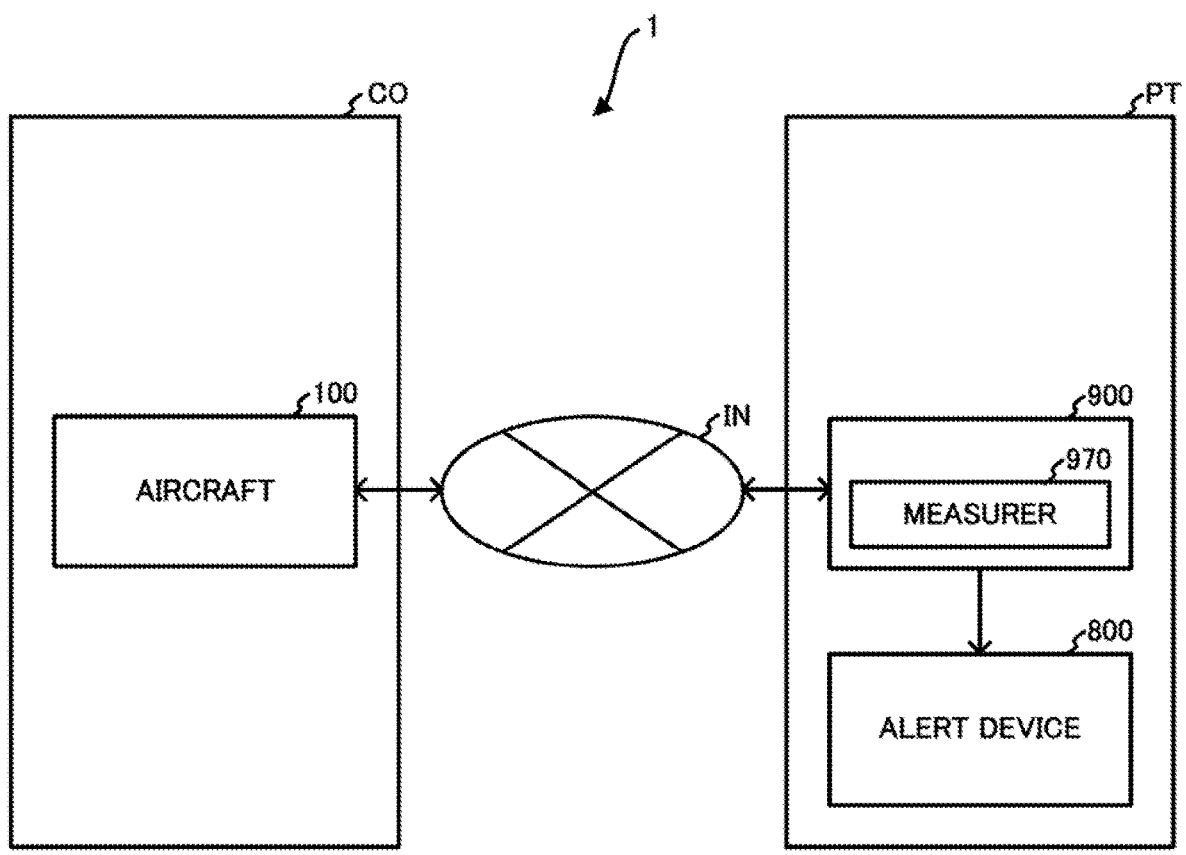
FIG. 13 is a system configuration drawing illustrating a configuration example of an alert system according to Modified Example 1 of Embodiment 1.

In Embodiment 1, a description is given in which the alert system 1 illustrated in FIG. 1 includes the aircraft 100, the weather measurement device 700, the alert device 800, and the control device 900. However, the present disclosure is not limited thereto. As illustrated in FIG. 13, the alert system 1 according to the present modified example includes the aircraft 100, the alert device 800, and the control device 900, but does not include the weather measurement device 700.

The control device 900 according to the present modified example includes a measurer 970 that has the configuration and functions of the measurer 710 illustrated in FIG. 5. The acquirer 910 of the control device 900 illustrated in FIG. 9 acquires, on the basis of a signal output from the measurer 970, weather information expressing the wind speed Vw measured by the measurer 970.

Modified Example 2 of Embodiment 1

Figure 14:
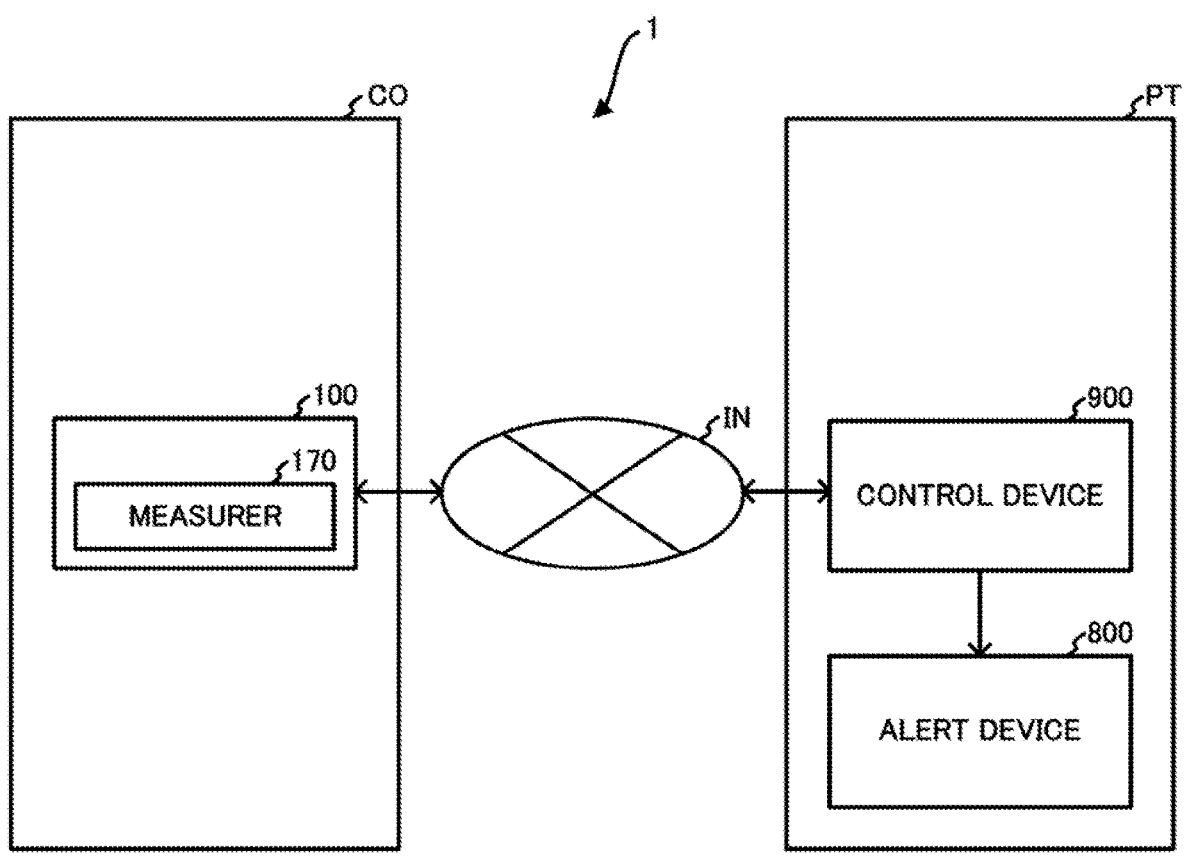
FIG. 14 is a system configuration drawing illustrating a configuration example of an alert system according to Modified Example 2 of Embodiment 1.

In Embodiment 1, a description is given in which the alert system 1 illustrated in FIG. 1 includes the aircraft 100, the weather measurement device 700, the alert device 800, and the control device 900. However, the present disclosure is not limited thereto. As illustrated in FIG. 14, the alert system 1 according to the present modified example includes the aircraft 100, the alert device 800, and the control device 900, but does not include the weather measurement device 700. Additionally, in the present modified example, the CPU 111 of the aircraft 100 illustrated in FIG. 3 functions as a measurer 170 that has the same functions as the functions of the measurer 710 of the weather measurement device 700 illustrated in FIG. 5.

In Embodiment 1, a description is given in which the phrase "the weather related to the port PT" includes the wind speed Vw above the port PT or above the port PT vicinity. However, in the present modified example, the phrase "the weather related to the port PT" includes the wind speed Vw on the flight route leading to the port PT.

In step S03 of FIG. 4, the CPU 111 of the aircraft 100 according to the present modified example generates two threads that differ from the thread in which the flight control processing is executed. Then, in one of the two generated threads, the CPU 111 of the aircraft 100 starts the execution of the position output processing described in Embodiment 1. Additionally, in the other of the two generated threads, the CPU 111 of the aircraft 100 starts non-illustrated weather output processing for outputting the weather information expressing the wind speed Vw on the flight route leading to the port PT.

When the execution of the weather output processing starts, the measurer 170 of the aircraft 100 executes processing for identifying the airspeed Va of the aircraft 100 on the basis of a signal output from the airspeed sensor 117 of the aircraft 100. Next, the measurer 170 of the aircraft 100 executes processing for identifying the ground speed of the aircraft 100.

In the processing for measuring the ground speed, firstly, the measurer 170 of the aircraft 100 acquires the flight position of the aircraft 100 on the basis of a signal output from the position measurement circuit 116. Next, the measurer 170 acquires the flight position of the aircraft 100 again, at a time when a predetermined amount of time has elapsed from the time at which the flight position is firstly acquired. Then, the measurer 170 calculates the distance from the firstly acquired flight position to the subsequently acquired flight position, and divides the calculated distance by the predetermined amount of time to identify the ground speed of the aircraft 100.

Next, the measurer 170 of the aircraft 100 executes processing for subtracting the identified airspeed Va of the aircraft 100 from the identified ground speed of the aircraft 100 to measure the wind speed Vw on the flight route on which the aircraft 100 flies. Then, the measurer 170 executes processing for generating weather information expressing the measured wind speed Vw, and outputting the generated weather information to the data communication circuit 114a with the communication address of the control device 900 as the destination. Then, until the execution of the weather output processing ends in step S12 of FIG. 4, the measurer 170 repeats the processing described above from the processing for identifying the airspeed Va of the aircraft 100.

In step S42 of FIG. 10, the acquirer 910 of the control device 900 according to the present modified example acquires the weather information that the data communication circuit 904a of the control device 900 receives from the aircraft 100.

According to these configurations, the alert system 1 includes the aircraft 100, the alert device 800, and the control device 900, but does not include the weather measurement device 700. Additionally, the acquirer 910 of the control device 900 acquires the weather information expressing the wind speed Vw measured by the measurer 170 of the aircraft 100. Furthermore, the controller 930 of the control device 900 causes the alerter 810 of the alert device 800 to perform a behavior corresponding to the wind speed Vw expressed in the acquired weather information. As such, even if an additional port at which the aircraft 100 lands and takes off is installed, and a weather measurement device 700 is not installed at the additionally installed port or the additionally installed port vicinity, as long as the alert device 800 and the control device 900 are provided, the alert system 1 can perform, even at the additionally installed port, an alert related to landing of the aircraft 100 by a behavior corresponding to the wind speed Vw measured by the aircraft 100. As such, the alert system 1 can perform sufficient alerts corresponding to the weather at the additionally installed port while suppressing increases in manufacturing costs, increases in installation costs, increases in maintenance costs, and increases in operating costs of the alert system 1 caused by the installation of additional ports.

According to these configurations, the setter 920 of the control device 900 sets the threshold CT on the basis of the wind speed Vw on the flight route on which the aircraft 100 flies. Additionally, the controller 930 of the control device 900 causes the alert device 800 to start the departure command alert when the alert start condition that the distance between the port PT and the aircraft 100 becomes less than or equal to the threshold CT. Since the ground speed of the aircraft 100 changes due to the wind speed Vw on the flight route on which the aircraft 100 flies, the control device 900 according to the present modified example can cause the alerter 810 to start the departure command alert at a more appropriate timing than the control device 900 according to Embodiment 1 that sets the threshold CT using the wind speed Vw above the port PT or above the port PT vicinity.

Modified Example 3 of Embodiment 1

Figure 15:
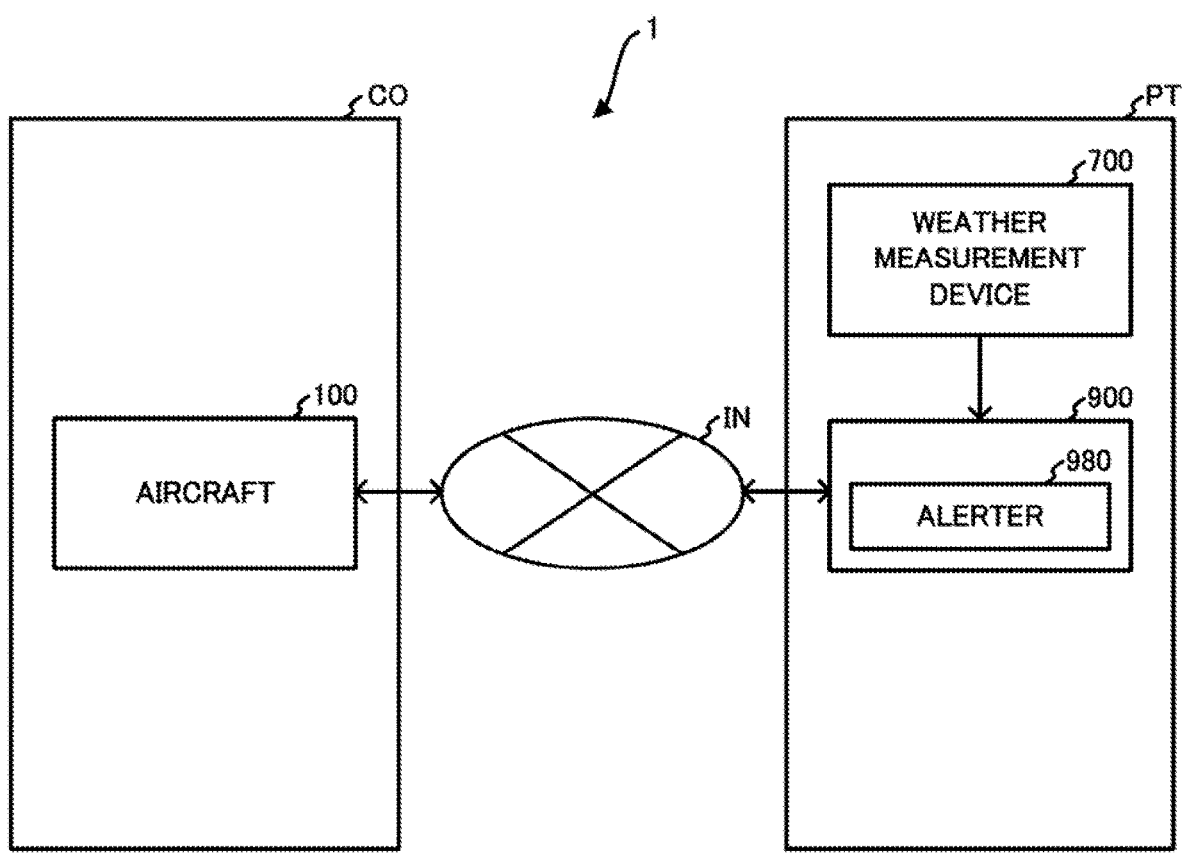
FIG. 15 is a system configuration drawing illustrating a configuration example of an alert system according to Modified Example 3 of Embodiment 1.

In Embodiment 1, a description is given in which the alert system 1 illustrated in FIG. 1 includes the aircraft 100, the weather measurement device 700, the alert device 800, and the control device 900. However, the present disclosure is not limited thereto. As illustrated in FIG. 15, the alert system 1 according to the present modified example includes the aircraft 100, the weather measurement device 700, and the control device 900, but does not include the alert device 800.

The control device 900 according to the present modified example includes an alerter 980 that has the same configuration and functions as the configuration and functions of the alerter 810 illustrated in FIG. 6. The controller 930 of the control device 900 causes the alerter 980 to perform the behavior corresponding to the weather expressed in the weather information.

Modified Example 4 of Embodiment 1

Figure 16:
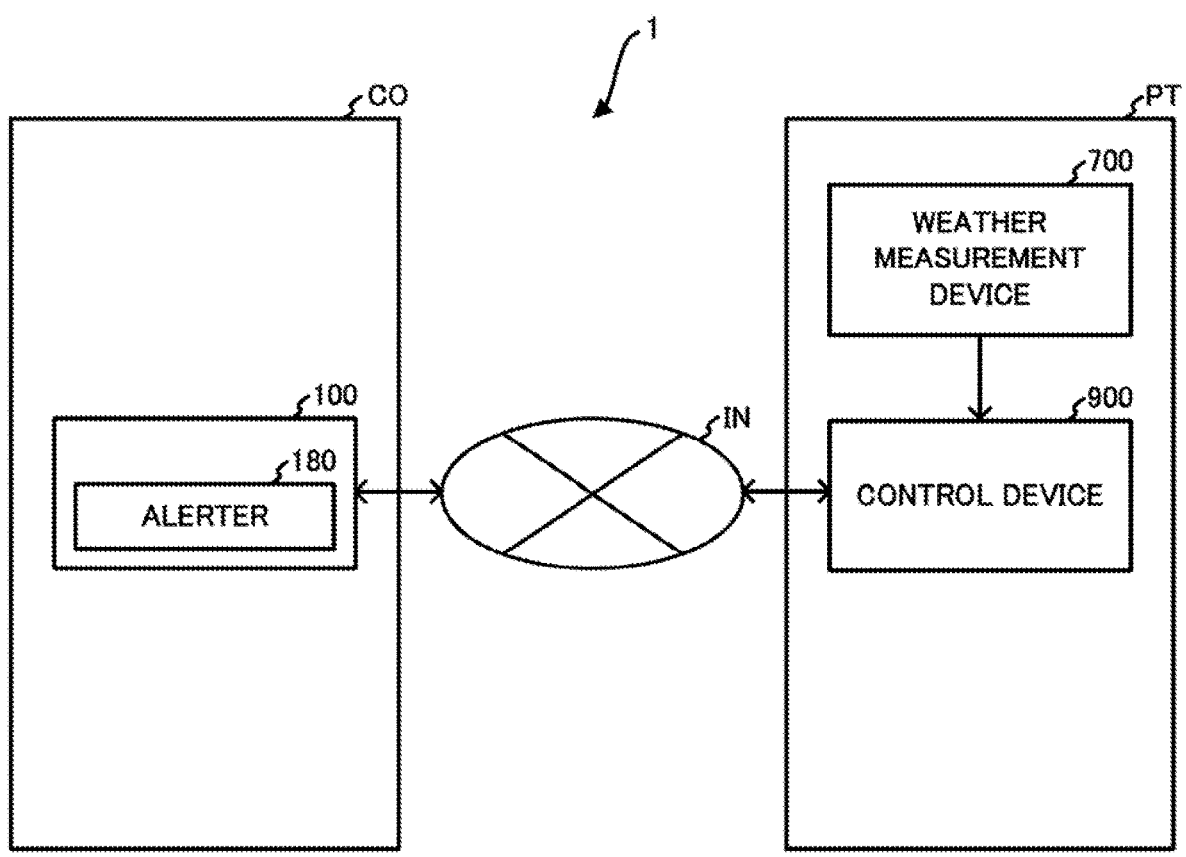
FIG. 16 is a system configuration drawing illustrating a configuration example of an alert system according to Modified Example 4 of Embodiment 1.

In Embodiment 1, a description is given in which the alert system 1 illustrated in FIG. 1 includes the aircraft 100, the weather measurement device 700, the alert device 800, and the control device 900. However, the present disclosure is not limited thereto. As illustrated in FIG. 16, the alert system 1 according to the present modified example includes the aircraft 100, the weather measurement device 700, and the control device 900, but does not include the alert device 800.

The control device 110 of the aircraft 100 according to the present modified example includes an alerter 180 that has the same configuration and functions as the configuration and functions of the alerter 810 of the alert device 800 illustrated in FIG. 6. Furthermore, the controller 930 of the control device 900 according to the present modified example causes the alerter 180 of the aircraft 100 to perform the behavior corresponding to the weather expressed in the weather information.

As such, in step S24 of FIG. 8, the controller 930 of the control device 900 outputs, to the data communication circuit 904a with the aircraft 100 as the destination, a command commanding starting of the departure command alert related to landing. When the data communication circuit 114a of the aircraft 100 receives that command, the CPU 111 of the aircraft 100 causes the alerter 180 to start the departure command alert.

Additionally, in steps S26 and S27 of FIG. 8, the controller 930 of the control device 900 outputs, to the data communication circuit 904a with the aircraft 100 as the destination, a command commanding continuation of the departure command alert related to landing and a command commanding ending of the departure command alert related to landing. When the data communication circuit 114a of the aircraft 100 receives these commands, the CPU 111 of the aircraft 100 causes the alerter 180 to continue and stop the departure command alert related to landing.

Furthermore, in steps S28, S31, and S32 of FIG. 8, the controller 930 of the control device 900 outputs a command commanding starting of the departure command alert related to takeoff, a command commanding continuation of the departure command alert related to takeoff, and a command commanding ending of the departure command alert related to takeoff. In accordance with these commands, the CPU 111 of the aircraft 100 causes the alerter 180 to start, continue, and end the departure command alert related to takeoff.

According to these configurations, the alert system 1 includes the aircraft 100, the weather measurement device 700, and the control device 900, but does not include alert device 800. Additionally, the controller 930 of the control device 900 causes the alerter 180 of the aircraft 100 to perform a behavior corresponding to the wind speed Vw expressed in the weather information. As such, even if an additional port at which the aircraft 100 lands and takes off is installed, and an alert device 800 is not installed at the additionally installed port, the alert system 1 can perform an alert using the alerter 180 of the aircraft 100 flying toward the additionally installed port. As such, the alert system 1 can perform sufficient alerts corresponding to the wind speed Vw at additionally installed ports while suppressing increases in manufacturing costs, increases in installation costs, increases in maintenance costs, and increases in operating costs of the alert system 1 caused by the installation of additional ports.

Modified Example 5 of Embodiment 1

Figure 17:
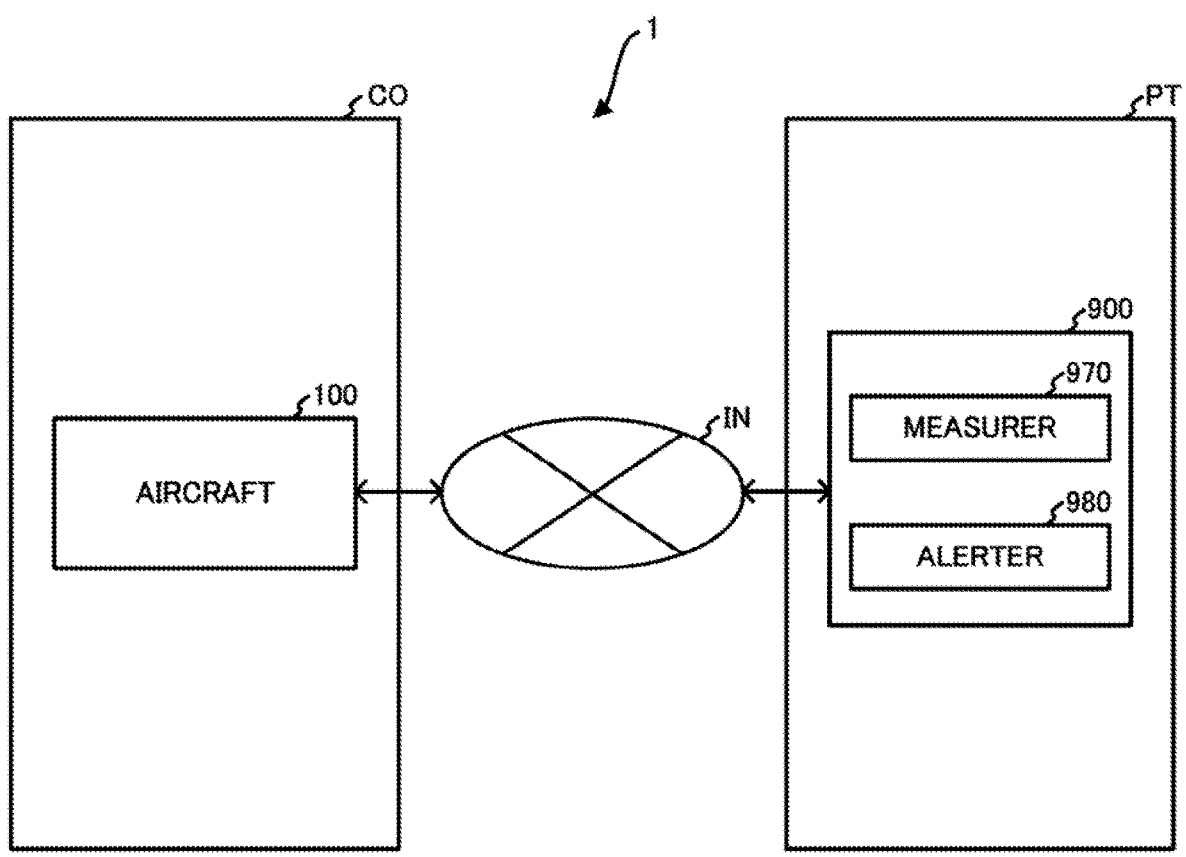
FIG. 17 is a system configuration drawing illustrating a configuration example of an alert system according to Modified Example 5 of Embodiment 1.

Modified Example 1 of Embodiment 1 and Modified Example 3 of Embodiment 1 can be combined with each other. The present modified example is a combination of Modified Example 1 of Embodiment 1 and Modified Example 3 of Embodiment 1. As illustrated in FIG. 17, the alert system 1 according to the present modified example includes the aircraft 100 and the control device 900, but does not include the weather measurement device 700 and the alert device 800.

The control device 900 according to the present modified example includes the measurer 970 described in Modified Example 1 of Embodiment 1 and the alerter 980 described in Modified Example 3 of Embodiment 1. The acquirer 910 of the control device 900 according to the present modified example acquires, on the basis of a signal output from the measurer 970, the weather information expressing the wind speed Vw measured by the measurer 970, and the controller 930 causes the alerter 980 to perform the behavior corresponding to the wind speed Vw expressed in the acquired weather information.

Modified Example 6 of Embodiment 1

Figure 18:
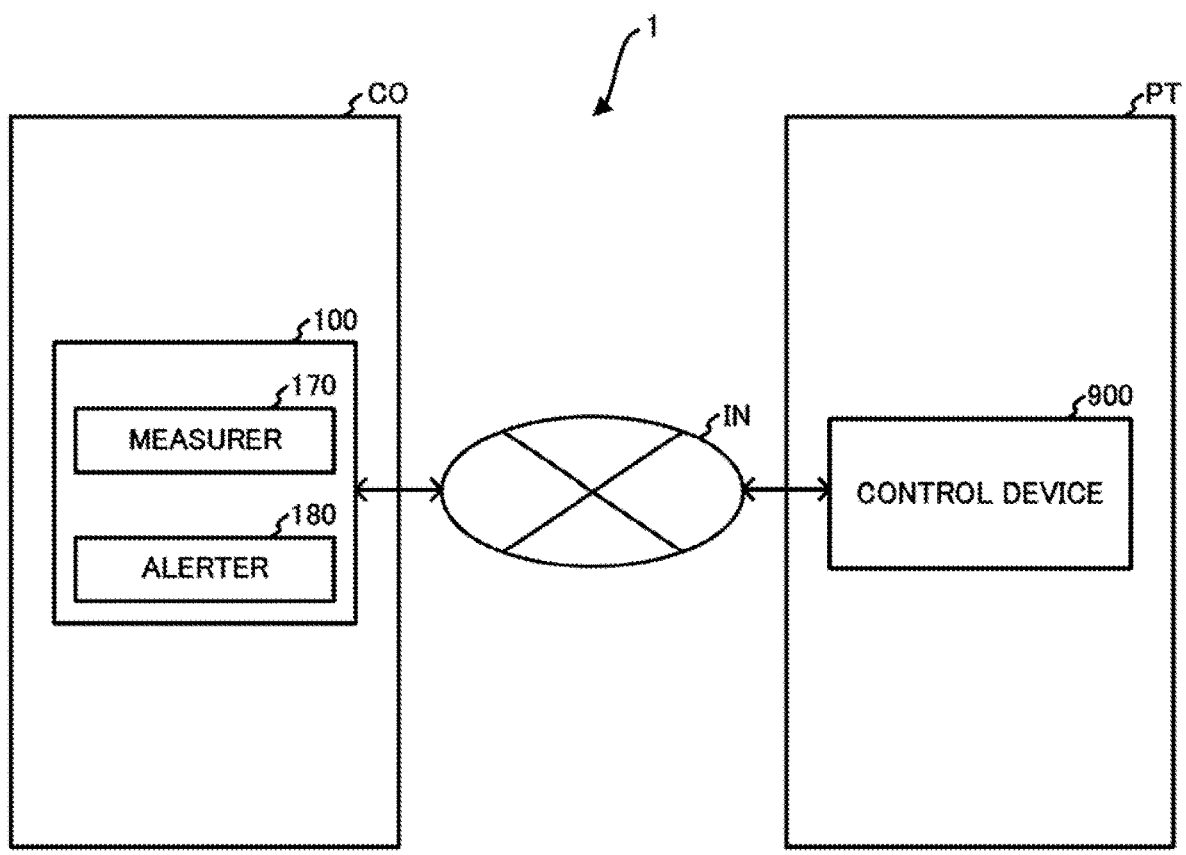
FIG. 18 is a system configuration drawing illustrating a configuration example of an alert system according to Modified Example 6 of Embodiment 1.

Modified Example 2 of Embodiment 1 and Modified Example 4 of Embodiment 1 can be combined with each other. The present modified example is a combination of Modified Example 2 of Embodiment 1 and Modified Example 4 of Embodiment 1. As illustrated in FIG. 18, the alert system 1 according to the present modified example includes the aircraft 100 and the control device 900, but does not include the weather measurement device 700 and the alert device 800.

The aircraft 100 according to the present modified example includes the measurer 170 described in Modified Example 2 of Embodiment 1 and the alerter 180 described in Modified Example 4 of Embodiment 1. The aircraft 100 according to the present modified example measures the airspeed Va using the measurer 170, sends weather information expressing the wind speed Vw measured on the basis of the airspeed Va to the control device 900 and, then, receives a command from the control device 900, and uses the alerter 180 to perform an alert in accordance with the received command.

The acquirer 910 the control device 900 according to the present modified example acquires, from the data communication circuit 904a, the weather information received from the aircraft 100, and the controller 930 outputs, to the data communication circuit 904a with the aircraft 100 as the destination, a command for causing the alerter 180 of the aircraft 100 to perform the behavior corresponding to the wind speed Vw expressed in the acquired weather information.

Modified Example 7 of Embodiment 1

In Embodiment 1, a description is given in which the initial threshold DT is preset to a distance expressed by Equation (1) above. Additionally, a description is given in which the setter 920 of the control device 900 uses Equation (2) above to set the threshold CT to a value that corresponds to the initial threshold DT and the measured wind speed Vw and, also, that is greater than the initial threshold DT.

However, the present disclosure is not limited thereto, and a configuration is possible in which the initial threshold DT is preset to a distance such as expressed by Equation (3) below. Additionally, a configuration is possible in which the setter 920 of the control device 900 uses Equation (4) below to set the threshold CT to a value that corresponds to the initial threshold DT and the measured wind speed Vw and, also, that is less than, equal to, or greater than the initial threshold DT.

$$DT=(Va+Vave) \times Te \quad (3)$$

$$CT=(Va+Vw)/(Va+Vave) \times DT=(Va+Vw) \times Te \quad (4)$$

Here, DT is the initial threshold, CT is the threshold to be set, Va is the airspeed of the aircraft 100, Vave is an average value of the wind speed measured by the weather measurement device 700 before the start of the execution of the alert control processing of FIG. 8, Vw is the wind speed measured by the weather measurement device 700 after the start of the execution of the alert control processing, and Te is the amount of time required to depart from the port PT.

Modified Example 8 of Embodiment 1

In Embodiment 1, a description is given in which the initial threshold DT is preset to a value that is obtained, as illustrated in Equation (1) above, by multiplying the airspeed Va of the aircraft 100 by the amount of time Te required to depart from the port PT. Additionally, in Embodiment 1, a description is given in which the setter 920 of the control device 900 sets the threshold CT to a value that is obtained, as illustrated in Equation (2) above, by multiplying the initial threshold DT by the coefficient "1+Vw/Va." However, the present disclosure is not limited thereto.

A configuration is possible in which the initial threshold DT is preset to a positive constant that is unrelated to the airspeed Va and/or the amount of time Te required to depart. Additionally, a configuration is possible in which the setter 920 of the control device 900 sets the threshold CT to a value obtained by multiplying the wind speed Vw expressed in the weather information acquired by the acquirer 910 by the initial threshold DT. A person skilled in the art can determine, by experiment, the optimal constant.

Additionally, a configuration is possible in which the setter 920 sets the threshold CT to a value obtained by multiplying a return value of a predetermined function by the initial threshold DT. The predetermined function uses the wind speed Vw measured by the weather measurement device 700 as an argument, does not use the airspeed Va as an argument, and returns larger values as the wind speed Vw used as the argument increases. A person skilled in the art can determine, by experiment, the optimal function.

Modified Example 9 of Embodiment 1

In Embodiment 1, a description is given in which the information storage 990 of the control device 900 stores information expressing the initial threshold DT, and the setter 920 of the control device 900 uses Equation (2) above to set the threshold CT to a value that corresponds to the initial threshold DT and the measured wind speed Vw. However, the present disclosure is not limited thereto, and a configuration is possible in which the information storage 990 does not store the information expressing the initial threshold DT, and the setter 920 uses Equation (5) below to set the threshold CT to a value that corresponds to the measured wind speed Vw.

$$CT=(Va+Vw) \times Te \quad (5)$$

Here, CT is the threshold to be set, Va is the airspeed of the aircraft 100, Vw is the measured wind speed, and Te is the amount of time required to depart from the port PT.

Modified Example 10 of Embodiment 1

In Embodiment 1, a description is given in which the alert related to landing of the aircraft 100 at the port PT includes the departure command alert related to landing and, also, the alert related to takeoff of the aircraft 100 from the port PT includes the departure command alert related to takeoff. However, the present disclosure is not limited thereto. In the present modified example, the alert related to landing of the aircraft 100 at the port PT includes a falling possibility alert related to landing that informs of a risk that the aircraft 100 or a predetermined falling object will fall at the port PT at which the aircraft 100 is scheduled to land or in the port PT vicinity. Additionally, in the present modified example, the alert related to takeoff of the aircraft 100 from the port PT includes a falling possibility alert related to takeoff that informs of a risk that the aircraft 100 or a predetermined falling object will fall at the port PT from which the aircraft 100 takes off or in the port PT vicinity. The predetermined falling object includes, for example, at least one of a part of the aircraft 100 or an article to be delivered by the aircraft 100.

The weather measurement device 700 according to the present modified example is implemented as an ultrasonic two-dimensional wind direction anemometer. The weather measuring circuit 719 of the weather measurement device 700 generates a weather vector that expresses horizontal direction wind speed Vw and horizontal direction wind direction, and that has the Xm axis direction wind speed and the Ym axis direction wind speed measured by the method described in Embodiment 1 as components. Then, the weather measuring circuit 719 outputs a signal expressing the generated weather vector to the CPU 701.

In the present modified example, the initial alert start condition is a condition that a horizontal direction distance that is the distance between the port PT and the aircraft 100 becomes less than or equal to the initial threshold DT, and the initial alert end condition is a condition that the horizontal distance between the port PT and the aircraft 100 becomes greater than the initial threshold DT.

In the present modified example, the initial threshold DT that determines the initial alert start condition is preset to a value expressed by Equation (6) below.

$$DT=D+F1(Vg) \quad (6)$$

Here, DT is the initial threshold, D is the distance from the outer periphery of the port PT to a boundary line B of the port vicinity, Vg is the ground speed of the aircraft 100, which is a scalar quantity, and F1 is a predetermined function.

In the present modified example, for ease of description, a description is given in which the aircraft 100 flies at the predetermined ground speed Vg, but the present disclosure is not limited thereto.

The function F1 used in Equation (6) has the ground speed Vg as an argument. Additionally, the function F1 has, as a return value, the horizontal distance between a projection starting point and a falling point on the reference plane of the altitude in a case in which the aircraft 100 or the falling object, of which a proportional coefficient of air resistance is a pre-measured value x, is horizontally projected at the ground speed Vg from a predetermined upper limit Hh of the flight altitude of the aircraft 100 and, also, airspace including a fall path of the aircraft 100 or the falling object is in a windless state.

The initial threshold DT is set to the value expressed in Equation (6) because, in a case in which the aircraft 100 traveling toward the port PT is flying at the ground speed Vg, when the aircraft 100 starts to fall or the falling object starts to fall from the aircraft 100, the fall path of the aircraft 100 or the falling object is the same as a fall path in a case in which the aircraft 100 or the falling object is horizontally projected, from a falling start point, in the flight direction of the aircraft 100 at the ground speed Vg. As such, in a case in which the horizontal distance between the port PT and the aircraft 100 is greater than the value expressed by Equation (6) above, if the aircraft 100 or the falling object starts to fall from the flight position of the aircraft 100, provided that the airspace including the fall path of the aircraft 100 or the falling object is in a windless state, the probability of the falling point being included in the port PT or the port PT vicinity will be lower than a predetermined probability.

In contrast, in a case in which the distance between the port PT and the aircraft 100 is less than or equal to the value expressed by Equation (6) above, if the aircraft 100 or the falling object starts to fall, provided that the airspace including the fall path of the aircraft 100 or the falling object is in a windless state, the probability of the falling point being included in the port PT or the port PT vicinity will be greater than or equal to the predetermined probability.

Additionally, in the present modified example, the setter 920 of the control device 900 uses Equation (7) below to set the threshold CT to a value that corresponds to the ground speed Vg of the aircraft 100 and the measured wind speed Vw.

$$CT=D+F2(Vw,Vg) \quad (7)$$

Here, CT is the threshold to be set, D is the distance from the outer periphery of the port PT to the boundary line B of the port vicinity, Vw is the measured wind speed, Vg is the ground speed of the aircraft 100, and F2 is a predetermined function.

The function F2 has the wind speed Vw and the ground speed Vg as arguments. Additionally, the function F2 has, as a return value, the horizontal distance between a projection starting point and a falling point in a case in which the aircraft 100 or the falling object, of which the proportional coefficient of air resistance is the value is is horizontally projected at a ground speed Vg from the upper limit Hh of the flight altitude in a direction from upwind toward downwind and, also, wind is blowing uniformly in the horizontal direction at the wind speed Vw in the airspace including the fall path of the aircraft 100 or the falling object.

The threshold CT is set using Equation (7) above because, in a case in which the distance between the port PT and the aircraft 100 is greater than the value expressed by Equation (7) above, if the aircraft 100 starts to fall or the falling object starts to fall from the aircraft 100 and, also, wind is blowing uniformly in the horizontal direction toward the port PT at the wind speed Vw in the airspace that includes the fall path, the probability of the falling point being included in the port PT or the port PT vicinity will be lower than the predetermined probability. In contrast, in a case in which the distance between the port PT and the aircraft 100 is less than or equal to the value expressed by Equation (7) above, if the aircraft 100 starts to fall or the falling object starts to fall from the aircraft 100 and, also, wind is blowing uniformly in the horizontal direction toward the port PT at the wind speed Vw in the airspace that includes the fall path, even if, for example, the aircraft 100 is not flying above the port PT or the port PT vicinity, the probability of the falling point being included in the port PT or the port PT vicinity will be greater than or equal to the predetermined probability.

After setting the threshold CT, the setter 920 of the control device 900 sets the alert start condition to a condition that the horizontal distance between the port PT and the aircraft 100 becomes less than or equal to the set threshold CT. Additionally, the setter 920 sets the alert end condition to a condition that the horizontal distance between the port PT and the aircraft 100 becomes greater than the set threshold CT.

The controller 930 of the control device 900 according to the present modified example causes the alert device 800 to start the falling possibility alert related to landing at the timing at which the alert start condition is met, and causes the alert device 800 to end the falling possibility alert related to takeoff at the timing at which the alert end condition is met.

According to these configurations, the setter 920 of the control device 900 sets the threshold CT to a value that is greater than the initial threshold by the return value of the function F2 (Vw, Vg). The return value of F2 (Vw, Vg) is the horizontal distance between the projection starting point and the falling point in a case in which the aircraft 100 flying toward the port PT starts to fall or the predetermined falling object starts to fall from the aircraft 100 from the upper limit Hh of the flight altitude of the aircraft 100 and, also, wind is blowing uniformly in the horizontal direction toward the port PT at the wind speed Vw in the airspace that includes the fall path of the aircraft 100 or the falling object. Additionally, the controller 930 of the control device 900 causes the alert device 800 to start the falling possibility alert, which informs that there is a risk of the aircraft 100 or the falling object falling at the port PT or the port PT vicinity, at the timing at which the alert start condition that the horizontal distance between the port PT and the aircraft 100 becomes less than or equal to the threshold CT is met. As such, even if the aircraft 100 is not flying above the port PT or the port PT vicinity, provided that the aircraft 100 is flying at a position such that, in a case in which, for example, the aircraft 100 starts falling or the falling object starts falling from the aircraft 100, the falling point is included in the port PT or the port PT vicinity, the control device 900 can cause the alert device 800 to start the falling possibility alert. Therefore, the control device 900 can sufficiently prevent, in accordance with the measured wind speed Vw, physical contact between a person at the port PT or the port PT vicinity and the aircraft 100 or the falling object.

In the present modified example, a description is given in which the function F1 and the function F2 have, as return values, the horizontal distance between the projection starting point and the falling point in a case in which the aircraft 100 or the falling object is horizontally projected from the upper limit Hh of the flight altitude of the aircraft 100. However, the present disclosure is not limited thereto. A configuration is possible in which the function F1 and the function F2 have, as return values, the horizontal distance between the projection starting point and the falling point in a case in which the aircraft 100 or the falling object is horizontally projected from a predetermined lower limit Hl of the flight altitude of the aircraft 100. Additionally, a configuration is possible in which the function F1 and the function F2 have, as return values, the horizontal distance between the projection starting point and the falling point in a case in which the aircraft 100 or the falling object is horizontally projected from an altitude from the lower limit Hl to the upper limit Hh of the flight altitude.

In the present modified example, a description is given in which the aircraft 100 flies at the predetermined ground speed Vg, but the present disclosure is not limited thereto. A configuration is possible in which the aircraft 100 flies at a ground speed that is greater than or equal to a predetermined minimum speed and, also, less than or equal to a predetermined maximum speed. Additionally, a configuration is possible in which the aircraft 100 flies at a predetermined airspeed Va, or flies at an airspeed that is greater than or equal to a predetermined minimum speed and, also, less than or equal to a predetermined maximum speed.

Modified Example 11 of Embodiment 1

In Embodiment 1, a description is given in which the alert related to landing of the aircraft 100 at the port PT includes the departure command alert related to landing, and the alert related to takeoff of the aircraft 100 from the port PT includes the departure command alert related to takeoff. However, the present disclosure is not limited thereto, and a configuration is possible in which the alert related to landing of the aircraft 100 at the port PT includes at least one of the departure command alert related to landing, a no trespassing alert related to landing, or a landing alert. Additionally, a configuration is possible in which the alert related to takeoff of the aircraft 100 from the port PT includes at least one of the departure command alert related to takeoff, a no trespassing alert related to takeoff, or a takeoff alert.

The "no trespassing alert related to landing" is an alert informing that entry to the port PT, which is the location at which the aircraft 100 is scheduled to land or is the location at which the aircraft 100 is landed, is forbidden. The "landing alert" is an alert informing of a landing schedule of the aircraft 100 at the port PT or of landing of the aircraft 100 at the port PT.

The "no trespassing alert related to takeoff" is an alert informing that entry to the port PT, which is the location from which the aircraft 100 is scheduled to takeoff or is the location at which the aircraft 100 has taken off, is forbidden. The "takeoff alert" is an alert informing of a takeoff schedule of the aircraft 100 from the port PT or of takeoff of the aircraft 100 from the port PT.

Modified Example 12 of Embodiment 1

In Embodiment 1, a description is given in which the CPU 801 of the alert device 800 causes the alerter 810 to start the departure command alert when the control signal, output by the control device 900, for starting the departure command alert is input by the input/output port 808. Additionally, a description is given in which CPU 801 of the alert device 800 causes the alerter 810 to end the departure command alert when the control signal for ending the departure command alert is input by the input/output port 808. However, the present disclosure is not limited thereto.

A configuration is possible in which the alert device 800 includes a non-illustrated movement sensor that is implemented as, for example, a Doppler sensor, and that detects moving bodies moving at the port PT or the port PT vicinity. Additionally, a configuration is possible in which the CPU 801 of the alert device 800 does not cause the alerter 810 to start the departure command alert until the movement sensor outputs a detection signal expressing that a moving body is detected, even when the control signal for starting the departure command alert is inputted.

In such a case, it is sufficient that the CPU 801 of the alert device 800 causes the alerter 810 to start the departure command alert when a detection signal is output from the movement sensor in the period from when the control signal for starting the departure command alert is inputted until when the control signal for ending the departure command alert is inputted. Additionally, it is sufficient that the CPU 801 causes the alerter 810 to end the departure command alert at the earlier of the timing at which the control signal for ending the departure command alert is inputted and the timing at which the output of the detection signal ends.

Modified Example 13 of Embodiment 1

In Embodiment 1, a description is given in which the alerter 810 of the alert device 800 includes the speaker 811, the drive circuit 812 and the LED 813, and the video card 815*a* and the display device 815*b* such as illustrated in FIG.

6, and alerts are performed using audio, light, and images. However, the present disclosure is not limited thereto.

A configuration is possible in which the alerter 810 of the alert device 800 includes any one or two of the speaker 811, the drive circuit 812 and the LED 813, or the video card 815a and the display device 815b, and alerts are performed using any one or two of audio, light, and images.

Modified Example 14 of Embodiment 1

In Embodiment 1, a description is given in which the weather measurement device 700 is installed at the altitude h above the port PT or the port PT vicinity, but the present disclosure is not limited thereto, and a configuration is possible in which the weather measurement device 700 is installed on a surface of the port PT or on a surface of the port PT vicinity. Additionally, a configuration is possible in which the weather measurement device 700 is installed above the port PT or the port PT vicinity, at an altitude lower than the predetermined lower limit of the flight altitude of the aircraft 100 or at an altitude higher than the upper limit of the flight altitude of the aircraft 100.

In Embodiment 1, a description is given in which the weather measurement device 700 is implemented as an ultrasonic anemometer, but the present disclosure is not limited thereto, and a configuration is possible in which the weather measurement device 700 is implemented as a cup-type anemometer or a windmill-type anemometer.

Modified Example 15 of Embodiment 1

In Embodiment 1, a description is given in which the port PT is a location at which takeoff and landing of the aircraft 100 are scheduled, and the control device 900 causes the alert device 800 to perform an alert related to landing and an alert related to takeoff of the aircraft 100. However, the present disclosure is not limited thereto.

A configuration is possible in which the port PT is a location at which landing of the aircraft 100 is scheduled, and is a location from which takeoff of the aircraft 100 is not scheduled. Additionally, a configuration is possible in which the control device 900 causes the alert device 800 to perform an alert related to landing of the aircraft 100, but does not cause the alert device 800 to perform an alert related to takeoff of the aircraft 100.

Additionally, a configuration is possible in which the port PT is a location from which takeoff of the aircraft 100 is scheduled, and is a location at which landing of the aircraft 100 is not scheduled. Additionally, a configuration is possible in which the control device 900 causes the alert device 800 to perform an alert related to takeoff of the aircraft 100, but does not cause the alert device 800 to perform an alert related to landing of the aircraft 100.

Modified Example 16 of Embodiment 1

In Embodiment 1, a description is given in which the shape of the port PT is circular. However, the present disclosure is not limited thereto. The port PT may have any shape. For example, the port PT may have a polygonal shape such as a triangular shape, a square shape, a rectangular shape, and a pentagonal shape, or an elliptical shape.

In Embodiment 1, a description is given in which the port PT is the entrance of an apartment complex, but the present disclosure is not limited thereto, and the port PT may be any location at which landing or takeoff of the aircraft 100 is scheduled. For example, the port PT may by the entrance of an office building, a hotel, or a public facility, or the doorstep of a house. Additionally, the port PT may be the lobby of an apartment complex, an office building, a hotel, or a public facility. Furthermore, the port PT may be the yard, roof, veranda, or parking lot of a house, an apartment complex, an office building, a hotel, or a public facility. Moreover, the port PT may be a road, a river beach, a park, or a schoolyard where landing or takeoff of the aircraft 100 is not forbidden, or a parking lot where landing or takeoff of the aircraft 100 is allowed.

Modified Example 17 of Embodiment 1

In Embodiment 1, a description is given in which the aircraft 100 flies at the predetermined airspeed Va, but the present disclosure is not limited thereto. A configuration is possible in which the aircraft 100 flies at an airspeed that is greater than or equal to a predetermined minimum speed and, also, less than or equal to a predetermined maximum speed.

In Embodiment 1, a description is given in which the aircraft 100 is implemented as a drone that obtains lift and thrust from the propellers 131 to 134 illustrated in FIG. 2, but the present disclosure is not limited thereto. A configuration is possible in which the aircraft 100 includes wings and obtains lift by the wings, or includes an air sac filled with a gas having a lower specific gravity than air and obtains lift by the air sac. Additionally, a configuration is possible in which the aircraft 100 includes a jet engine or a rocket engine, and obtains thrust by the jet engine or the rocket engine. Additionally, a description is given in which the aircraft 100 is implemented as an unmanned aircraft, but the aircraft 100 may be an unmanned flying object. Furthermore, the aircraft 100 need not be unmanned and, provided that the aircraft 100 is an autonomous flying object, a person may ride the aircraft 100.

Modified Example 18 of Embodiment 1

Figure 19:
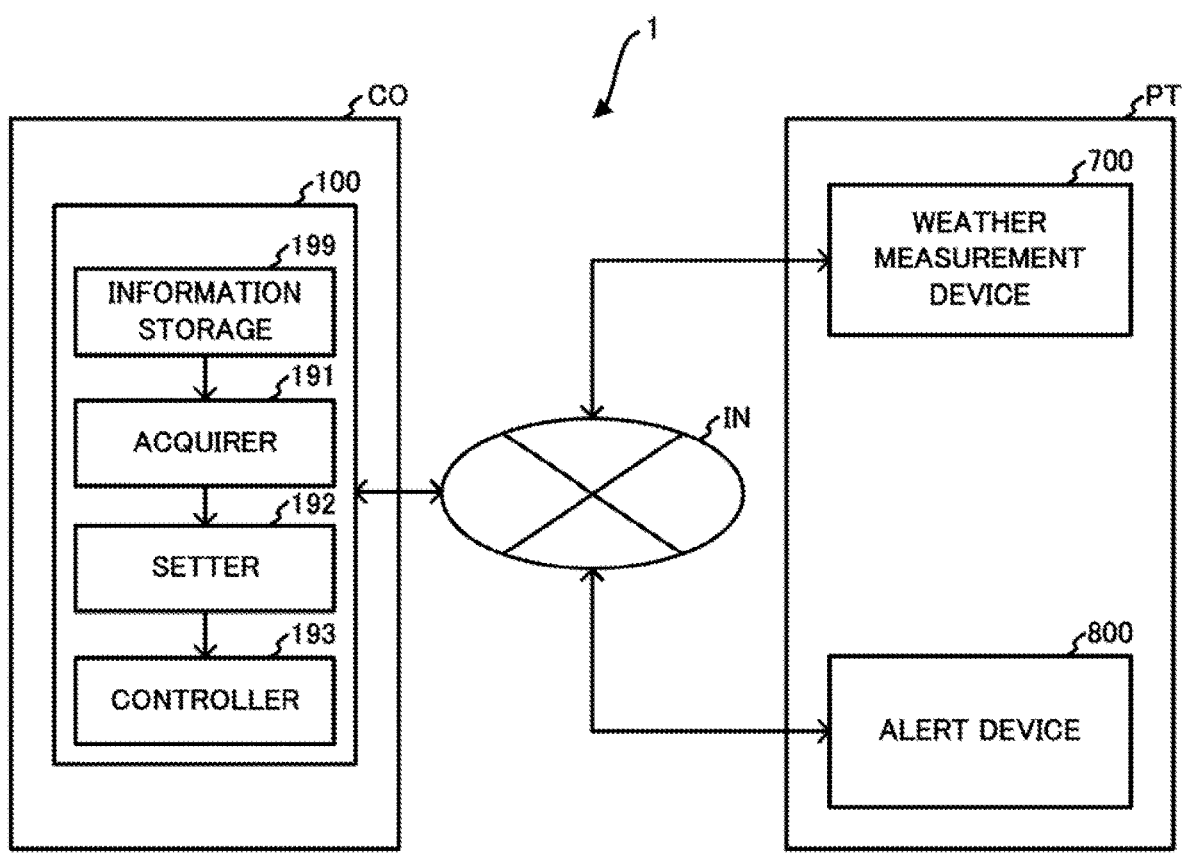
FIG. 19 is a system configuration drawing illustrating a configuration example of an alert system according to Modified Example 18 of Embodiment 1.

In Embodiment 1, a description is given in which the alert system 1 illustrated in FIG. 1 includes the aircraft 100, the weather measurement device 700, the alert device 800, and the control device 900. However, the present disclosure is not limited thereto. As illustrated in FIG. 19, the alert system 1 according to the present modified example includes the aircraft 100, the weather measurement device 700, and alert device 800, but does not include the control device 900.

The weather measurement device 700 according to the present modified example includes a non-illustrated data communication circuit that has the same configuration and functions as the configuration and functions of the data communication circuit 114a of the control device 110 of the aircraft 100 illustrated in FIG. 3. Then, the CPU 701 of the weather measurement device 700 generates, on the basis of a signal output from the weather measuring circuit 719, weather information expressing the measured wind speed Vw, and outputs the generated weather information to the data communication circuit with the aircraft 100 as the destination.

The CPU 111 of the aircraft 100 according to the present modified example executes the alert control processing illustrated in FIG. 8, the setting processing illustrated in FIG. 10, and the start condition determination processing illustrated in FIG. 12. As a result, the CPU 111 of the aircraft 100 functions as an acquirer 191, a setter 192, and a controller 193 that have the same functions as the functions of the acquirer 910, the setter 920, and the controller 930 of the control device 900. Additionally, the flash memory 113b of the aircraft 100 functions as an information storage 199 that has the same functions as the information storage 990 of the control device 900.

The acquirer 191 of the aircraft 100 acquires the weather information that the data communication circuit 114a of the aircraft 100 receives from the weather measurement device 700. The setter 192 of the aircraft 100 sets the alert start condition and the alert end condition in accordance with the wind speed Vw expressed in the weather information acquired by the acquirer 191 of the aircraft 100. The controller 193 of the aircraft 100 outputs, to the data communication circuit 114a with the alert device 800 as the destination, a control command for starting the departure command alert related to landing at a timing at which the alert start condition set by the setter 192 of the aircraft 100 is met. Additionally, the controller 193 of the aircraft 100 outputs, to the data communication circuit 114a with the alert device 800 as the destination, a control command for ending the departure command alert related to takeoff at a timing at which the set alert end condition is met.

The alert device 800 according to the present modified example includes a non-illustrated data communication circuit that has the same configuration and functions as the configuration and functions of the data communication circuit 114a of the aircraft 100 illustrated in FIG. 3. When the data communication circuit of the alert device 800 receives the control command from the aircraft 100, the CPU 801 of the alert device 800 starts outputting a signal to the alerter 810 in accordance with that control command, and the alerter 810 starts the departure command alert related to landing or ends the departure command alert related to takeoff in accordance with that signal.

According to these configurations, the alert system 1 includes the aircraft 100, the weather measurement device 700, and alert device 800, but does not include the control device 900. Additionally, the controller 193 of the aircraft 100 causes the alert device 800 to perform a behavior corresponding to the wind speed Vw expressed in the weather information. As such, even if an additional port at which the aircraft 100 lands and takes off is installed, and the control device 900 is not installed at the additionally installed port, the alert system 1 can control the alert device 800 installed at the port or the port vicinity by using the controller 193 of the aircraft 100 flying toward the additionally installed port. Therefore, the alert system 1 can perform sufficient alerts that correspond to the wind speed Vw at additionally installed ports while suppressing increases in manufacturing costs, increases in installation costs, increases in maintenance costs, and increases in operating costs of the alert system 1 caused by the installation of additional ports.

Modified Example 19 of Embodiment 1

Figure 20:
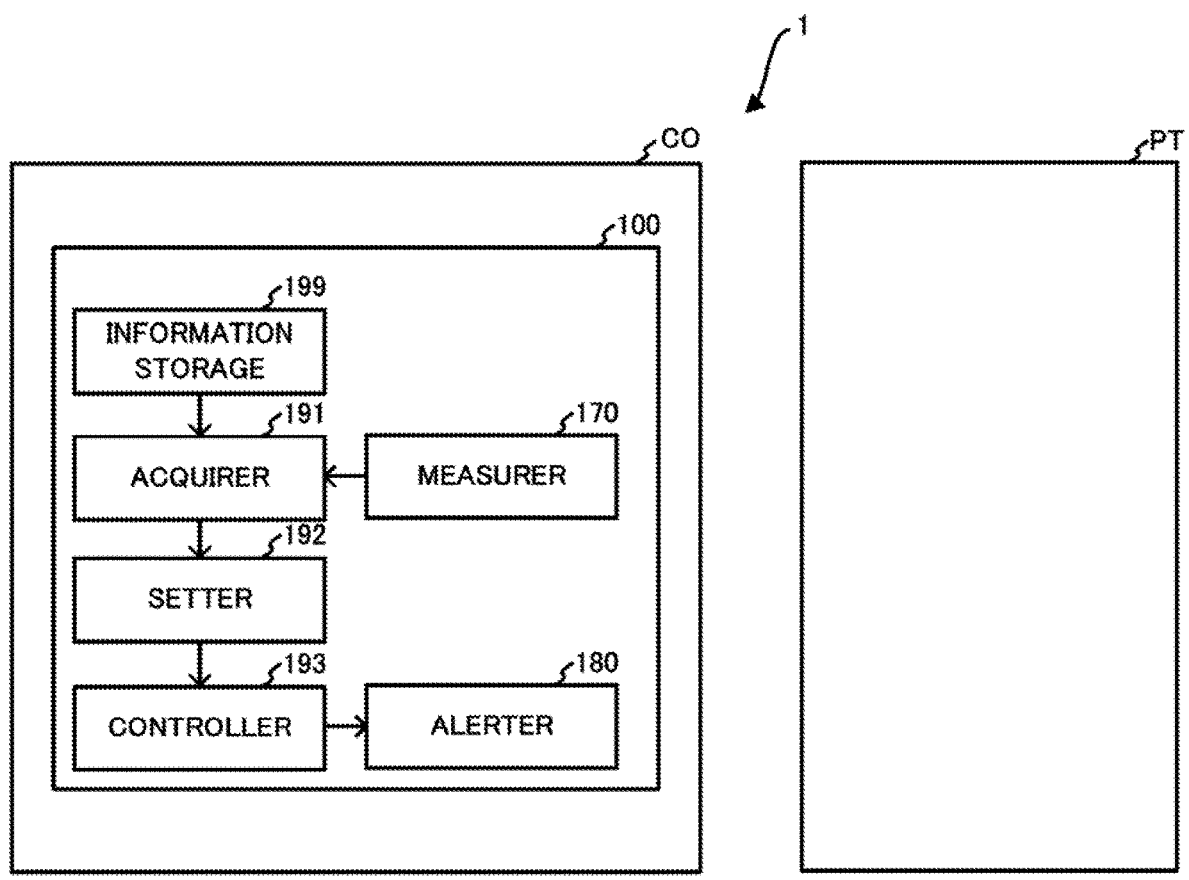
FIG. 20 is a system configuration drawing illustrating a configuration example of an alert system according to Modified Example 19 of Embodiment 1.

Modified Example 6 of Embodiment 1 and Modified Example 18 of Embodiment 1 can be combined with each other. The present modified example is a combination of Modified Example 6 of Embodiment 1 and Modified Example 18 of Embodiment 1. As illustrated in FIG. 20, the alert system 1 according to the present modified example includes the aircraft 100, but does not include the weather measurement device 700, the alert device 800, and the control device 900.

The aircraft 100 according to the present modified example includes the measurer 170 and the alerter 180 described in Modified Example 6 of Embodiment 1, and the acquirer 191, the setter 192, the controller 193, and the information storage 199 described in Modified Example 18 of Embodiment 1.

The measurer 170 of the aircraft 100 measures the wind speed Vw at the flight position of the aircraft 100, the acquirer 191 acquires weather information expressing the measured wind speed Vw, and the setter 192 sets the alert start condition and the alert end condition in accordance with the initial alert start condition stored in the information storage 199 and the wind speed Vw. The controller 193 causes the alerter 180 to start an alert at the timing at which the set alert start condition is met, and causes the alerter 180 to end the alert at the timing at which the set alert end condition is met.

Embodiment 2

In Embodiment 1, a description is given in which the alert start condition corresponding to the weather is a condition that the distance between the port PT and the aircraft 100 becomes less than or equal to the threshold CT set in accordance with the weather, and the alert end condition corresponding to the weather is a condition that the distance between the port PT and the aircraft 100 becomes greater than the threshold CT set in accordance with the weather.

Figure 21:
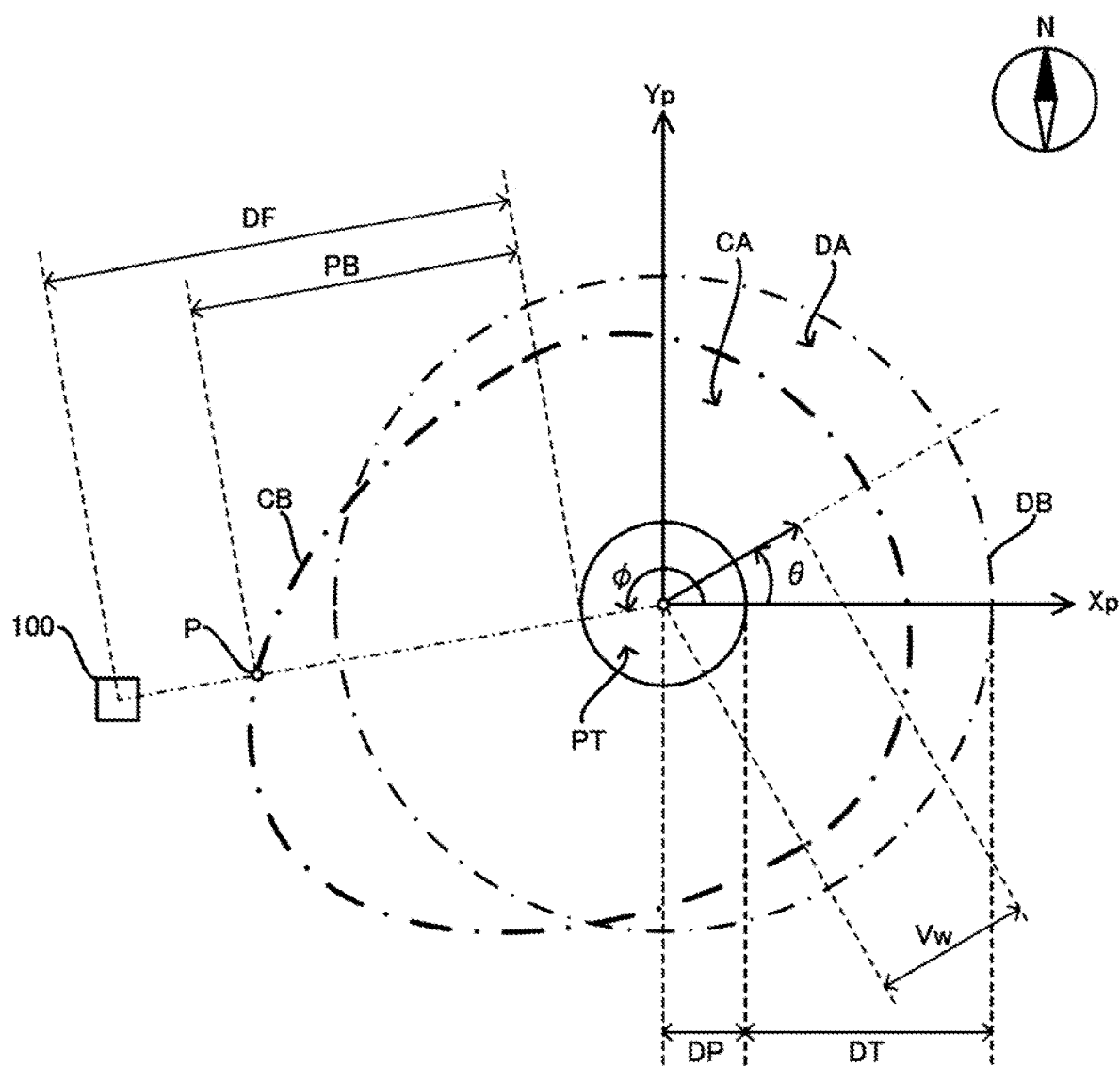
FIG. 21 is a drawing illustrating an example of an alert area after rotation transformation.

However, the present disclosure is not limited thereto and, in the present embodiment, the alert start condition corresponding to the weather is a condition that the aircraft 100 enters alert airspace above an alert area CA such as illustrated in FIG. 21 that is set in accordance with the weather, and the alert end condition corresponding to the weather is a condition that the aircraft 100 exits the alert airspace set in accordance with the weather. In the following, the configurations that are the same as those in Embodiment 1 are marked with the same reference numerals used in Embodiment 1, and the description focuses on the differences between the present embodiment and Embodiment 1.

In the present embodiment, the weather includes the wind direction and the wind speed related to the port PT. As such, the weather measurement device 700 according to the present embodiment is implemented as an ultrasonic two-dimensional wind direction anemometer, measures the horizontal direction wind speed Vw and the horizontal direction wind direction related to the port PT, and outputs, to the CPU 701, a signal expressing the measured wind speed Vw and wind direction by using a weather vector.

The setter 920 of the control device 900 according to the present embodiment sets the alert start condition and the alert end condition of the alert device 800 by changing an initial alert start condition and an initial alert end condition in accordance with the wind direction and the wind speed Vw measured by the weather measurement device 700.

The initial alert start condition according to the present embodiment is a condition that the aircraft 100 enters airspace above an initial alert area DA such as illustrated in FIG. 21, and the initial alert end condition is a condition that the aircraft 100 exits the airspace above the initial alert area DA.

The initial alert area DA is a region on the Xp-Yp plane of the coordinate system of the port PT. The initial alert area DA is a region that includes the port PT and also is more on the port PT side than a boundary line DB separated from the outer periphery of the port PT by the initial threshold DT described in Embodiment 1. The coordinate system of the port PT is a coordinate system that has the center point of the port PT as the origin point, and that has an Xp axis, a Yp axis, and a Zp axis of which the positive directions are the positive directions of the Xm axis, the Ym axis, and the Zm axis of the weather measuring device 700.

In the present embodiment, the port PT has a circular shape and, as such, the initial alert area DA is also circular. Additionally, the center point of the initial alert area DA overlaps the center point of the port PT and, also, the radius of the initial alert area DA is equivalent to the sum of a radius DP of the port PT and the initial threshold DT.

As such, the information storage 990 of the control device 900 according to the present embodiment stores, in advance and as information expressing the range of the initial alert area DA, information expressing the latitude, longitude, and altitude of the center point of the port PT, information expressing the radius DP of the port PT, and information expressing the initial threshold DT.

Figure 22:
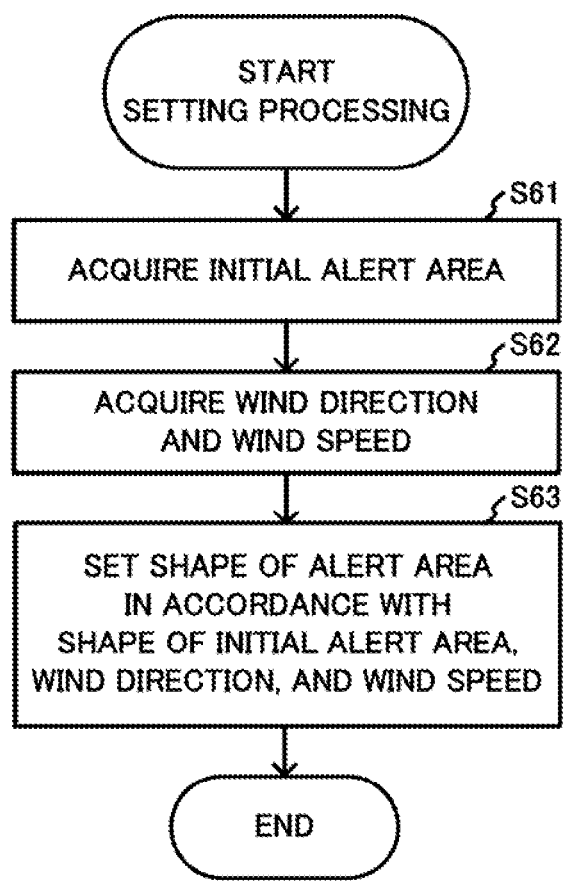
FIG. 22 is a flowchart illustrating an example of setting processing executed by a control device according to Embodiment 2.

When the execution of the alert control processing of FIG. 8 starts, the CPU 901 of the control device 900 according to the present embodiment executes setting processing such as illustrated in FIG. 22 using the information stored in the information storage 990 (step S21).

When the execution of the setting processing of FIG. 22 starts, the acquirer 910 of the control device 900 acquires the information expressing the range of the initial alert area DA from the information storage 990 (step S61). Next, the acquirer 910 acquires, on the basis of a signal input from the input/output port 908a, weather information expressing the wind speed Vw and the wind direction using a weather vector (step S62).

Thereafter, the setter 920 of the control device 900 sets the shape of the alert area CA in accordance with the shape of the initial alert area DA and the wind direction and wind speed Vw expressed in the weather vector (step S63).

In step S63, the setter 920 of the control device 900 sets a variable CXw to a value "(Va+Vw)Te" using equation (2) above. The variable CXw determines the size of the alert area CA in the upwind direction from the center of the alert area CA. The variable CXw is set to such a value because, in a case in which an aircraft 100 flying toward the port PT at the airspeed Va flies from upwind toward downwind in wind blowing in the horizontal direction at the wind speed Vw, the ground speed of the aircraft 100 is, at fastest, "Va+Vw." Specifically, in a case in which the aircraft 100 flies from upwind toward downwind, when the alert starts at the timing at which the horizontal direction distance between the port PT and the aircraft 100 becomes less than or equal to the variable CXw and the aircraft 100 has entered the alert airspace above the alert area CA, the alert is started, by the amount of time Te required to depart from the port PT or greater, earlier than the timing at which the aircraft 100 is expected to arrive above the port PT.

Additionally, the setter 920 of the control device 900 sets a variable CXl to a value "(Va−Vw)Te" using equation (8) below. The variable CXl determines the size of the alert area CA in the downwind direction from the center of the alert area CA. The variable CXl is set to such a value because, in a case in which an aircraft 100 flying toward the port PT at the airspeed Va flies from downwind toward upwind in wind blowing in the horizontal direction at the wind speed Vw, the ground speed of the aircraft 100 is, at fastest, "Va−Vw."

$$CXl = (1 - Vw/Va) \times DT = (Va - Vw) \times Te \quad (8)$$

Here, CXl is the variable to be set, Vw is the measured wind speed, Va is the airspeed of the aircraft 100, DT is the initial threshold, and Te is the amount of time required to depart from the port PT.

Figure 23:
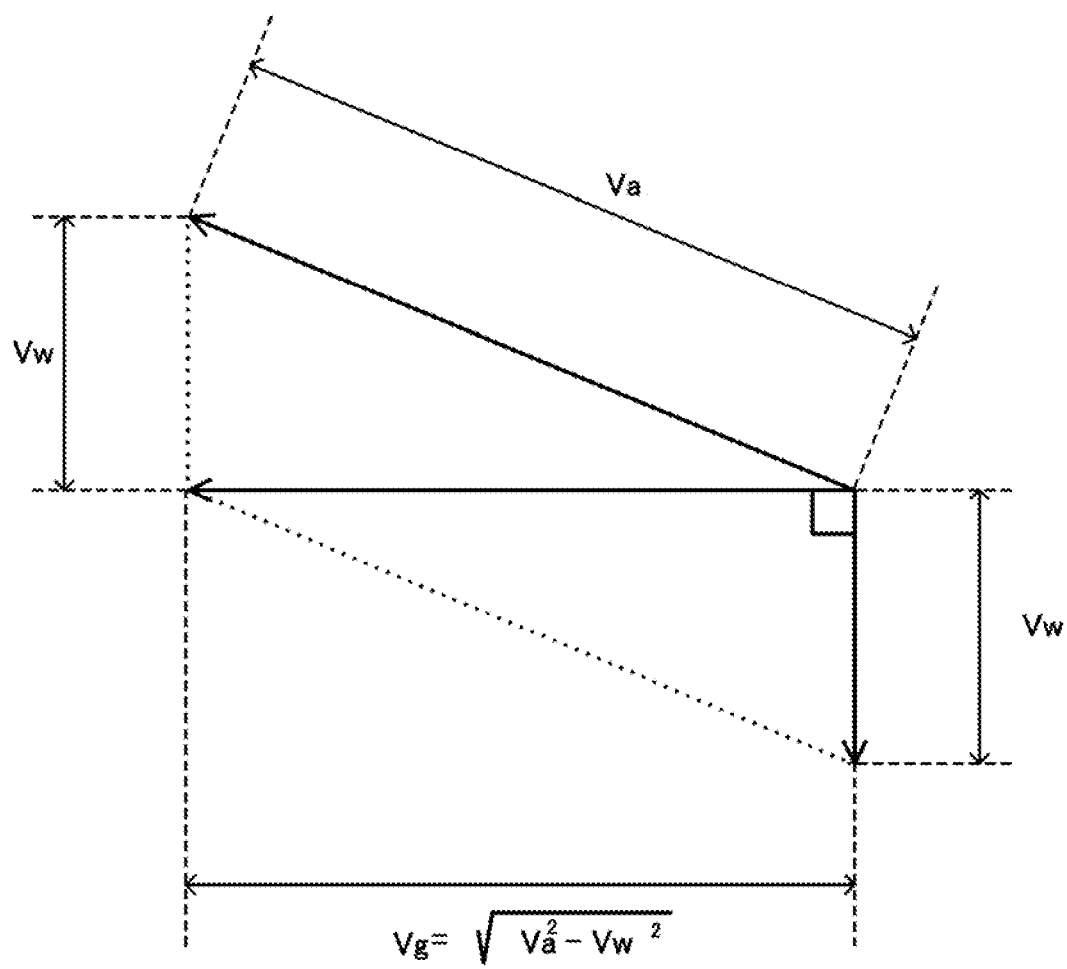
FIG. 23 is a drawing illustrating an example of airspeed, wind speed, and ground speed.

Additionally, the setter 920 of the control device 900 sets a variable CY using equation (9) below. The variable CY determines the size of the alert area CA in a direction orthogonal to the upwind direction. The variable CY is set to such a value because, in a case in which the aircraft 100 flies in a direction orthogonal to the wind direction of wind blowing in the horizontal direction at the wind speed Vw, as the aircraft 100 flies at the airspeed Va, the ground speed Vg of the aircraft 100 is, at fastest, a speed equivalent to the length of the adjacent of a right triangle such as illustrated in FIG. 23 of which the length of the hypotenuse is Va and the length of the opposite side is Vw. Note that the airspeed Va, the wind speed Vw, and the ground speed Vg are scalar quantities.

Equation 1

$$CY = \sqrt{Va^2 - Vw^2} \times Te \quad (9)$$

Here, CY is the variable to be set, Va is the airspeed of the aircraft 100, Vw is the measured wind speed, and Te is the amount of time required to depart from the port PT.

Next, the setter 920 of the control device 900 identifies, on the basis of the information expressing the range of the initial alert area DA acquired from the information storage 990, an equation that expresses the shape of the initial alert area DA in the coordinate system of the port PT.

Figure 24:
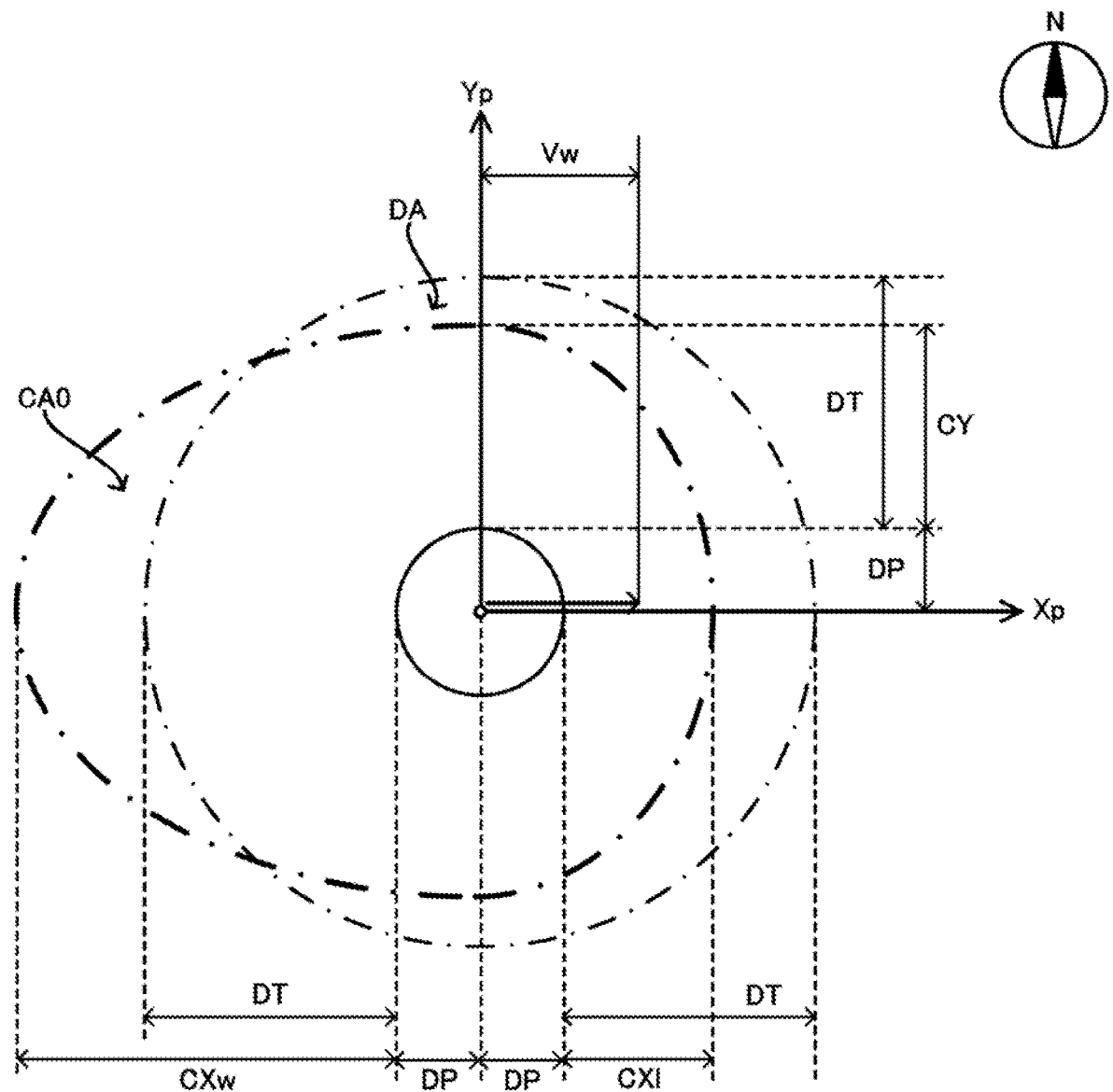
FIG. 24 is a drawing illustrating an example of an alert area before rotation transformation according to Embodiment 2.

Next, the setter 920 of the control device 900 calculates, on the basis of the initial threshold DT expressing the size of the initial alert area DA and the calculated variables CXw, CXl, and CY, a transformation matrix for transforming the shape of the initial alert area DA into a shape of an alert area CA0 such as illustrated in FIG. 24 that is set for a case in which wind blows in the positive direction of the Xp axis from the origin point at the wind speed Vw.

To accomplish this, the setter 920 of the control device 900 calculates a first transformation matrix for transforming the shape of the initial alert area DA included in quadrant 1 and quadrant 4 of the coordinate system of the port PT from a semicircular shape in which the length of the radius is "DP+DT" to a first semi-elliptical shape in which the lengths of the major diameter and the minor diameter are respectively "DP+CXl" and "DP+CY." Additionally, the setter 920 calculates a second transformation matrix for transforming the shape of the initial alert area DA included in quadrant 2 and quadrant 3 of the coordinate system of the port PT from a semicircular shape in which the length of the radius is "DP+DT" to a second semi-elliptical shape in which the lengths of the major diameter and the minor diameter are respectively "DP+CXw" and "DP+CY."

Thereafter, the setter 920 of the control device 900 sets, as the shape of the alert area CA0 of FIG. 24, a combined shape obtained by combining the first semi-elliptical shape and the second semi-elliptical shape. Next, the setter 920 calculates, on the basis of the equation that expresses the shape of the initial alert area DA, the first transformation matrix, and the second transformation matrix, an equation that expresses the shape of the alert area CA0.

Thereafter, the setter 920 of the control device 900 calculates, on the basis of the weather vector expressed in the weather information, a rotation matrix for transforming the shape of the alert area CA0 such as illustrated in FIG. 24 that is set for a case in which wind blows in the positive direction of the Xp axis from the origin point, to the shape of the alert area CA such as illustrated in FIG. 21 that is set for a case in which wind blows from the origin point in the direction expressed by the weather vector.

To accomplish this, the setter 920 of the control device 900 calculates an angle θ that is an angle formed between the positive direction of the Xp axis and the wind direction expressed in the weather vector, and that is measured counter-clockwise from the Xp axis. Next, the setter 920 calculates, on the basis of the angle θ, a rotation matrix for rotating a point about the origin point on the Xp-Yp plane by the degree θ.

Thereafter, the setter 920 of the control device 900 calculates, on the basis of the rotation matrix and the equation that expresses the shape of the alert area CA0 of FIG. 24, an equation that expresses the shape of the alert area CA of FIG. 21. Next, the setter 920 transforms, on the basis of the latitude, longitude, and altitude of the center point of the port PT that is the origin point of the coordinate system of the port PT, from an equation that expresses the shape of the alert area CA using the coordinate system of the port PT to an equation that expresses the shape of the alert area CA using the latitude, longitude, and altitude.

Next, the acquirer 910 of the control device 900 acquires the information expressing the upper limit Hh of the flight altitude of the aircraft 100 that is stored in advance in the information storage 990. Then, the setter 920 generates, on the basis of the transformed equation and the acquired information expressing the upper limit Hh, an equation that expresses an alert airspace from the surface of the alert area CA to the upper limit Hh of the flight altitude.

Additionally, the setter 920 of the control device 900 sets the alert start condition to the condition that the aircraft 100 enters the alert airspace, and the alert end condition to the condition that the aircraft 100 exits the alert airspace and, then, ends the execution of the setting processing.

The alert start condition set in this manner is a condition that, in a case in which the direction on the Xp-Yp plane from the port PT toward the aircraft 100 is a direction expressed by an angle φ such as illustrated in FIG. 21, the horizontal distance DF from the port PT to the aircraft 100 becomes less than or equal to a distance PB from a crossing point P, between a semi-straight line from the center point of the port PT toward the aircraft 100 and the boundary line CB of the alert area CA, to the port PT. Additionally, the alert end condition set in this manner is a condition that, in a case in which the direction from the port PT toward the aircraft 100 is the direction expressed by the angle φ, the horizontal distance DF from the port PT to the aircraft 100 becomes greater than the distance PB.

The alert start condition and the alert end condition are set in this manner because, when the aircraft 100 continues to fly at the airspeed Va in a case in which wind blows at the wind speed Vw in the direction expressed by the angle θ, the distance PB is a distance that the aircraft 100 requires the amount of time Te to fly and the amount of time Te is required to depart from the port PT. That is, regardless of which direction the direction from the aircraft 100 to the port PT is, the boundary line CB between an inner region and an outer region of the alert area CA is positioned directly below a position that the aircraft 100 passes at a timing the amount of time Te required to depart from the port PT earlier than the timing at which the aircraft 100 is expected to arrive above the port PT.

Specifically, regardless of the direction in which the aircraft 100 flies to the port PT, provided that the alert is started at the timing at which the aircraft 100 enters the alert airspace above the alert area CA, the alert can be started the amount of time Te earlier than when the aircraft 100 arrives above the port PT. Additionally, regardless of the direction in which the aircraft 100 flies away from the port PT, provided that the alert is ended at the timing at which the aircraft 100 exits the alert airspace, even if the aircraft 100 returns after the alert is ended and a person has entered the port PT, the alert can be restarted sufficiently early at the timing at which the aircraft 100 reenters the alert airspace.

Figure 25:
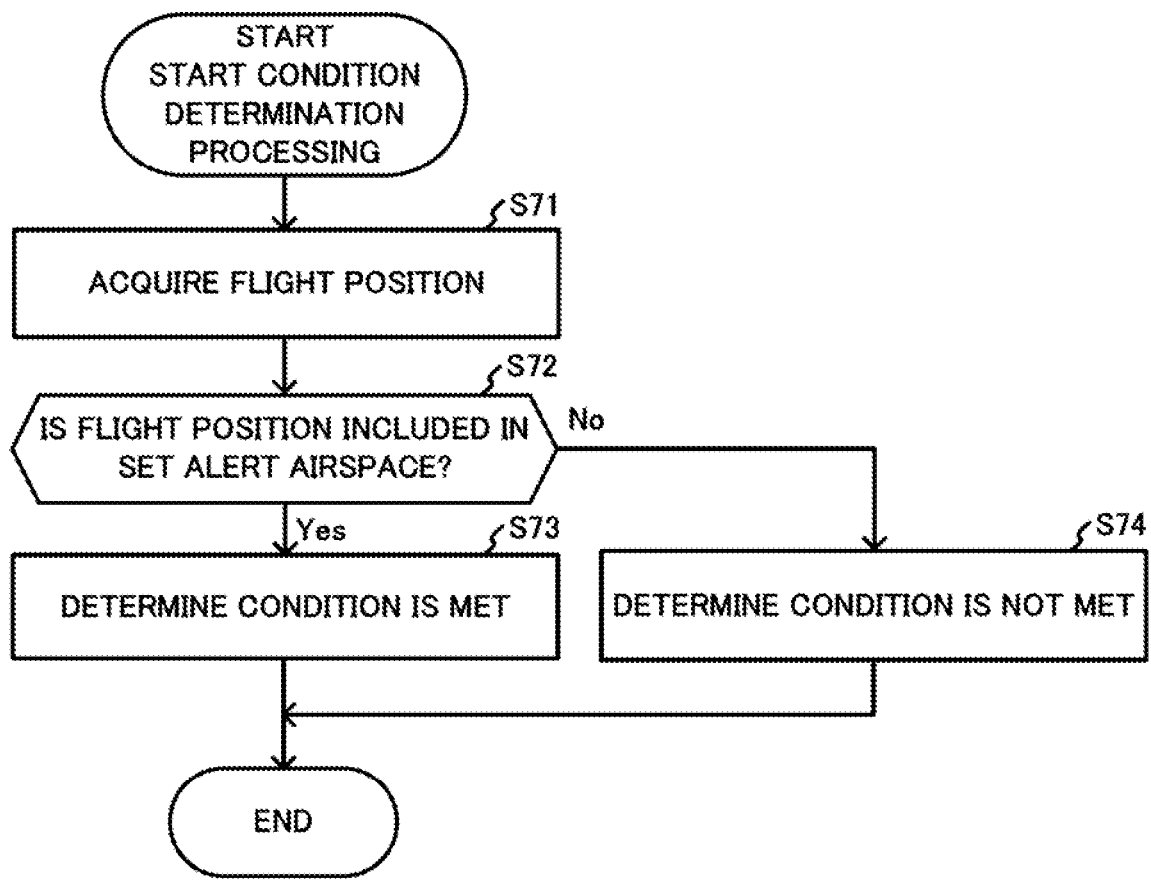
FIG. 25 is a flowchart illustrating an example of start condition determination processing executed by the control device according to Embodiment 2.

After the alert start condition and the alert end condition are set by executing step S21 of FIG. 8, the CPU 901 of the control device 900 starts the execution of start condition determination processing such as illustrated in FIG. 25 for determining whether or not the set alert start condition is met (step S22).

Next, when the execution of the start condition determination processing starts, the acquirer 910 of the control device 900 acquires the information expressing the flight position of the aircraft 100 by latitude, longitude, and altitude from the data communication circuit 904*a* (step S71).

Thereafter, the controller 930 of the control device 900 determines, on the basis of the equation that expresses the alert airspace and the information expressing the flight position, whether or not the flight position of the aircraft 100 is included in the alert airspace (step S72). At this time, when the controller 930 determines that the flight position is included in the alert airspace (step S72; Yes), the controller 930 determines that the alert start condition that the aircraft 100 enters the alert airspace is met (step S73) and, then, ends the execution of the start condition determination processing.

In contrast, when the controller 930 of the control device 900 determines that the flight position is not included in the alert airspace (step S72; No), the controller 930 determines that the alert start condition is not met (step S74) and, then, ends the execution of the start condition determination processing.

Thereafter, the processing of steps S23 to S28 of FIG. 8 described in Embodiment 1 is executed. As a result, the controller 930 of the control device 900 causes the alert device 800 to start the departure command alert related to landing at a timing that corresponds to the measured wind direction and wind speed Vw. Then, when the aircraft 100 starts taking off, the controller 930 of the control device 900 performs control for causing the alert device 800 to stop the departure command alert related to landing and, then, causes the alert device 800 to start the departure command alert related to takeoff.

Thereafter, execution of the end condition determination processing starts (step S29), the acquirer 910 of the control device 900 acquires information expressing a new flight position from the data communication circuit 904*a* and, then, the controller 930 determines, on the basis of the acquired information expressing the new flight position and the equation that expresses the alert airspace, whether or not the flight position of the aircraft 100 is included in the alert airspace.

At this time, it the controller 930 of the control device 900 determines that the flight position is included in the alert airspace, the controller 930 determines that the alert end condition that the aircraft 100 has exited the alert airspace is not met and, then, ends the execution of the end condition determination processing. In contrast, when the controller 930 determines that the flight position is not included in the alert airspace, the controller 930 determines that the alert end condition is met and, then, ends the execution of the end condition determination processing.

In the end condition determination processing executed in step S29, when a determination is made that the alert end condition is not met (step S30; No), the controller 930 of the control device 900 causes the alert device 800 to continue the departure command alert related to takeoff (step S31). Then, the controller 930 repeats the processing from step S29.

In contrast, when a determination is made that the alert end condition is met (step S30; Yes), the controller 930 of the control device 900 causes the alert device 800 to end the departure command alert related to takeoff (step S32). Then, the controller 930 repeats the processing from step S21.

According to these configurations, the behavior corresponding to the weather includes starting an alert at the timing at which the alert start condition corresponding to the weather is met, and the alert start condition is a condition related to the positional relationship between the aircraft 100 and the port PT that is the location at which landing of the aircraft 100 is scheduled. Additionally, the weather includes the wind direction and the wind speed related to the port PT, and the setter 920 of the control device 900 sets the alert start condition in accordance with the wind direction and the wind speed Vw expressed in the weather information acquired by the acquirer 910. Furthermore, the controller 930 of the control device 900 causes the alerter 810 of the alert device 800 to start the alert at the timing at which the set alert start condition is met. As such, the control device 900 can cause the alert related to landing of the aircraft 100 at the port PT to be started at an appropriate timing corresponding to the measured wind direction and wind speed Vw, even if the aircraft 100 is affected by the wind and the ground speed of the aircraft 100 changes.

According to these configurations, the alert start condition is a condition that the aircraft 100 enters the alert airspace above the alert area CA that includes the port PT and that is set by the setter 920 of the control device 900. Additionally, the setter 920 of the control device 900 sets the shape of the alert area CA in accordance with the wind direction and the wind speed Vw related to the port PT, and the controller 930 of the control device 900 causes the alert device 800 to start an alert related to landing of the aircraft 100 at the port PT at the timing at which the aircraft 100 enters the set alert airspace. As such, regardless of the direction in which the aircraft 100 flies to the port PT, the control device 900 can cause an alert related to landing of the aircraft 100 at the port PT to be started at a more appropriate timing that corresponds to the wind direction and wind speed Vw related to the port PT.

According to these configurations, the setter 920 of the control device 900 uses Equation (2) above to set the variable CXw to a value obtained by multiplying the amount of time Te required to depart from the port PT by the sum "Vw+Va" of the wind speed Vw expressed in the weather information and the airspeed Va of the aircraft 100. Additionally, in a case in which wind is blowing in the wind direction expressed in the weather information, the setter 920 sets the size in the upwind direction from the center of the alert area CA larger than the size of the port PT by the set variable CXw, as illustrated in FIG. 24. Furthermore, the controller 930 of the control device 900 causes the alert device 800 to start the departure command alert related to landing at the timing at which the alert start condition that the aircraft 100 enters the alert airspace above the alert area CA is met. Due to these configurations, even if an aircraft 100 flying from upwind toward downwind continuously flies at the fastest ground speed possible (Vw+Va) when having a tailwind, the control device 900 can cause the departure command alert related to landing to be started at a timing that is the amount of time Te required to depart from the port PT earlier than the timing at which the aircraft 100 is expected to arrive above the port PT.

Additionally, the size of the initial alert area DA is larger than the size of the port PT by the initial threshold DT and, also, the initial threshold DT is preset to a value that is obtained, as illustrated in Equation (1) above, by multiplying the airspeed Va by the amount of time Te required to depart from the port PT. In contrast, the size in the upwind direction from the center of the alert area CA is larger than the size of the port PT by the variable CXw and, also, the variable CXw is set to a value such as expressed by Equation (2) above that is larger than the initial threshold DT. As such, the size in the upwind direction from the center of the alert area CA is larger than the size of the initial alert area DA. Therefore, in a case in which the aircraft 100 flies from upwind toward downwind and, as such, the ground speed is faster than the airspeed Va, the control device 900 can cause the departure command alert to be started at a timing earlier than the timing at which the aircraft 100 enters the airspace above the initial alert area DA. As a result, the control device 900 can sufficiently prevent physical contact between the aircraft 100 and a person at the port PT or the port PT vicinity, for example.

According to these configurations, the setter 920 of the control device 900 uses Equation (8) above to set the variable CXl to a value obtained by multiplying the amount of time Te by the difference "Va−Vw" between the wind speed Vw expressed in the weather information and the airspeed Va of the aircraft 100. Additionally, in a case in which wind is blowing in the wind direction expressed in the weather information, the setter 920 sets the size in the downwind direction from the center of the alert area CA larger than the size of the port PT by the set variable CXl, as illustrated in FIG. 24. Due to these configurations, in a case in which an aircraft 100 flying from downwind toward upwind continuously flies at the fastest ground speed possible (Va−Vw) when having a headwind, the control device 900 can cause the departure command alert related to landing to be started at a timing that is the amount of time Te required to depart from the port PT earlier than the timing at which the aircraft 100 is expected to arrive above the port PT.

Since the variable CXl is a value that is smaller than the initial threshold DT, the size in the downwind direction from the center of the alert area CA is smaller than the size of the initial alert area DA. As such, in a case in which the aircraft 100 flies from downwind toward upwind and, as such, the ground speed is slower than the airspeed Va, the control device 900 can cause the departure command alert to be started at a timing later than the timing at which the aircraft 100 enters the airspace above the initial alert area DA. Therefore, the control device 900 can shorten the amount of time that the alert device 800 is caused to perform the departure command alert and, as such, can reduce the amount of power consumed by the alert device 800. Additionally, since the control device 900 can shorten the amount of time that departure from the port PT is commanded, the amount of time that the port PT can be used for a purpose other than allowing the aircraft 100 to land and allowing the aircraft 100 to takeoff can be increased. The purpose other than allowing the aircraft 100 to land and allowing the aircraft 100 to takeoff may be any purpose, and examples thereof include a purpose of a person passing through an entrance installed near the port PT using the port PT as a pathway.

According to these configurations, regardless of the direction in which the aircraft 100 flies to the port PT, the control device 900 can cause the alert device 800 to start an alert the amount of time Te required to depart from the port PT earlier than when the aircraft 100 arrives above the port PT.

The CPU 111 of the aircraft 100 according to the present embodiment executes the flight control processing illustrated in FIG. 4. As a result, the flight route from the office to the port PT is determined in step S02 of FIG. 4 and the aircraft 100 travels forward on the flight route in step S05, thereby flying from the office to the port PT, and the aircraft 100 travels back on the flight route in step S10, thereby flying from the port PT to the office. As such, if the aircraft 100 flies to the port PT from the direction expressed by the angle φ, the aircraft 100 flies from the port PT in the direction expressed by the angle φ.

However, the present disclosure is not limited thereto, and a configuration is possible in which the aircraft 100 flies on a flight route different than the flight route determined in step S02 to fly from the port PT to the office, or the aircraft 100 flies from the port PT to a port different than the port PT. That is, a configuration is possible in which, if the aircraft 100 flies to the port PT from the direction expressed by the angle φ, the aircraft 100 flies away from the port PT in a direction expressed by an angle different than the angle φ.

Modified Example 1 of Embodiment 2

Embodiment 2 and Modified Example 10 of Embodiment 1 can be combined. The present modified example is a combination of Embodiment 2 and Modified Example 10 of Embodiment 1. Similar to Modified Example 10 of Embodiment 1, in the present modified example, the aircraft 100 flies at the predetermined ground speed Vg.

In the present modified example, the initial threshold DT is preset to a value corresponding to the ground speed Vg of the aircraft 100 using Equation (6) above.

The setter 920 of the control device 900 according to the present modified example uses Equation (7) above to set the variable CXw to a value corresponding to the ground speed Vg of the aircraft 100 and the wind speed Vw expressed in the weather information. The variable CXw determines the size of the alert area CA in the downwind direction from the center of the alert area CA, The variable CXw is set in this manner because, in a case in which an aircraft 100 flying at the ground speed Vg falls, or in a case in which a falling object falls from the aircraft 100, if wind is blowing in the horizontal direction toward the port PT at the wind speed Vw in the airspace including the fall path of the aircraft 100 or the falling object, the falling point of the aircraft 100 or the falling object will be closer to the port PT in the horizontal direction than the falling start point by, at maximum, the return value of the function F2.

The setter 920 of the control device 900 according to the present modified example uses Equation (10) below to set the variable CXl to a value corresponding to the ground speed Vg and the wind speed Vw. The variable CXl determines the size of the alert area CA in the upwind direction from the center of the alert area CA.

$$CXl = D - F3(Vg, Vw) \quad (10)$$

Here, CXl is the variable to be set, D is the distance from the outer periphery of the port PT to a boundary line B of the port vicinity, Vg is the ground speed Vg of the aircraft 100, Vw is the measured wind speed, and F3 is a predetermined function.

The variable CXl is set in this manner because, in a case in which an aircraft 100 flying at the ground speed Vg falls, or in a case in which a falling object falls from the aircraft 100, if wind is blowing in the horizontal direction from the port PT toward the aircraft 100 at the wind speed Vw in the airspace including the fall path of the aircraft 100 or the falling object, the falling point of the aircraft 100 or the falling object will be farther from the port PT in the horizontal direction than the falling start point by, at minimum, a return value of the function F3.

The function F3 has the wind speed Vw and the ground speed Vg as arguments, and has, as the return value, the horizontal distance between a projection starting point and a falling point in a case in which the aircraft 100 or the falling object, of which the proportional coefficient of air resistance is the value κ, is horizontally projected at the ground speed Vg from the lower limit Hl of the flight altitude in a direction from upwind toward downwind and, also, wind is blowing uniformly in the horizontal direction at the wind speed Vw in the airspace including the fall path of the aircraft 100 or the falling object.

Likewise, the setter 920 of the control device 900 uses Equation (11) below to set a variable CY to a value that corresponds to the ground speed Vg and the wind speed Vw. The variable CY determines the size of the alert area CA in a direction orthogonal to the upwind direction.

Equation 2

$$CY = F4y(Vg, Vw) + \sqrt{(DP+D)^2 - F4x(Vg, Vw)^2} - DP \quad (11)$$

Here, CY is the variable to be set, F4x and F4y are predetermined functions, DP is the radius of the port PT, and D is the distance from the outer periphery of the port PT to the boundary line B of the port vicinity.

The function F4x has the wind speed Vw and the ground speed Vg as arguments, and has, as a return value, the horizontal distance in the down wind direction between a projection starting point and a falling point in a case in which the aircraft 100 or the falling object, of which the proportional coefficient of air resistance is the value is horizontally projected at the ground speed Vg from the upper limit Hh of the flight altitude in a direction orthogonal to the upwind direction and, also, wind is blowing uniformly in the horizontal direction at the wind speed Vw in the airspace including the fall path of the aircraft 100 or the falling object.

The function F4y has the wind speed Vw and the ground speed Vg as arguments, and has, as a return value, the horizontal distance in the direction orthogonal to the upwind direction between a projection starting point and a falling point in a case in which the aircraft 100 or the falling object, of which the proportional coefficient of air resistance is the value κ, is horizontally projected at the ground speed Vg from the upper limit Hh of the flight altitude in the direction orthogonal to the upwind direction and, also, wind is blowing uniformly in the horizontal direction at the wind speed Vw in the airspace including the fall path of the aircraft 100 or the falling object.

Figure 26:
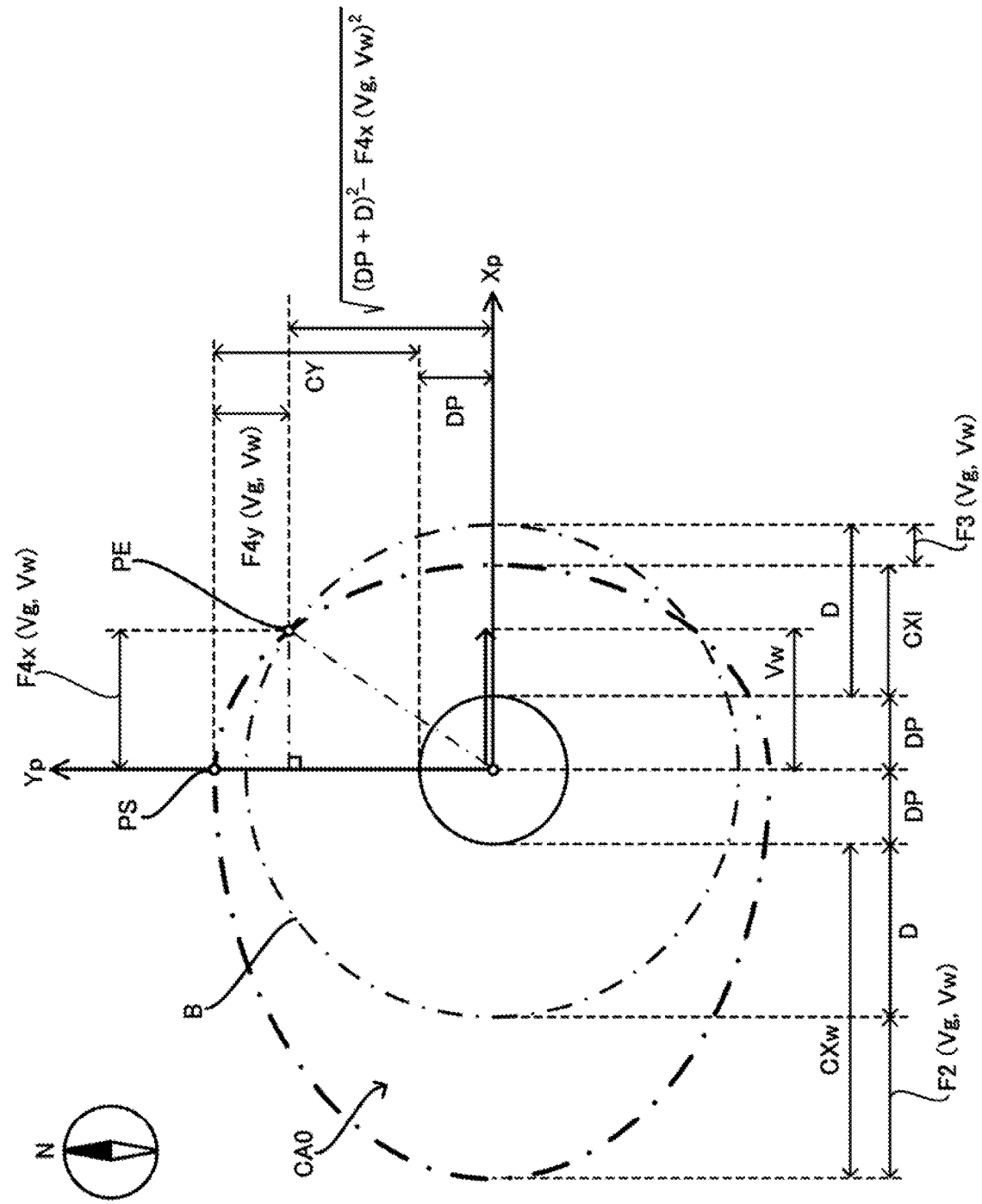
FIG. 26 is a drawing illustrating an example of an alert area according to Modified Example 1 of Embodiment 2.

The variable CY is set to such a value because, as illustrated in FIG. 26, in a case in which wind is blowing at the wind speed Vw in the positive direction of the Xp axis in the airspace including the fall path of the aircraft 100 or the falling object, when the aircraft 100 or the falling object flying in the negative direction of the Yp axis starts to fall from the falling start point PS, the falling point PE of the aircraft 100 or the falling object will be closer, in the Yp axis direction, to the port PT than to the falling start point PS by a distance less than or equal to the return value of the function F4y, and will be farther, in the Xp axis direction, from the falling start point PS by a distance less than or equal to the return value of the function F4x. Additionally, in a case in which the falling point PE is included in the boundary line B of the port PT vicinity, the distance in the Yp direction from the falling point PE to the center point of the port PT is equivalent to the length of the adjacent of a right triangle of which the length of the hypotenuse is "DP+DT", and the length of the opposite side is the return value of the function F4x.

According to these configurations, in a case in which the aircraft 100 starts falling or in a case in which a predetermined falling object starts falling from the aircraft 100, the setter 920 of the control device 900 sets, in accordance with the measured wind direction and wind speed Vw, the alert airspace to airspace that includes the falling start point such that the falling point of the aircraft 100 or the falling object is included in the port PT or the port PT vicinity. Additionally, the controller 930 of the control device 900 causes the alert device 800 to start the falling possibility alert, which informs of a risk that the aircraft 100 or the falling object will fall at the port PT or the port PT vicinity, at the timing at which the alert start condition that the aircraft 100 enters the set alert airspace is met. As such, in a case in which the aircraft 100 starts falling or the predetermined falling object starts falling from the aircraft 100, regardless of the direction in which the aircraft 100 is flying, when the aircraft 100 is flying at a position such that the falling point is included in the port PT or the port PT vicinity, the control device 900 can cause the alert device 800 to start the falling possibility alert. Therefore, the control device 900 can sufficiently prevent, in accordance with the measured wind direction and wind speed Vw, physical contact between a person at the port PT or the port PT vicinity and the aircraft 100 or the falling object.

In the present modified example, a description is given in which the aircraft 100 flies at the predetermined ground speed Vg, but the present disclosure is not limited thereto. A configuration is possible in which the aircraft 100 flies at a ground speed that is greater than or equal to a predetermined minimum speed and, also, less than or equal to a predetermined maximum speed. Additionally, a configuration is possible in which the aircraft 100 flies at a predetermined airspeed Va, or flies at an airspeed that is greater than or equal to a predetermined minimum speed and, also, less than or equal to a predetermined maximum speed.

Modified Example 2 of Embodiment 2

In Embodiment 2, a description is given in which the acquirer 910 of the control device 900 acquires the weather information expressing the wind direction and the wind speed Vw measured by the weather measurement device 700, and the setter 920 sets the alert area CA in accordance with the wind direction and wind speed Vw expressed in the acquired weather information.

However, the present disclosure is not limited thereto, and the acquirer 910 of the control device 900 according to the present modified example acquires weather information expressing a wind direction measured by the weather measurement device 700, and the setter 920 sets the alert area CA in accordance with the wind direction expressed in the acquired weather information.

In order to set the alert area CA, the setter 920 of the control device 900 reads, from the information storage 990, information expressing a maximum value of wind speed related to the port measured in the past. Next, the setter 920 substitutes the maximum value of the wind speed expressed in the read information for the variable Vw used in Equations (2), (8), and (9) above to calculate the variables CXw, CXl, and CY that determine the size of the alert area CA. Then, the setter 920 calculates, on the basis of the calculated variables CXw, CXl, and CY, and the angle θ expressing the wind direction expressed in the acquired weather information, an equation that expresses the shape of the alert area CA such as illustrated in FIG. 21.

Thereafter, the setter 920 of the control device 900 sets the alert start condition to a condition that the aircraft 100 enters an alert airspace above the set alert area CA, and sets the alert end condition to a condition that the aircraft 100 exits that alert airspace. The controller 930 of the control device 900 according to the present modified example performs control for causing the alert device 800 to start an alert at the timing at which the set alert start condition is met, and causes the alert device 800 to end the alert at the timing at which the set alert end condition is met.

According to these configurations, regardless of the direction in which the aircraft 100 flies to the port PT, provided that wind is blowing at a wind speed less than or equal to the maximum value of the wind speed measured in the past, the control device 900 can cause the alert device 800 to start the alert at an appropriate timing, even if the aircraft 100 is affected by the wind and the ground speed of the aircraft 100 changes. Additionally, regardless of the direction in which the aircraft 100 flies away from the port PT, provided that wind is blowing at a wind speed less than or equal to the maximum value of the wind speed measured in the past, the control device 900 can cause the alert device 800 to end the alert at an appropriate timing, even if the aircraft 100 is affected by the wind and the ground speed of the aircraft 100 changes.

Modified Example 3 of Embodiment 2

In Embodiment 2, a description is given in which the acquirer 910 of the control device 900 acquires the weather information expressing the wind direction and the wind speed Vw measured by the weather measurement device 700, and the setter 920 of the control device 900 sets the alert area CA in accordance with the wind direction and wind speed Vw expressed in the acquired weather information.

However, the present disclosure is not limited thereto, and the acquirer 910 of the control device 900 according to the present modified example acquires weather information expressing the wind speed Vw measured by the weather measurement device 700, and the setter 920 sets the alert area CA in accordance with the wind speed Vw expressed in the acquired weather information.

In order to set the alert area CA, the setter 920 of the control device 900 uses Equation (2) above to calculate the variable CXw that determines the size of the alert area CA. Then, the setter 920 sets the alert area CA to a circular region that has the center point of the port PT as a center point, and that has a radius that is greater than the radius DP of the port PT by the variable CXw.

Thereafter, the setter 920 control device 900 sets the alert start condition to a condition that the aircraft 100 enters an alert airspace above the set alert area CA, and sets the alert end condition to a condition that the aircraft 100 exits that alert airspace. The controller 930 of the control device 900 according to the present modified example performs control for causing the alert device 800 to start an alert at the timing as which the set alert start condition is met, and causes the alert device 800 to end the alert at the timing at which the set alert end condition is met.

According to these configurations, regardless of the direction in which the aircraft 100 flies to the port PT, the control device 900 can cause the alert device 800 to start an alert at an appropriate timing that corresponds to the wind speed Vw. Additionally, regardless of the direction in which the aircraft 100 flies away from the port PT, the control device 900 can cause the alert device 800 to end the alert at an appropriate timing that corresponds to the wind speed Vw.

Modified Example 4 of Embodiment 2

In Embodiment 2, as illustrated in FIG. 21, a description is given in which the shape of the initial alert area DA is circular because the shape of the port PT is circular. However, the present disclosure is not limited thereto. The initial alert area DA may have any shape. For example, the initial alert area DA may have a polygonal shape such as a triangular shape, a square shape, a rectangular shape, and a pentagonal shape, or an elliptical shape. Additionally, the shape of the initial alert area DA need not similar to the shape of the port PT.

In Embodiment 2, a description is given in which the shape of the initial alert area DA is circular, and the radius of the initial alert area DA is equivalent to the sum of the radius DP of the port PT and the initial threshold DT. Furthermore, in Embodiment 2, a description is given in which the initial threshold DT is a value that is obtained by multiplying the airspeed Va by the amount of time Te required to depart. However, the present disclosure is not limited thereto. A configuration is possible in which the radius of the initial alert area DA is preset to a length that is unrelated to the airspeed Va and/or the amount of time Te required to depart.

Additionally, a configuration is possible in which the setter 920 of the control device 900 expand transforms the shape of the initial alert area DA greater in the Xp axis direction as the wind speed Vw expressed in the weather information increases, rotate transforms the shape obtained by the expand transformation by the angle θ that expresses the wind direction expressed in the weather information, and sets the shape obtained by the rotation transformation as the alert area CA. A person skilled in the art can determine, by experiment, the optimal expansion rate for the expansion transformation.

Modified Example 5 of Embodiment 2

In Embodiment 2, a description is given in which the alert airspace is airspace from the surface of the alert area CA to the predetermined upper limit Hh of the flight altitude of the aircraft 100. However, the present disclosure is not limited thereto. Provided that the alert airspace is airspace above the alert area CA, any airspace may be used. For example, a configuration is possible in which the alert airspace is airspace that is above the alert area CA and that is airspace from the predetermined lower limit Hl to the predetermined upper limit Hh of the flight altitude of the aircraft 100. Additionally, a configuration is possible in which the alert airspace is airspace from the surface of the alert area CA to an altitude higher than the upper limit Hh of the flight altitude, or the alert airspace is airspace that is above the alert area CA and that is from the lower limit Hl to an altitude higher than the upper limit Hh of the flight altitude of the aircraft 100.

Modified Example 6 of Embodiment 2

In Embodiment 2, a description is given in which the weather measurement device 700 is implemented as an ultrasonic anemometer, but the present disclosure is not limited thereto, and a configuration is possible in which the weather measurement device 700 is implemented as a wind vane-type anemometer.

Embodiment 3

In Embodiment 1, a description is given in which the controller 930 of the control device 900 causes the alert device 800 to start an alert at the timing at which an alert start condition set in accordance with the weather is met. However, the present disclosure is not limited thereto. In the present embodiment, the controller 930 causes the alert device 800 to perform an alert in a mode set in accordance with the weather. In the following, the configurations that are the same as those in Embodiment 1 are marked with the same reference numerals used in Embodiment 1, and the description focuses on the differences between the present embodiment and Embodiment 1.

The weather measurement device 700 according to the present embodiment is implemented as an ultrasonic three-dimensional wind direction anemometer. The weather measuring circuit 719 of the weather measurement device 700 generates a weather vector that is a vector expressing the wind speed Vw and the wind direction and that has, as components, the Xm axis direction wind speed, the Ym axis direction wind speed, and the Zm axis direction measured by the method described in Embodiment 1 as components. Then, the weather measuring circuit 719 outputs a signal expressing the generated weather vector to the CPU 701.

The alerter 810 of the alert device 800 according to the present embodiment includes a non-illustrated amplification circuit, a variable resistance circuit, or a variable voltage divider circuit that changes the current flowing through the speaker 811 or the voltage applied to the speaker 811. The alert device 800 according to the present embodiment is installed such that an output direction, that is a direction parallel to a speaker axis of the speaker 811 and that is a direction in which sound output from the speaker 811 propagates in space, is a direction from the speaker 811 toward the port PT.

The information storage 990 of the control device 900 according to the present embodiment stores, in advance, information expressing the output direction of the speaker 811 using a vector of the coordinate system of the weather measurement device 700. Additionally, the information storage 990 stores, in advance, information expressing a predetermined initial volume of the speaker 811, and information expressing an amount of correction used to correct the volume.

Figure 27:
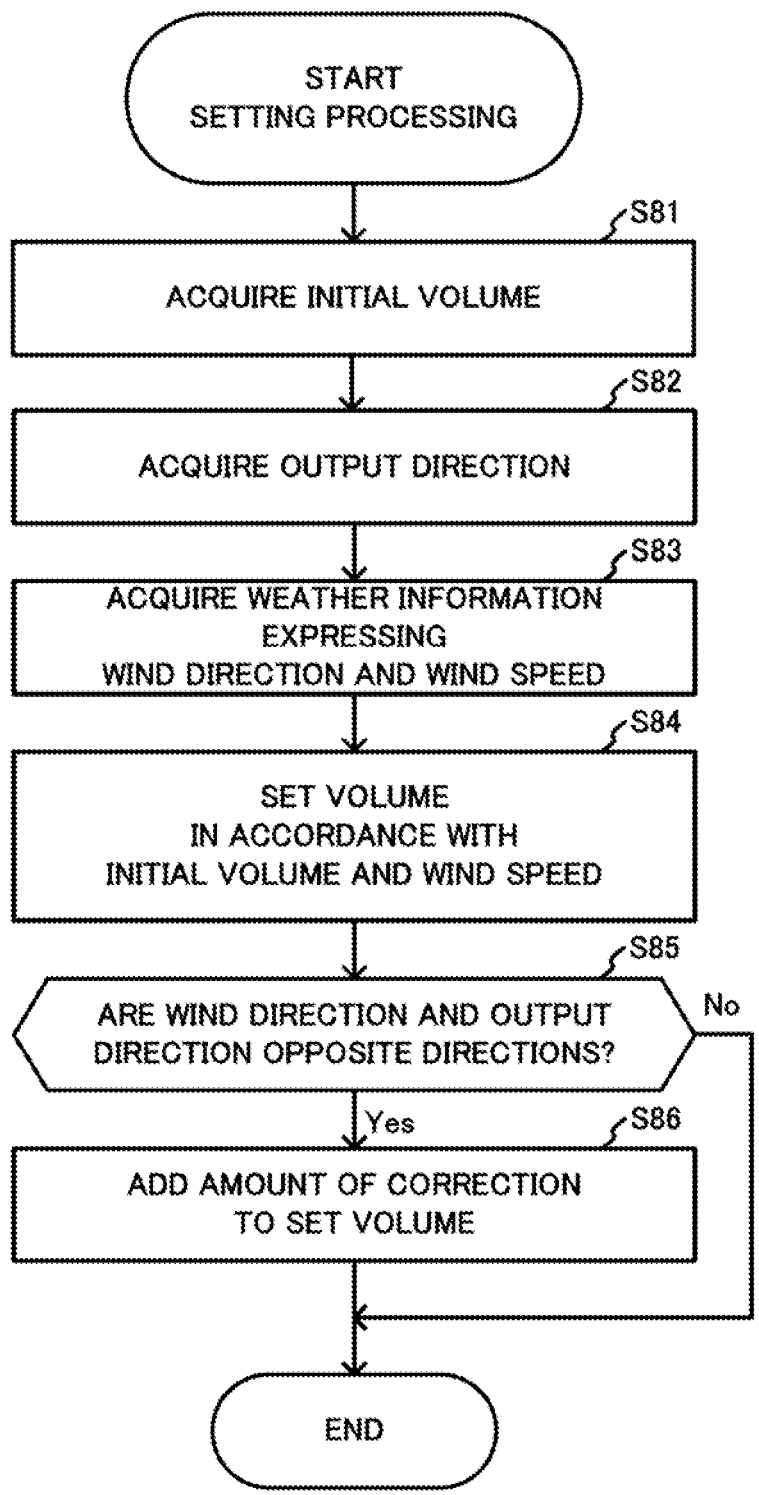
FIG. 27 is a flowchart illustrating an example of setting processing executed by a control device according to Embodiment 3.

When the CPU 901 of the control device 900 according to the present embodiment starts the execution of the alert control processing of FIG. 8, the CPU 901 executes setting processing such as illustrated in FIG. 27 for setting an alert mode of the alert device 800 (step S21).

When the execution of the setting processing starts, the acquirer 910 of the control device 900 acquires, from the information storage 990, the information expressing the initial volume and output direction information expressing the output direction of the speaker 811 (steps S81 and S82). Next, the acquirer 910 acquires, on the basis of a signal input from the input/output port 908a, weather information expressing, using the vector of the coordinate system of the weather measurement device, the wind direction and the wind speed Vw measured by the weather measurement device 700 (step S83).

Thereafter, the setter 920 of the control device 900 sets the volume of the speaker 811 in accordance with the initial volume expressed in the information read in step S81, and the wind speed Vw expressed in the weather information acquired in step S83 (step S84). For example, in a case in which the wind speed Vw is "0" meters per second, it is sufficient that the setter 920 sets the volume of the speaker 811 to the initial volume, and the speaker 811 is set to a higher volume than the initial volume as the wind speed Vw becomes faster than "0" meters per second.

The volume of the speaker 811 is set in this manner because, as the wind speed Vw increases, greater wind noise is produced due to wind blowing on an object or a person at the port PT or the port PT vicinity, and this greater wind noise makes it more difficult for a person at the port PT or the port PT vicinity to hear the audio outputted from the speaker 811.

Next, the setter 920 of the control device 900 determines whether or not the wind direction expressed in the weather information and the output direction of the speaker 811 expressed in the output direction information are opposite directions (step S85). At this time, the setter 920 calculates the inner product of the vector expressed in the output direction information and the vector expressed in the weather information. Next, when the setter 920 determines that the calculated inner product is a negative value, the setter 920 determines that the wind direction expressed in the weather information and the output direction of the speaker 811 are opposite directions (step S85; Yes).

Next, the setter 920 of the control device 900 reads, from the information storage 990, information expressing a positive amount of correction, adds the amount of correction to the volume of the speaker 811 set in step S84 (step S86) and, then, ends the execution of the setting processing. The amount of correction is added to the set volume because, when wind is blowing in the opposite direction of the output direction of the speaker 811, sound is less likely to propagate in the output direction of the speaker 811 compared to cases in which wind is not blowing and cases in which wind is blowing in a direction that is not the opposite direction of the output direction of the speaker 811.

In contrast, when the setter 920 determines that the calculated inner product is a value greater than or equal to "0", the setter 920 determines that the wind direction expressed in the weather information and the output direction of the speaker 811 are not opposite directions (step S85; No), and ends the execution of the setting processing without executing the processing of step S86.

After setting the volume by executing step S21 of FIG. 8, the CPU 901 of the control device 900 starts the execution of the start condition determination processing illustrated in FIG. 12 (step S22) to determine whether or not the initial alert start condition is met.

At this time, when a determination is made that the alert start condition is not met (step S23; No), the processing is repeated from step S21. In contrast, when a determination is made that the alert start condition is met (step S23; Yes), the controller 930 of the control device 900 causes the alert device 800 to start an alert at the volume set in step S21 (step S24). To accomplish this, the controller 930 outputs, to the alert device 800 via the input/output port 908b, a control signal for causing the departure command alert related to landing to start and a setting signal expressing the set volume.

The CPU 801 of the alert device 800 outputs, to the non-illustrated amplification circuit, the variable resistance circuit, or the variable voltage divider circuit, a signal for changing the current flowing through the speaker 811 or the voltage to be applied to the speaker 811 to current or voltage that corresponds to the volume expressed in the setting signal input by the control device 900. Then, the CPU 801 starts outputting a signal to the alerter 810 in accordance with the control signal input by the control device 900. The speaker 811 of the alerter 810 starts outputting the audio used in the departure command alert related to landing, at the volume set by the control device 900 in accordance with the signal output by the CPU 801.

Thereafter, the processing of steps S25 to S27 of FIG. 8 are executed (steps S25 to S27). As a result, the controller 930 of the control device 900 causes the alert device 800 to end the alert related to landing. Next, the controller 930 causes the alert device 800 to start an alert related to takeoff of the aircraft 100 at the volume set in step S21 (step S28).

Thereafter, the processing of steps S29 to S32 of FIG. 8 are executed (steps S29 to S32). As a result, the controller 930 of the control device 900 causes the alert device 800 to end the alert related to takeoff. Then, the processing is repeated from step S21.

According to these configurations, the behavior corresponding to the weather includes performing, in a mode corresponding to the weather, an alert related to landing of the aircraft 100. Additionally, the controller 930 of the control device 900 causes the alerter 810 of the alert device 800 to perform, in a mode corresponding to the weather expressed in the weather information acquired by the acquirer 910, the alert related to landing of the aircraft 100. As such, the control device 900 can cause the alerter 810 to perform a sufficient alert in a mode corresponding to the weather.

According to these configurations, the mode corresponding to the weather includes the volume corresponding to the wind speed, and the controller 930 of the control device 900 causes the alerter 810 of the alert device 800 to perform, at a volume corresponding to the wind speed Vw expressed in the weather information acquired by the acquirer 910, an alert related to landing of the aircraft 100 at the port PT. The output direction in which the alerter 810 outputs the audio is the direction from the alerter 810 toward the port PT. As such, even when wind noise is generated at the port PT or the port PT vicinity, the control device 900 can suppress cases in which it is difficult for a person at the port PT or the port PT vicinity to hear the audio output from the alerter 810. Therefore, it is possible to prevent physical contact between a person at the port PT or the port PT vicinity and the aircraft 100.

When the setter 920 of the control device 900 determines that the wind direction expressed in the weather information and the output direction of the alerter 810 are opposite directions, the setter 920 increases the set volume of the speaker 811 by a positive amount of correction. As such, it is possible to suppress cases in which it is difficult for a person upwind from the alerter 810 to hear the audio output from the alerter 810.

In the present embodiment, a description is given in which the setter 920 of the control device 900 sets the volume in accordance with the wind speed Vw and the wind direction expressed in the weather information. However, the present disclosure is not limited thereto. A configuration is possible in which the setter 920 sets the volume in accordance with only the wind speed Vw expressed in the weather information, or the setter 920 sets the volume in accordance with only the wind direction expressed in the weather information.

In the present embodiment, a description is given in which the setter 920 of the control device 900 sets the volume of the speaker 811 by adding an amount of correction to the initial volume. However, the present disclosure is not limited thereto. A configuration is possible in which the setter 920 sets the volume of the speaker 811 by subtracting an amount of correction from the initial volume.

Modified Example 1 of Embodiment 3

In Embodiment 3, a description is given in which the controller 930 of the control device 900 causes the alert device 800 to perform an alert at a volume set in accordance with the wind speed Vw and the wind direction. However, the present disclosure is not limited thereto. The controller 930 according to the present modified example causes the alert device 800 to perform an alert at a volume set in accordance with the weather.

A volume table such as illustrated in FIG. 28 is stored in advance in the information storage 990 of the control device 900 according to the present modified example. Information related to an amount of correction used to correct the volume is stored in advance in the volume table. A plurality of records is stored in the volume table of FIG. 28. Weather information expressing a name of weather, and information expressing the amount of correction to be used for that weather are associated and stored in advance in each of the records.

In the present modified example, weather information expressing each of the weather names "rain", "snow", "rain with thunder", and "clear with strong wind" is stored in the volume table. The weather information expressing the weather names "rain", "rain with thunder", and "clear with strong wind" is stored in the volume table because it is difficult for a person at the port PT or the port PT vicinity to hear the audio output from the speaker 811 due to the sounds of rain, thunder, and wind. Additionally, the weather information expressing the weather name "snow" is stored in the volume table because snow absorbs sound.

Figure 29:
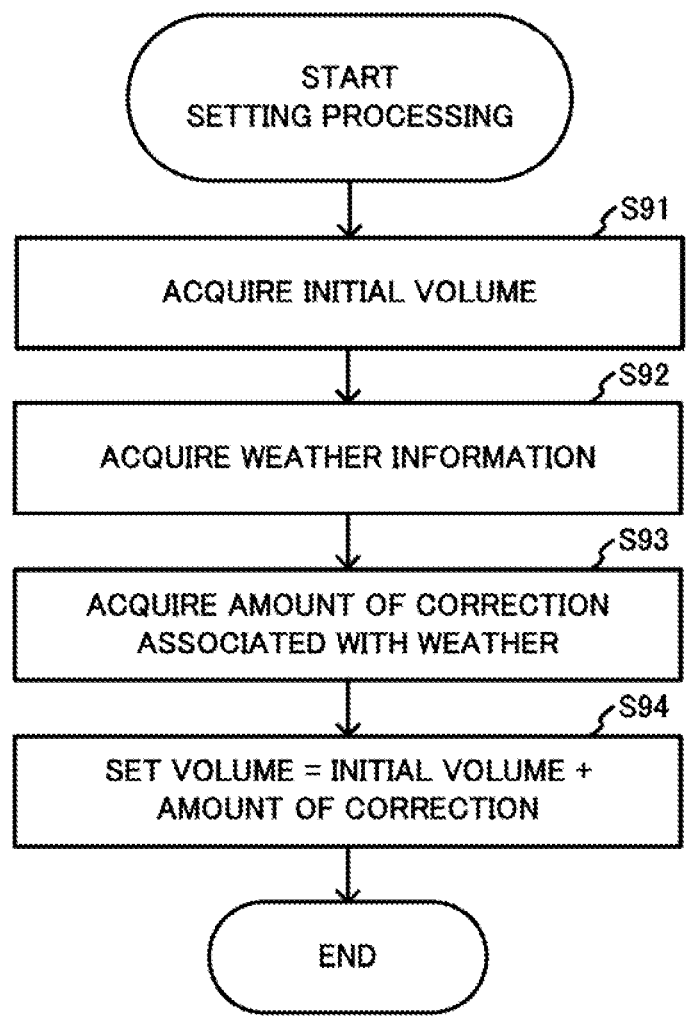
FIG. 29 is a flowchart illustrating an example of setting processing executed by a control device according to Modified Example 1 of Embodiment 3.

The CPU 901 of the control device 900 according to the present modified example executes setting processing such as illustrated in FIG. 29. When the execution of the setting processing starts, the acquirer 910 of the control device 900 acquires the information expressing the initial volume from the information storage 990 (step S91).

Thereafter, the acquirer 910 of the control device 900 reads a uniform resource locater (URL) of a non-illustrated server stored in advance in the information storage 990. Next, the acquirer 910 generates a send request requesting sending of weather information expressing the weather measured in a region including the port PT or the weather forecast for the region including the port PT. Then, the acquirer 910 outputs the generated send request to the data communication circuit 904a with the read URL as the destination.

When the send request is received, the non-illustrated server returns weather information that expresses the name of the weather that is measured or forecast at a date and time closest to the receiving date and time of the send request, and that is the weather of the area including the port PT. When the data communication circuit 904a of the control device 900 receives the weather information, the acquirer 910 of the control device 900 acquires that weather information from the data communication circuit 904a (step S92).

Thereafter, the setter 920 of the control device 900 acquires the information expressing the amount of correction associated, in the volume table of FIG. 28, with the weather information acquired in step S92 (step S93). Next, the setter 920 sets the volume of the speaker 811 to a value obtained by adding the amount of correction expressed in the information acquired in step S93 to the initial volume expressed in the information read in step S91 (step S94). Then, the setter 920 ends the execution of setting processing.

The controller 930 of the control device 900 causes the alert device 800 to perform, at the volume set by the setter 920, an alert related to landing of the aircraft 100 at the port PT and an alert related to takeoff of the aircraft 100 from the port PT.

According to these configurations, the controller 930 of the control device 900 causes the alerter 810 of the alert device 800 to perform, at a volume set in accordance with the weather expressed in the weather information, an alert related to landing of the aircraft 100 at the port PT. As such, the control device 900 can suppress cases in which it is difficult for a person at the port PT or the port PT vicinity to hear the audio output from the alerter 810 due to rain, thunder, or wind sounds, or sound absorption by snow.

In the present modified example, a description is given in which weather information expressing each of the weather names "rain", "snow", "rain with thunder", and "clear with strong wind" is stored in the volume table illustrated in FIG. 28. However, the weather information stored in the volume table is not limited thereto. For example, weather information expressing the weather name "freezing rain" or weather information expressing the weather name "hail" may be stored in the volume table.

Modified Example 2 of Embodiment 3

In Embodiment 3, a description is given in which the controller 930 of the control device 900 causes the alert device 800 to perform an alert at a volume set in accordance with the wind speed Vw. However, the present disclosure is not limited thereto. The controller 930 according to the present modified example causes a LED 813 of the alert device 800 to perform an alert at a luminous intensity set in accordance with the weather.

A luminous intensity table such as illustrated in FIG. 30 is stored in advance in the information storage 990 of the control device 900 according to the present modified example. Information related to an amount of correction used to correct the luminous intensity is stored in advance in the luminous intensity table. A plurality of records is stored in the luminous intensity table. Weather information expressing a name of weather, and information expressing the amount of correction to be used for that weather are associated and stored in advance in each of the records.

In the present modified example, weather information expressing each of the weather names "rain", "snow" and "rain with thunder" is stored in the luminous intensity table. The weather information expressing the weather names "rain", "snow", and "rain with thunder" is stored in the luminous intensity table because, due to rain clouds and snow clouds, the amount of sunlight on the port PT or the port PT vicinity is less than on a clear day.

The CPU 901 of the control device 900 according to the present modified example executes setting processing such as illustrated in FIG. 31. When the execution of the setting processing starts, the acquirer 910 of the control device 900 acquires the information expressing an initial luminous intensity from the information storage 990 (step S101). Then, the acquirer 910 of the control device 900 acquires, by the method described in Modified Example 2 of Embodiment 3, weather information expressing the measured or forecast weather name (step S102).

Next, the setter 920 of the control device 900 acquires the information expressing the amount of correction associated, in the luminous intensity table of FIG. 30, with the weather information acquired in step S102 (step S103). Thereafter the setter 920 sets the luminous intensity of the LED 813 to a value obtained by subtracting the amount of correction expressed in the information acquired in step S103 from the initial luminous intensity expressed in the information read in step S101 (step S104) and, then, the setter 920 ends the execution of the setting processing.

Thereafter, the controller 930 of the control device 900 determines whether or not "thunder", for example, is included in the weather name expressed in the weather information, thereby determining whether or not the measured weather is accompanied by thunder. At this time, when the controller 930 determines that the measured weather is accompanied by thunder due to "thunder" being included in the weather name, the controller 930 forbids flashing of the LED 813. Flashing of the LED 813 is forbidden in order to prevent confusion between the flashing of the LED 813 and lightning. In contrast, when the controller 930 determines that the measured weather is not accompanied by thunder due to "thunder" not being included in the weather name, the controller 930 allows flashing of the LED 813.

Thereafter, the controller 930 of the control device 900 performs control for causing the alert device 800 to perform an alert at the luminous intensity set by the setter 920. To accomplish this, the controller 930 outputs, to the alert device 800 via the input/output port 908b, a control signal for starting the alert, a setting signal expressing the set luminous intensity, and a permission prohibition signal expressing permission or prohibition for flashing.

The alert device 800 according to the present modified example includes a non-illustrated variable resistance circuit or variable voltage divider circuit that changes the current flowing through the LED 813 or the voltage applied to the LED 813.

The CPU 801 of the alert device 800 according to the present modified example outputs, to the non-illustrated variable resistance circuit or variable voltage divider circuit, a signal for changing the current flowing through the LED 813 or the voltage to be applied to the LED 813 to current or voltage that corresponds to the luminous intensity expressed in the setting signal input by the control device 900. Then, when the permission prohibition signal input by the control device 900 is a signal expressing that flashing is allowed, the CPU 801 outputs, to the alerter 810, a signal that causes the LED 813 to flash in accordance with the control signal input by the control device 900. The drive circuit 812 of the alerter 810 causes the LED 813 to flash in accordance with the signal output by the CPU 801. In contrast, when the permission prohibition signal is a signal expressing that flashing is forbidden, the CPU 801 outputs, to the drive circuit 812, a signal that causes the LED 813 to light in accordance with the control signal, and the drive circuit 812 causes the LED 813 to light in accordance with the signal output by the CPU 801.

According to these configurations, the controller 930 of the control device 900 performs control for causing the alerter 810 of the alert device 800 to perform an alert at a luminous intensity set in accordance with the weather expressed in the weather information acquired by the acquirer 910. As such, the control device 900 can cause the alerter 810 to perform an alert at a luminous intensity that corresponds to the sunlight at the port PT or the port PT vicinity and, as a result, the amount of power consumed by the alerter 810 can be reduced while suppressing decreases in the visibility of the alert by a person at the port PT or the port PT vicinity.

In the present modified example, a description is given in which weather information expressing each of the weather names "rain", "snow", and "rain with thunder" is stored in the luminous intensity table. However, the weather information stored in the luminous intensity table is not limited thereto. For example, weather information expressing the weather name "freezing rain", weather information expressing the weather name "hail", or weather information expressing the weather name "snow with thunder" may be stored in the luminous intensity table.

In the present modified example, a description is given in which the setter 920 of the control device 900 sets the luminous intensity of the LED 813 by subtracting an amount of correction from the initial luminous intensity. However, the present disclosure is not limited thereto. A configuration is possible in which the setter 920 sets the luminous intensity of the LED 813 by adding an amount of correction to the initial luminous intensity.

Modified Example 3 of Embodiment 3

In Embodiment 3, a description is given in which the controller 930 of the control device 900 causes the speaker 811 of the alert device 800 to perform an alert at a volume set in accordance with the weather. However, the present disclosure is not limited thereto. A configuration is possible in which the controller 930 of the control device 900 causes the display device 815b of the alert device 800 to perform an alert at an illuminance set in accordance with the weather.

Embodiment 4

In Embodiment 1, a description is given in which the alert start condition corresponding to the weather is a condition that the distance between the port PT and the aircraft 100 becomes less than or equal to the threshold CT set in accordance with the weather, and the alert end condition corresponding to the weather is a condition that the distance between the port PT and the aircraft 100 becomes greater than the threshold CT. However, the present disclosure is not limited thereto, and in the present embodiment, the alert start condition corresponding to the weather is a condition that the aircraft 100 arrives at an alert start point set in accordance with the weather, and the alert end condition corresponding to the weather is a condition that the aircraft 100 arrives at an alert end point set in accordance with the weather. In the following, the configurations that are the same as those in Embodiment 1 are marked with the same reference numerals used in Embodiment 1, and the description focuses on the differences between the present embodiment and Embodiment 1.

As in Modified Example 19 of Embodiment 1, the alert system 1 according to the present embodiment includes the aircraft 100, but does not include the weather measurement device 700, the alert device 800, and the control device 900.

The LiDAR sensor 151 on the front face of the aircraft 100 illustrated in FIG. 2 emits laser light in the airspace that includes the flight route of the aircraft 100, and receives laser light reflected by fine particles floating in the airspace to measure the distance from the LiDAR sensor 151 to the fine particles. Additionally, the LiDAR sensor 151 on the front face calculates, on the basis of an emission direction of the laser light and the measured distance, coordinate values of the fine particles in the coordinate system of the aircraft 100, and outputs signals expressing the calculated coordinate values of the fine particles. The non-illustrated LiDAR sensor on the back face outputs signals expressing the coordinate values of fine particles floating in the airspace that includes the flight route, in the same manner as the LiDAR sensor 151 on the front face.

The aircraft 100 according to the present embodiment includes the alerter 180 described in Modified Example 19 of Embodiment 1. Additionally, when the CPU 111 of the aircraft 100 according to the present embodiment starts the execution of the flight control processing illustrated in FIG. 4, the CPU 111 executes the alert control processing illustrated in FIG. 8 in a thread that differs from the thread in which the flight control processing is executed. As such, the CPU 111 of the aircraft 100 functions as the measurer 170, the acquirer 191, the setter 192, and the controller 193 described in Modified Example 19 of Embodiment 1. Additionally, the flash memory 113*b* of the vehicle 100 functions as the information storage 199 described in Modified Example 19 of Embodiment 1.

When the CPU 111 of the aircraft 100 according to the present modified example starts the execution of the alert control processing of FIG. 8, the CPU 111 executes setting processing such as illustrated in FIG. 32 for setting an alert starting point in accordance with the weather (step S21).

When the execution of the setting processing of FIG. 32 starts, the measurer 170 of the aircraft 100 acquires signals output from the LiDAR sensor 151 on the front face and the non-illustrated LiDAR sensor on the back face. Next, when a predetermined amount of time elapses from the acquisition time of those signals, the acquirer 191 again acquires signals output from the LiDAR sensor 151 on the front face and the non-illustrated LiDAR sensor on the back face. Then, the measurer 170 measures, on the basis of the coordinate values of the fine particles expressed in the previously acquired signals, the coordinate values of the fine particles expressed in the subsequently acquired signals, and the predetermined amount of time, a direction and flow speed at which an airstream passing through the flight route of the aircraft 100 flows. Then, the measurer 170 generates weather information expressing the direction and flow speed of the airstream.

Next, the acquirer 191 of the aircraft 100 acquires the weather information from the measurer 170 (step S111), and acquires, from the information storage 199, information expressing the flight route determined in step S02 of FIG. 4 (step S112).

Next, the setter 192 of the aircraft 100 predicts, on the basis of the information expressing the flight route and the weather information expressing the direction and the flow speed of the airstream that passes through the flight route, a passing time at which the aircraft 100 will pass each of a plurality of passing points included in the flight route (step S113). Additionally, the setter 192 predicts, on the basis of the information expressing the flight route and the weather information expressing the direction and the flow speed of the airstream, an arrival time at which the aircraft 100 will arrive above the port PT (step S114).

Thereafter, the setter 192 of the aircraft 100 identifies one or a plurality of passing points that the aircraft 100 is predicted to pass at a passing time that is the amount of time Te required to depart from the port PT or longer before the arrival time above the port PT (step S115).

Next, the setter 192 of the aircraft 100 sets, as the alert starting point and the alert ending point, the passing point, of the identified one or plurality of passing points, that the aircraft 100 passes last when flying toward the port PT (step S116). Then, the setter 192 sets the alert start condition to a condition that the aircraft 100 flying toward the port PT arrives at the set alert starting point, sets the alert end condition to a condition that the aircraft 100 flying away from the port PT arrives at the set alert ending point, and then ends the execution of the setting processing.

After the alert start condition and the alert end condition are set by executing step S21 of FIG. 8, the controller 193 of the aircraft 100 starts the execution of non-illustrated start condition determination processing for determining whether or not the set alert start condition is met (step S22).

When the execution of the start condition determination processing starts, the acquirer 191 of the aircraft 100 acquires, on the basis of the signal output from the position measurement circuit 116 illustrated in FIG. 3, information expressing the flight position of the aircraft 100 by latitude, longitude, and altitude. Next, the controller 193 of the aircraft 100 calculates the distance between the flight position and the alert starting point on the basis of the information expressing the latitude, longitude, and altitude of the alert starting point and the information expressing the flight position. Then, when a determination is made that the calculated distance is less than or equal to a predetermined distance, the controller 193 determines that the alert start condition that the aircraft 100 arrives at the alert starting point is met. In contrast, when a determination is made that the calculated distance is greater than the predetermined distance, the controller 193 determines that the alert start condition is not met. Then, the controller 193 ends the execution of the start condition determination processing.

Thereafter, the processing of steps S23 to S28 of FIG. 8 described in Embodiment 1 is executed. As a result, the controller 193 of the aircraft 100 causes the alerter 180 to start the departure command alert related to landing at the timing at which the alert start condition is met. Then, when the aircraft 100 starts taking off, the controller 193 of the aircraft 100 causes the alerter 180 to stop the departure command alert related to landing and, then, causes the alerter 180 to start the departure command alert related to takeoff.

Thereafter, execution of the end condition determination processing is started (step S29). As a result, the acquirer 191 of the aircraft 100 acquires information expressing a new flight position, and the controller 193 determines, on the basis of information expressing the acquired new flight position by latitude, longitude, and altitude, and the information expressing the latitude, longitude, and altitude of the alert ending point, whether or not the alert end condition that the aircraft 100 arrives at the alert ending point is met.

In the end condition determination processing executed in step S29, when a determination is made that the alert end condition is not met (step S30; No), the controller 193 of the aircraft 100 causes the alerter 180 to continue the departure command alert related to takeoff (step S31). Then, the controller 193 repeats the processing from step S29.

In contrast, when a determination is made that the alert end condition is met (step S30; Yes), the controller 193 of the aircraft 100 causes the alerter 180 to end the departure command alert related to takeoff (step S32). Then, the controller 193 repeats the processing from step S21.

According to these configurations, the acquirer 191 of the aircraft 100 acquires the information expressing the flight route of the aircraft 100 to the port PT, and the weather information expressing the direction and the flow speed of the airstream that passes through the airspace including the flight route. Additionally, the setter 192 of the aircraft 100 predicts, on the basis of the flight route and the direction and flow speed of the airstream, the arrival time at which the aircraft 100 will arrive above the port PT and the passing times at which the aircraft 100 will pass the plurality of passing points included in the flight route. Furthermore, the setter 192 identifies one or a plurality of passing points that the aircraft 100 is predicted to pass at a passing time that is the predetermined amount of time Te or longer before the arrival time above the port PT. Additionally, the setter 192 sets, as the alert start condition, a condition that the aircraft 100 arrives at the alert starting point that is a point selected, from among the identified one or plurality of passing points, on the basis of the flight order on the flight route. Moreover, the controller 193 of the aircraft 100 causes the alert device 800 to start the alert at the timing at which the set alert start condition is met. Therefore, the aircraft 100 can cause the alert device 800 to start the alert the predetermined amount of time Te or longer before the time at which the aircraft 100 arrives above the port PT, more reliably than in Embodiment 1 in which the alert start condition is set in accordance with the wind speed Vw related to the port PT.

In the present embodiment, a description is given in which the setter 192 of the aircraft 100 sets, as the alert starting point and the alert ending point, the passing point, of the one or plurality of passing points identified in step S115, that the aircraft 100 passes last when flying toward the port PT. However, the present disclosure is not limited thereto, and a configuration is possible in which the setter 192 sets, as the alert starting point and the alert ending point, the passing point, of the identified one or plurality of passing points identified in step S115, that is the Nth (where N is an integer of 2 or greater) from the last passing point passed when the aircraft 100 flies toward the port PT. Additionally, a configuration is possible in which the setter 192 selects one point on the basis of software random numbers, for example, from the one or plurality of passing points identified in step S115, and sets the selected point as the alert starting point and the alert ending point.

A description is given in which the alert system 1 according to the present embodiment includes the aircraft 100, but does not include the weather measurement device 700, the alert device 800, and the control device 900. However, the present disclosure is not limited thereto. A configuration is possible in which the alert system 1 includes the aircraft 100 and the weather measurement device 700. In such a case, the weather measurement device 700 may include a non-illustrated LiDAR sensor, and the weather measuring circuit 719 may measure, on the basis of a signal output from that LiDAR sensor, the direction and the flow speed of the airflow passing through the airspace above the port PT or the port PT vicinity.

Modified Example of Embodiment 4

In Embodiment 4, a description is given in which the setter 192 of the aircraft 100 sets, as the alert starting point and the alert ending point, a passing point that the aircraft 100 is predicted to pass at a time that is the amount of time Te or longer before the time at which the aircraft 100 is predicted to arrive above the port PT. However, the present disclosure is not limited thereto and, in the present modified example, in a case in which the aircraft 100 falls or in a case in which a predetermined falling object falls from the aircraft 100, the setter 192 sets, as the alert starting point and the alert ending point, a falling start point such that the falling point of the aircraft 100 or the falling object is included in the outer region of the port PT or the port PT vicinity.

When the CPU 111 of the aircraft 100 according to the present modified example starts the execution of the alert control processing of FIG. 8, the CPU 111 executes setting processing such as illustrated in FIG. 33 (step S21).

When the execution of the setting processing of FIG. 33 starts, the acquirer 191 of the aircraft 100 acquires the information expressing the flight route of the aircraft 100, and the weather information expressing the direction and the flow speed of the airstream that passes through the flight route (steps S121 and S122).

Next, the setter 192 of the aircraft 100 predicts, on the basis of the information expressing the flight route and the weather information acquired by the acquirer 191, falling points for the plurality of passing points included in the flight route (step S123). The falling points predicted in step S123 are falling points of the aircraft 100 or the falling object in a case in which, at each of the plurality of passing points, the aircraft 100 starts falling or the falling object starts falling from the aircraft 100 that is flying at the predetermined airspeed Va or the predetermined ground speed Vg.

Thereafter, the setter 192 of the aircraft 100 reads, from the information storage 990 of the aircraft 100, the information expressing the range of the port PT and the information expressing the range of the port PT vicinity (step S124). In the present modified example, the phrase "port PT vicinity" is a region that is more to the port PT side than a boundary line B that is separated from the outer periphery of the port PT by a predetermined distance D, and that is farther outward than the outer periphery of the port PT. As such, the information expressing the range of the port PT vicinity includes information expressing the center point of the port PT by latitude, longitude, and altitude, information expressing the radius DP of the port PT, and information expressing the distance D.

Next, the setter 192 of the aircraft 100 identifies, on the basis of the read information, one or a plurality of falling points, included in an area (hereinafter referred to as "outer area of the port PT vicinity") outward from the port PT and also outward from the port PT vicinity, from among the predicted plurality of falling points (step S125). Additionally, the setter 192 identifies falling start points that correspond to the identified one or plurality of falling points (step S126).

Next, the setter 192 of the aircraft 100 sets the passing point, of the identified one or plurality of passing points, that the aircraft 100 passes last when flying toward the port PT as the alert starting point and the alert ending point (step S127). Then, the setter 192 sets the alert start condition to a condition that the aircraft 100 flying toward the port PT arrives at the set alert starting point, sets the alert end condition to a condition that the aircraft 100 flying away from the port PT arrives at the set alert ending point, and then ends the execution of the setting processing.

According to these configurations, the acquirer 191 of the aircraft 100 acquires the information expressing the flight route of the aircraft 100 to the port PT, and the weather information expressing the direction and the flow speed of the airstream that passes through the airspace including the flight route. Additionally, the setter 192 of the aircraft 100 predicts, on the basis of the direction and the flow speed of the airstream, a plurality of falling points of the aircraft 100 or the falling object in a case in which the falling start points at which the aircraft 100 or the falling object starts falling are a plurality of passing points included in the flight route. Furthermore, the setter 192 identifies, from among the predicted plurality of falling points, one or a plurality of points included in the outer area of the port PT vicinity. Moreover, the setter 192 sets, as the alert start condition, the condition that the aircraft 100 arrives at the alert starting point that is a point selected, from among one or a plurality of falling start points that respectively correspond to the identified one or plurality of points, on the basis of the flight order on the flight route. Moreover, the controller 193 of the aircraft 100 causes the alert device 800 to start the alert at the timing at which the set alert start condition is met. As such, the aircraft 100 can more reliably prevent physical contact between the aircraft 100 or the falling object and a person in the predetermined range including the port PT than in Modified Example 10 of Embodiment 1 in which the alert start condition is set in accordance with the wind speed Vw related to the port PT.

In the present embodiment, a description is given in which the setter 192 of the aircraft 100 sets, as the alert starting point and the alert ending point, the falling start point, of the one or plurality of falling start points identified in step S126, that the aircraft 100 passes last when flying toward the port PT. However, the present disclosure is not limited thereto, and a configuration is possible in which the setter 192 sets, as the alert starting point and the alert ending point, the falling start point, of the identified one or plurality of falling start points identified in step S126, that is the Nth (where N is an integer of 2 or greater) from the last passing point passed when the aircraft 100 flies toward the port PT. Additionally, a configuration is possible in which the setter 192 selects one point on the basis of software random numbers, for example, from the one or plurality of falling start points identified in step S126, and sets the selected point as the alert starting point and the alert ending point.

Embodiments 1 to 4, Modified Examples 1 to 19 of Embodiment 1, Modified Examples 1 to 6 of Embodiment 2, Modified Examples 1 to 3 of Embodiment 3, and the modified example of Embodiment 4 of the present disclosure can each be combined with each other.

It is possible to provide a control device 900 that includes configurations for realizing the functions according to any of Embodiments 1 to 3, Modified Examples 1 to 17 of Embodiment 1, Modified Examples 1 to 6 of Embodiment 2, and Modified Examples 1 to 3 of Embodiment 3, and a control device 110 that includes configurations for realizing the functions according to Modified Example 18 of Embodiment 1, Modified Example 19 of Embodiment 1, Embodiment 4, and the modified example of Embodiment 4. In addition, it is possible to provide a system that includes a plurality of devices that includes, as an overall system, configurations for realizing the functions according to any of Embodiments 1 to 4, Modified Examples 1 to 19 of Embodiment 1, Modified Examples 1 to 6 of Embodiment 2, Modified Examples 1 to 3 of Embodiment 3, and the modified example of Embodiment 4.

A control device 900 that is provided, in advance, with configurations to realize the functions according to any of Embodiments 1 to 3, Modified Examples 1 to 17 of Embodiment 1, Modified Examples 1 to 6 of Embodiment 2, and Modified Examples 1 to 3 of Embodiment 3 of the present disclosure can be provided. Additionally, by applying a program, an existing control device can be made to function as the control device 900 according to any of Embodiments 1 to 3, Modified Examples 1 to 17 of Embodiment 1, Modified Examples 1 to 6 of Embodiment 2, and Modified Examples 1 to 3 of Embodiment 3. That is, by using a computer (CPU or the like) that controls an existing control device to execute a program for realizing the various functional configurations of the control device 900 described in any of Embodiments 1 to 3, Modified Examples 1 to 17 of Embodiment 1, Modified Examples 1 to 6 of Embodiment 2, and Modified Examples 1 to 3 of Embodiment 3, that existing control device can be caused to function as the control device 900 according to any of Embodiments 1 to 3, Modified Examples 1 to 17 of Embodiment 1, Modified Examples 1 to 6 of Embodiment 2, and Modified Examples 1 to 3 of Embodiment 3.

A control device 110 that is provided, in advance, with configurations to realize the functions according to any of Modified Examples 18 and 19 of Embodiment 1, Embodiment 4, and the modified example of Embodiment 4 of the present disclosure can be provided. Additionally, by applying a program, an existing control device can be made to function as the control device 110 according to any of Modified Examples 18 and 19 of Embodiment 1, Embodiment 4, and the modified example of Embodiment 4. That is, by using a computer (CPU or the like) that controls an existing control device to execute a program for realizing the various functional configurations of the control device 110 described in any of Modified Examples 18 and 19 of Embodiment 1, Embodiment 4, and the modified example of Embodiment 4, that existing control device can be caused to function as the control device 110 according to any of Modified Examples 18 and 19 of Embodiment 1, Embodiment 4, and the modified example of Embodiment 4.

Any distribution method of such a program can be used. For example, the program can be the stored and distributed on a recording medium such as a memory card, a compact disc (CD) ROM, or a digital versatile disc (DVD) ROM, or can be distributed via a communication medium such as the internet.

A method according to the present disclosure can be implemented using the alert system 1 according to any of Embodiments 1 to 4, Modified Examples 1 to 19 of Embodiment 1, Modified Examples 1 to 6 of Embodiment 2, Modified Examples 1 to 3 of Embodiment 3, and the modified example of Embodiment 4. Additionally, the method according to the present disclosure can be implemented using the control device 900 according to any of Embodiments 1 to 3, Modified Examples 1 to 17 of Embodiment 1, Modified Examples 1 to 6 of Embodiment 2, and Modified Examples 1 to 3 of Embodiment 3, and the control device 110 according to any of Modified Example 18 of Embodiment 1, Modified Example 19 of Embodiment 1, Embodiment 4, and the modified example of Embodiment 4.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

APPENDICES

Appendix 1

A control device, including:
an acquirer that acquires information expressing weather related to a scheduled landing location at which a landing of an aircraft is scheduled; and
a controller that causes an alerter to perform a behavior corresponding to the weather expressed in the acquired information, the alerter performing an alert related to the landing of the aircraft.

Appendix 2

The control device according to appendix 1, wherein the behavior corresponding to the weather includes starting the alert at a timing at which an alert start condition corresponding to the weather is met, the alert start condition is a condition related to a positional relationship between the scheduled landing location and the aircraft, the weather includes at least one of a wind direction or a wind speed related to the scheduled landing location, the control device further includes a setter that sets the alert start condition in accordance with the at least one of the wind direction or the wind speed expressed in the acquired weather information, and the controller causes the alerter to start the alert at a timing at which the set alert start condition is met.

Appendix 3

The control device according to appendix 2, wherein the alert start condition is a condition that a distance between the scheduled landing location and the aircraft becomes less than or equal to a set threshold, and the setter sets the threshold in accordance with the wind speed related to the scheduled landing location.

Appendix 4

The control device according to appendix 2 or 3, wherein the alert start condition is a condition that the aircraft enters an airspace above an alert area that includes the scheduled landing location and that is set by the setter, and the setter sets a shape of the alert area in accordance with the at least one of the wind direction or the wind speed related to the scheduled landing location.

Appendix 5

The control device according to appendix 4, wherein the setter sets a size of the alert area in accordance with the wind speed related to the scheduled landing location.

Appendix 6

The control device according to appendix 5, wherein the acquirer acquires information expressing a flight route of the aircraft to the scheduled landing location, and the weather information expressing a direction and a flow speed of an airstream that passes through airspace including the flight route, and the setter predicts, based on the flight route and the direction and the flow speed of the airstream, an arrival time at which the aircraft arrives above the scheduled landing location, and a passing time at which the aircraft passes a plurality of passing points included in the flight route, identifies one or a plurality of passing points that the aircraft is predicted to pass at the passing time that is a predetermined amount of time or longer before the predicted arrival time, and sets, as the alert start condition, a condition that the aircraft arrives at a point selected, based on a flight order on the flight route, from among the identified one or plurality of passing points.

Appendix 7

The control device according to any one of appendices 2 to 6, wherein the setter changes the predetermined behavior of the alerter in accordance with the weather expressed in the acquired information, and the controller causes the alerter to perform the changed behavior.

Appendix 8

The control device according to any one of appendices 2 to 7, wherein the acquirer acquires information expressing weather related to a scheduled takeoff location from which the aircraft is scheduled to takeoff, and the controller causes the alerter to perform an alert related to the takeoff of the aircraft by a behavior corresponding to the weather related to the scheduled takeoff location expressed in the acquired information.

Appendix 9

The control device according to any one of appendices 1 to 8, wherein the behavior corresponding to the weather includes performing, in a mode corresponding to the weather, the alert related to the landing of the aircraft, and the controller causes the alerter to perform, in the mode corresponding to the weather expressed in the acquired information, the alert related to the landing of the aircraft.

Appendix 10

The control device according to appendix 5, wherein the acquirer acquires information expressing a flight route of the aircraft to the scheduled landing location, and the weather information expressing a direction and a flow speed of an airstream that passes through airspace including the flight route, and the setter predicts, based on the direction and the flow speed of the airstream, a plurality of falling points of the aircraft or an object in a case in which falling start points, at which the aircraft or the object including at least one of a part of the aircraft or an article transported by the aircraft starts to fall, are a plurality of passing points included in the flight route, identifies, from the predicted plurality of falling points, one or a plurality of points included in a region outside a predetermined range including the scheduled landing location, and sets, as the alert start condition, a condition that the aircraft arrives at a point selected, based on a flight order on the flight route, from among one or a plurality of falling start points that respectively correspond to the identified one or plurality of points.

Appendix 11

An alert system, including:

an aircraft for which a landing at a schedule landing location is scheduled;

an alerter that performs an alert related to the landing of the aircraft;

an acquirer that acquires information expressing weather related to the scheduled landing location; and a controller that causes the alerter to perform a behavior corresponding to the weather expressed in the acquired information.

Appendix 12

A method, including:

acquiring, by a control device or a system, information expressing weather related to a scheduled landing location at which a landing of an aircraft is scheduled; and causing, by the control device or the system, an alerter to perform a behavior corresponding to the weather expressed in the acquired information, the alerter performing an alert related to the landing of the aircraft.

REFERENCE SIGNS LIST

Reference Signs List

1 Alert system
100 Aircraft
110, 900 Control device
111, 701, 801, 901 CPU
112, 702, 802, 902 RAM
113a, 703a, 803a, 903a ROM
113b, 703b, 803b Flash memory
114a, 904a Data communication circuit
115a, 815a, 905a Video card
115b, 815b, 905b Display device
115c, 905c Input device
116 Position measurement circuit
118, 708, 808, 908a, 908b Input/output port
119, 812 Drive circuit
121 to 124 Propeller arm
131 to 134 Propeller
141a First holding frame
141b Second holding frame
142a, 142b Guide rail
143 Support leg
151 LiDAR sensor
170, 710, 970 Measurer
180, 810, 980 Alerter
191, 910 Acquirer
192, 920 Setter
193, 930 Controller
199, 990 Information storage
700 Weather measurement device
711a to 713a Emitter
711b to 713b Receiver
719 Weather measurement circuit
800 Alert device
811 Speaker
813 LED
903b Hard disk
B, CB, DB Boundary line
CA, CA0 Alert area
CO Office
CT Threshold
CXl, CXw, Cy Variable
D Distance from port to boundary of port vicinity
DA Initial alert area
DF Horizontal distance from port to aircraft
DT Initial threshold
DP Radius of port
F2 (Vg, Vw), F3 (Vg, Vw), F4x (Vg, Vw), F4y (Vg, Vw) Function
IN Internet P Crossing point
PB Distance from port to boundary line of alert area
PE Falling point
PS Falling start point
PT Port
Va Airspeed
Vg Ground speed
Vw Wind speed
$\theta$ Angle representing wind direction
$\varphi$ Angle representing direction from port toward aircraft

The invention claimed is:

1. A control device comprising:

at least one memory storing program code; and at least one processor operable to read the program code and operate as instructed by the program code, wherein the program code includes:

acquiring code configured to cause the at least one processor to acquire information expressing weather related to a scheduled landing location at which a landing of an aircraft is scheduled; and control code configured to cause the at least one processor to cause an alerter to perform a behavior corresponding to the weather expressed in the acquired information, the alerter configured to perform an alert related to the landing of the aircraft, the behavior corresponding to the weather includes starting the alert at a timing at which an alert start condition corresponding to the weather is met, the weather includes at least one of a wind direction or a wind speed related to the scheduled landing location, the program code further includes setting code configured to cause the at least one processor to set the alert start condition in accordance with the at least one of the wind direction or the wind speed expressed in the acquired information, the control code is configured to cause the at least one processor to cause the alerter to start the alert at a timing at which the set alert start condition is met, the alert start condition is a condition
that is related to a positional relationship between the scheduled landing location and the aircraft, and
that a distance between the scheduled landing location and the aircraft becomes less than or equal to a set threshold, and the setting code is configured to cause the at least one processor to set the threshold in accordance with the wind speed related to the scheduled landing location.

2. A control device comprising:

at least one memory storing program code; and at least one processor operable to read the program code and operate as instructed by the program code, wherein the program code includes:

acquiring code configured to cause the at least one processor to acquire information expressing weather related to a scheduled landing location at which a landing of an aircraft is scheduled; and control code configured to cause the at least one processor to cause an alerter to perform a behavior corresponding to the weather expressed in the acquired information, the alerter configured to perform an alert related to the landing of the aircraft, the behavior corresponding to the weather includes starting the alert at a timing at which an alert start condition corresponding to the weather is met, the weather includes at least one of a wind direction or a wind speed related to the scheduled landing location, the program code further includes setting code configured to cause the at least one processor to set the alert start condition in accordance with the at least one of the wind direction or the wind speed expressed in the acquired information, the control code is configured to cause the at least one processor to cause the alerter to start the alert at a timing at which the set alert start condition is met, the alert start condition is a condition that is related to a positional relationship between the scheduled landing location and the aircraft, and that the aircraft enters an airspace above an alert area that includes the scheduled landing location and that is set by the at least one processor, and the setting code is configured to cause the at least one processor to set a shape of the alert area in accordance with the at least one of the wind direction or the wind speed related to the scheduled landing location.

3. The control device according to claim 2, wherein the setting code is configured to cause the at least one processor to set a size of the alert area in accordance with the wind speed related to the scheduled landing location.

4. The control device according to claim 3, wherein the acquiring code is configured to cause the at least one processor to acquire information expressing a flight route of the aircraft to the scheduled landing location, and information expressing a direction and a flow speed of an airstream that passes through airspace including the flight route, and the setting code is configured to cause the at least one processor to predict, based on the flight route and the direction and the flow speed of the airstream, an arrival time at which the aircraft arrives above the scheduled landing location, and a passing time at which the aircraft passes a plurality of passing points included in the flight route, identify one or a plurality of passing points that the aircraft is predicted to pass at the passing time that is a predetermined amount of time or longer before the predicted arrival time, and set, as the alert start condition, a condition that the aircraft arrives at a point selected, based on a flight order on the flight route, from among the identified one or plurality of passing points.

5. The control device according to claim 1, wherein the setting code is configured to cause the at least one processor to change the predetermined behavior of the alerter in accordance with the weather expressed in the acquired information, and the control code is configured to cause the at least one processor to cause the alerter to perform the changed behavior.

6. The control device according to claim 1, wherein the acquiring code is configured to cause the at least one processor to acquire information expressing weather related to a scheduled takeoff location from which the aircraft is scheduled to takeoff, and the control code is configured to cause the at least one processor to cause the alerter to perform an alert related to the takeoff of the aircraft by a behavior corresponding to the weather related to the scheduled takeoff location expressed in the acquired information.

7. The control device according to claim 1, wherein the behavior corresponding to the weather includes performing, in a mode corresponding to the weather, the alert related to the landing of the aircraft, and the control code is configured to cause the at least one processor to cause the alerter to perform, in the mode corresponding to the weather expressed in the acquired information, the alert related to the landing of the aircraft.

8. The control device according to claim 3, wherein the acquiring code is configured to cause the at least one processor to acquire information expressing a flight route of the aircraft to the scheduled landing location, and information expressing a direction and a flow speed of an airstream that passes through airspace including the flight route, and the setting code is configured to cause the at least one processor to predict, based on the direction and the flow speed of the airstream, a plurality of falling points of the aircraft or an object in a case in which falling start points, at which the aircraft or the object including at least one of a part of the aircraft or an article transported by the aircraft starts to fall, are a plurality of passing points included in the flight route, identify, from the predicted plurality of falling points, one or a plurality of points included in a region outside a predetermined range including the scheduled landing location, and set, as the alert start condition, a condition that the aircraft arrives at a point selected, based on a flight order on the flight route, from among one or a plurality of falling start points that respectively correspond to the identified one or plurality of points.

9. An alert system, comprising:

an aircraft for which a landing at a schedule landing location is scheduled;

an alerter configured to perform an alert related to the landing of the aircraft;

at least one memory storing program code; and at least one processor operable to read the program code and operate as instructed by the program code, wherein the program code includes:

acquiring code configured to cause the at least one processor to acquire information expressing weather related to the scheduled landing location; and control code configured to cause the at least one processor to cause the alerter to perform a behavior corresponding to the weather expressed in the acquired information, the behavior corresponding to the weather includes starting the alert at a timing at which an alert start condition corresponding to the weather is met, the weather includes at least one of a wind direction or a wind speed related to the scheduled landing location, the program code further includes setting code configured to cause the at least one processor to set the alert start condition in accordance with the at least one of the wind direction or the wind speed expressed in the acquired information, the control code is configured to cause the at least one processor to cause the alerter to start the alert at a timing at which the set alert start condition is met, the alert start condition is a condition that is related to a positional relationship between the scheduled landing location and the aircraft, and that a distance between the scheduled landing location and the aircraft becomes less than or equal to a set threshold, and the setting code is configured to cause the at least one processor to set the threshold in accordance with the wind speed related to the scheduled landing location-.

10. The control device according to claim 1, wherein the behavior corresponding to the weather includes performing the alert at a volume corresponding to the at least one of the wind speed or the wind direction.

11. The control device according to claim 1, wherein the weather includes weather measured in a region including the scheduled landing location or weather forecast for the region, and
the behavior corresponding to the weather includes at least one of performing the alert at a volume, performing the alert at a luminous intensity, or performing the alert at an illuminance, the volume, the luminous intensity, and the illuminance corresponding to the weather.

12. The control device according to claim 1, wherein the alert start condition is a condition that the aircraft enters an airspace above an alert area that includes the scheduled landing location and that is set by the at least one processor, and
the setting code is configured to cause the at least one processor to set a shape of the alert area in accordance with the at least one of the wind direction or the wind speed related to the scheduled landing location.

13. The control device according to claim 12, wherein the setting code is configured to cause the at least one processor to set a size of the alert area in accordance with the wind speed related to the scheduled landing location.

14. The control device according to claim 12, wherein the setting code is configured to cause the at least one processor to change the predetermined behavior of the alerter in accordance with the weather expressed in the acquired information, and
the control code is configured to cause the at least one processor to cause the alerter to perform the changed behavior.

15. The control device according to claim 2, wherein the setting code is configured to cause the at least one processor to change the predetermined behavior of the alerter in accordance with the weather expressed in the acquired information, and
the control code is configured to cause the at least one processor to cause the alerter to perform the changed behavior.

16. The control device according to claim 3, wherein the setting code is configured to cause the at least one processor to change the predetermined behavior of the alerter in accordance with the weather expressed in the acquired information, and
the control code is configured to cause the at least one processor to cause the alerter to perform the changed behavior.

17. The control device according to claim 4, wherein the setting code is configured to cause the at least one processor to change the predetermined behavior of the alerter in accordance with the weather expressed in the acquired information, and
the control code is configured to cause the at least one processor to cause the alerter to perform the changed behavior.

18. The control device according to claim 2, wherein the acquiring code is configured to cause the at least one processor to acquire information expressing weather related to a scheduled takeoff location from which the aircraft is scheduled to takeoff, and
the control code is configured to cause the at least one processor to cause the alerter to perform an alert related to the takeoff of the aircraft by a behavior corresponding to the weather related to the scheduled takeoff location expressed in the acquired information.

19. The control device according to claim 12, wherein the acquiring code is configured to cause the at least one processor to acquire information expressing weather related to a scheduled takeoff location from which the aircraft is scheduled to takeoff, and
the control code is configured to cause the at least one processor to cause the alerter to perform an alert related to the takeoff of the aircraft by a behavior corresponding to the weather related to the scheduled takeoff location expressed in the acquired information.

20. The control device according to claim 2, wherein the behavior corresponding to the weather includes performing, in a mode corresponding to the weather, the alert related to the landing of the aircraft, and
the control code is configured to cause the at least one processor to cause the alerter to perform, in the mode corresponding to the weather expressed in the acquired information, the alert related to the landing of the aircraft.

* * * * *